United States Patent
Kishigami et al.

(10) Patent No.: US 9,958,541 B2
(45) Date of Patent: May 1, 2018

(54) RADAR DEVICE, VEHICLE, AND MOVING OBJECT SPEED DETECTION METHOD

(71) Applicant: Panasonic Corporation, Osaka (JP)

(72) Inventors: Takaaki Kishigami, Tokyo (JP); Hirofumi Nishimura, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 377 days.

(21) Appl. No.: 14/839,595

(22) Filed: Aug. 28, 2015

(65) Prior Publication Data

US 2015/0369912 A1 Dec. 24, 2015

Related U.S. Application Data

(63) Continuation of application No. PCT/JP2014/003790, filed on Jul. 17, 2014.

(30) Foreign Application Priority Data

Sep. 12, 2013 (JP) .................... 2013-189380

(51) Int. Cl.
*G01S 13/60* (2006.01)
*G01S 13/26* (2006.01)
(Continued)

(52) U.S. Cl.
CPC ............. *G01S 13/60* (2013.01); *G01S 3/46* (2013.01); *G01S 7/288* (2013.01); *G01S 13/26* (2013.01);
(Continued)

(58) Field of Classification Search
CPC .......... G01S 13/26; G01S 13/42; G01S 13/34; G01S 13/58; G01S 13/60; G01S 13/931
See application file for complete search history.

(56) References Cited

U.S. PATENT DOCUMENTS 5,371,718 A * 12/1994 Ikeda .................. B60T 8/172
342/104
5,579,012 A * 11/1996 Iwakuni ................ G01S 13/60
342/117

(Continued)

FOREIGN PATENT DOCUMENTS

DE 10 2011 015 935 A1 10/2012
EP 1 770 410 A 4/2007
(Continued)

OTHER PUBLICATIONS

Extended European Search Report, dated Sep. 21, 2016, for corresponding EP Application No. 14844250.2-1812 / 3045934, 9 pages.
(Continued)

*Primary Examiner* — Peter M Bythrow
(74) *Attorney, Agent, or Firm* — Seed IP Law Group LLP

(57) ABSTRACT

A radar device mounted in a moving object includes a radar transmitter and a radar receiver. The radar receiver includes a plurality of antenna brunch processors that perform correlation processing of the received returning signals and the radar transmission signal, and generate respective correlation signals each including arrival delay information of each of the received returning signals, an electric power profile generator that generates an electric power profiles for each arrival direction of the received returning signals and Doppler frequency component, using the generated correlation signals, and a stationary object group distribution generator that, based on the generated electric power profiles, obtains a first distribution of a Doppler frequency components of a stationary object group including a plurality of stationary objects as the plurality of targets in the perimeter of the moving object, for each azimuth angle.

21 Claims, 32 Drawing Sheets

(51) Int. Cl.
*G01S 13/34* (2006.01)
*G01S 3/46* (2006.01)
*G01S 7/288* (2006.01)
*G01S 13/42* (2006.01)
*G01S 13/93* (2006.01)

(52) U.S. Cl.
CPC .............. *G01S 13/34* (2013.01); *G01S 13/42* (2013.01); *G01S 13/931* (2013.01)

(56) References Cited

U.S. PATENT DOCUMENTS

| | | | | |
|---|---|---|---|---|
| 6,396,437 | B1* | 5/2002 | Marino | G01S 13/58 342/104 |
| 6,445,337 | B1* | 9/2002 | Reiche | G01S 13/60 180/197 |
| 7,136,736 | B2* | 11/2006 | Kuragaki | B60G 17/016 342/104 |
| 7,372,395 | B2* | 5/2008 | Kojima | G01S 13/60 342/104 |
| 7,558,695 | B2* | 7/2009 | Calderone | G01S 13/60 340/995.13 |
| 8,704,704 | B2* | 4/2014 | Luebbert | G01S 13/343 342/104 |
| 9,244,164 | B2* | 1/2016 | Luebbert | G01S 13/22 |
| 2003/0034912 | A1* | 2/2003 | Williams | G01S 13/56 342/28 |
| 2003/0052814 | A1* | 3/2003 | Corbrion | G01S 13/60 342/104 |
| 2008/0012752 | A1* | 1/2008 | Okamura | G01S 7/4026 342/165 |
| 2010/0017128 | A1* | 1/2010 | Zeng | B60W 40/105 701/301 |
| 2011/0295549 | A1* | 12/2011 | Takabayashi | G01S 7/4004 702/142 |
| 2012/0169532 | A1* | 7/2012 | Yamada | G01S 13/87 342/25 R |
| 2012/0242531 | A1* | 9/2012 | Itoh | G01S 7/4026 342/107 |
| 2013/0124061 | A1* | 5/2013 | Khanafer | G06F 17/00 701/70 |

FOREIGN PATENT DOCUMENTS

| | | |
|---|---|---|
| EP | 2 503 352 A2 | 9/2012 |
| JP | 2004-177289 | 6/2004 |
| JP | 2007-285912 | 11/2007 |
| JP | 2010-043960 | 2/2010 |

OTHER PUBLICATIONS

International Search Report of PCT application No. PCT/JP2014/003790 dated Oct. 21, 2014.

* cited by examiner

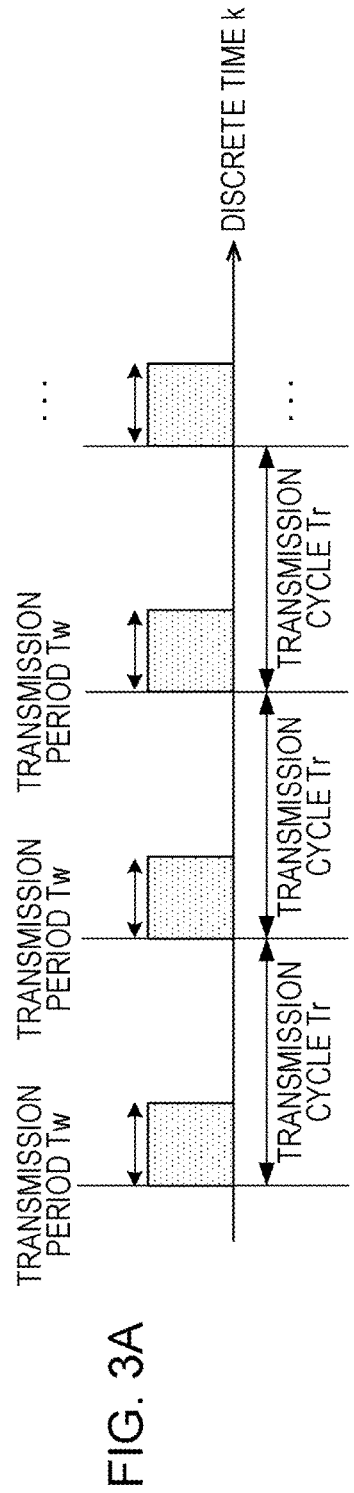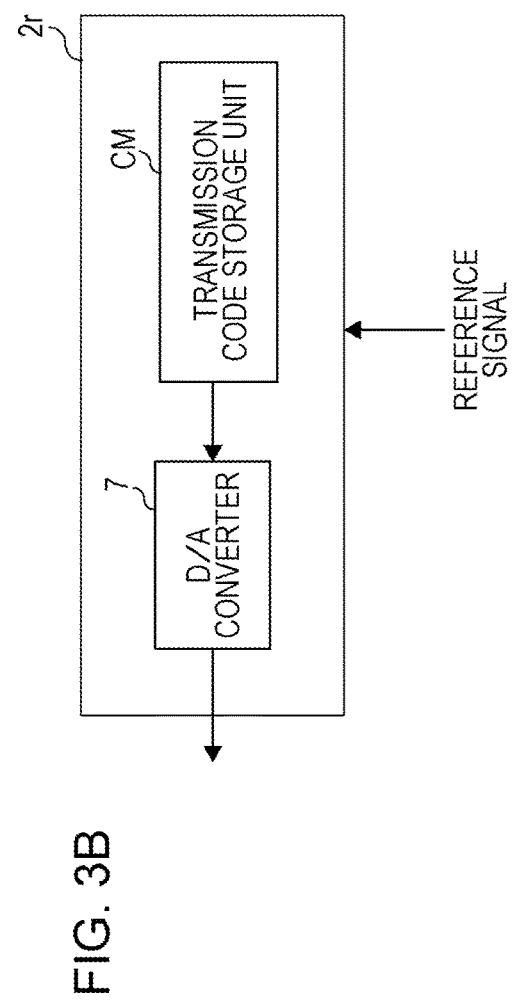

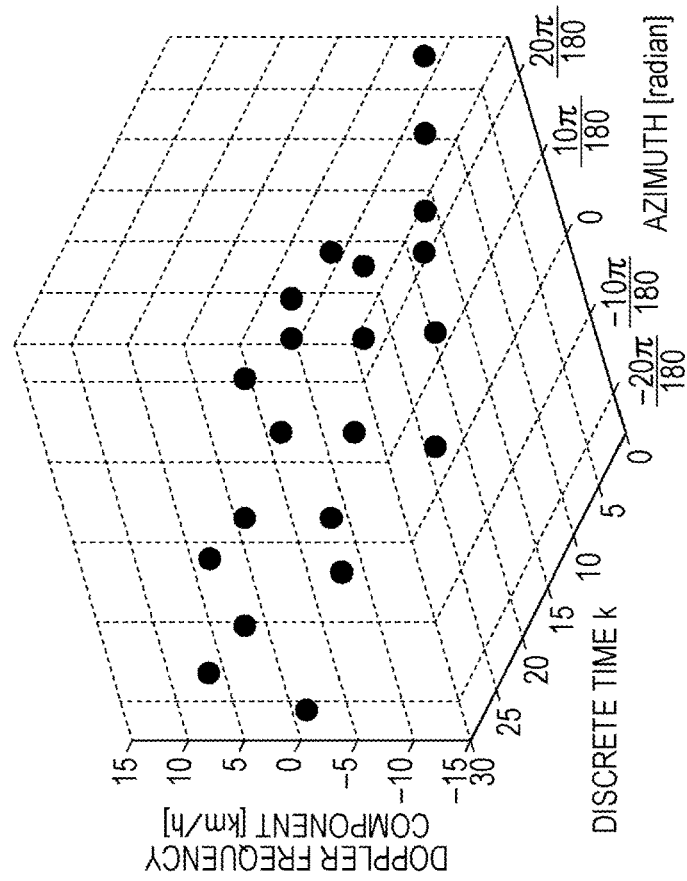
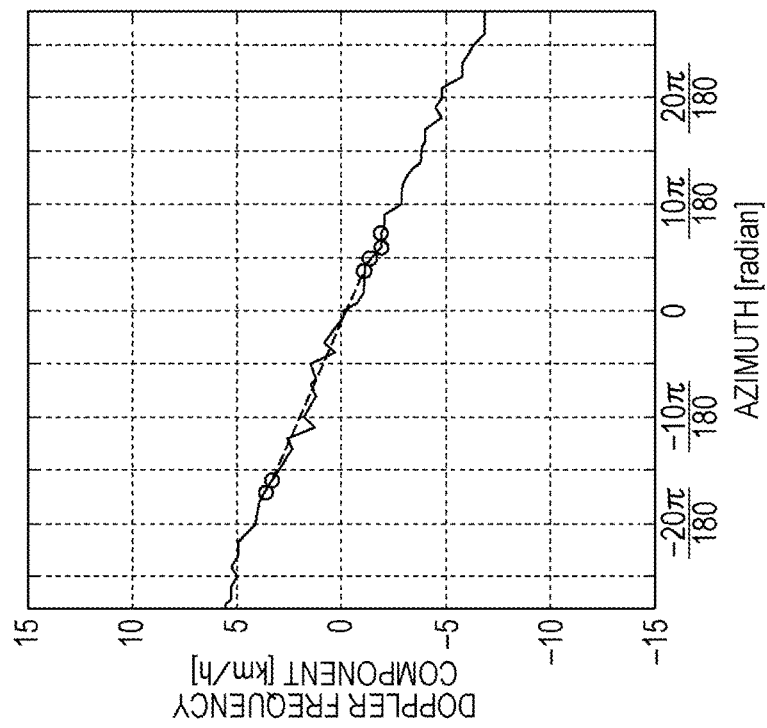
FIG. 6A
FIG. 6B

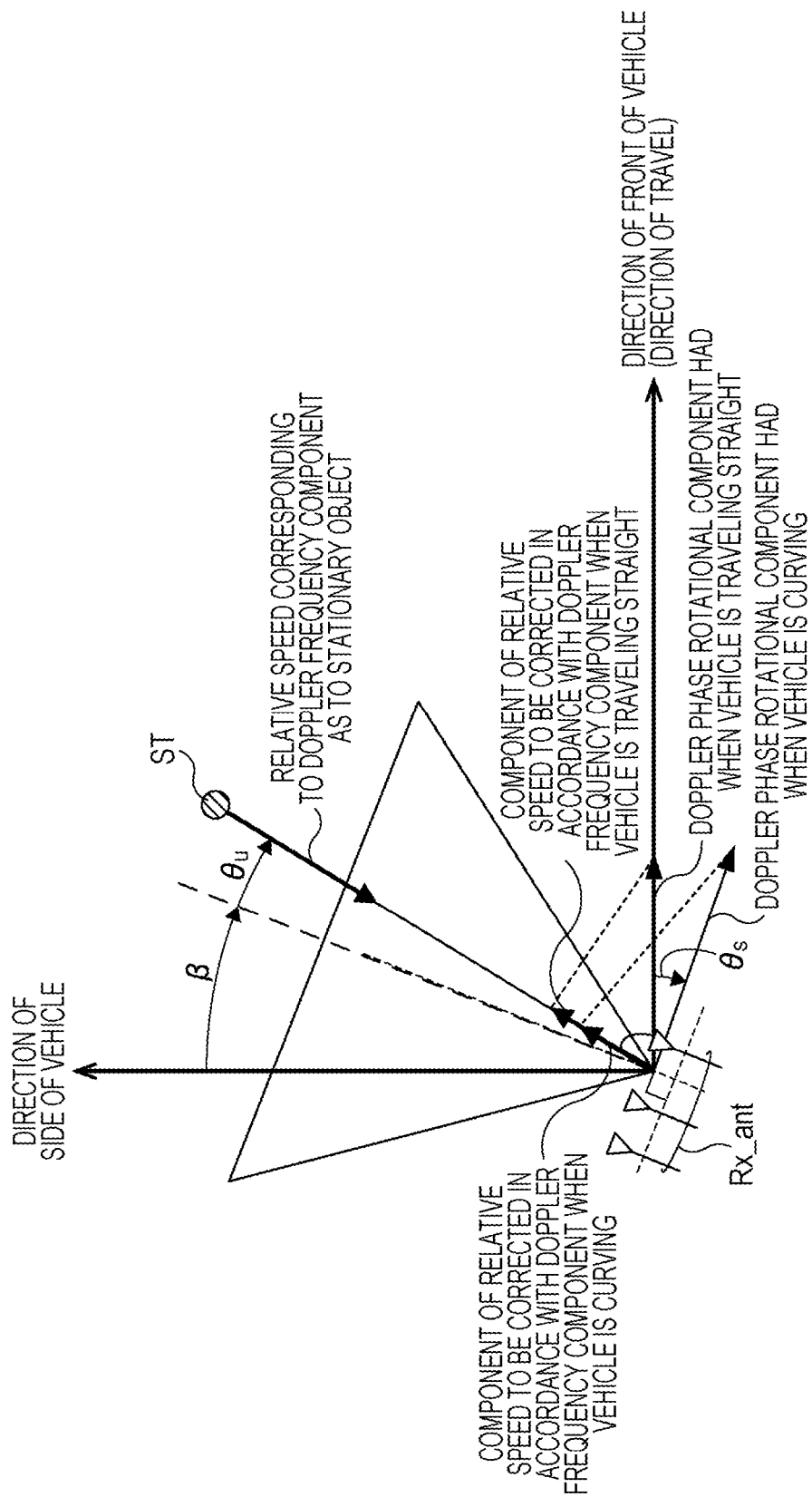

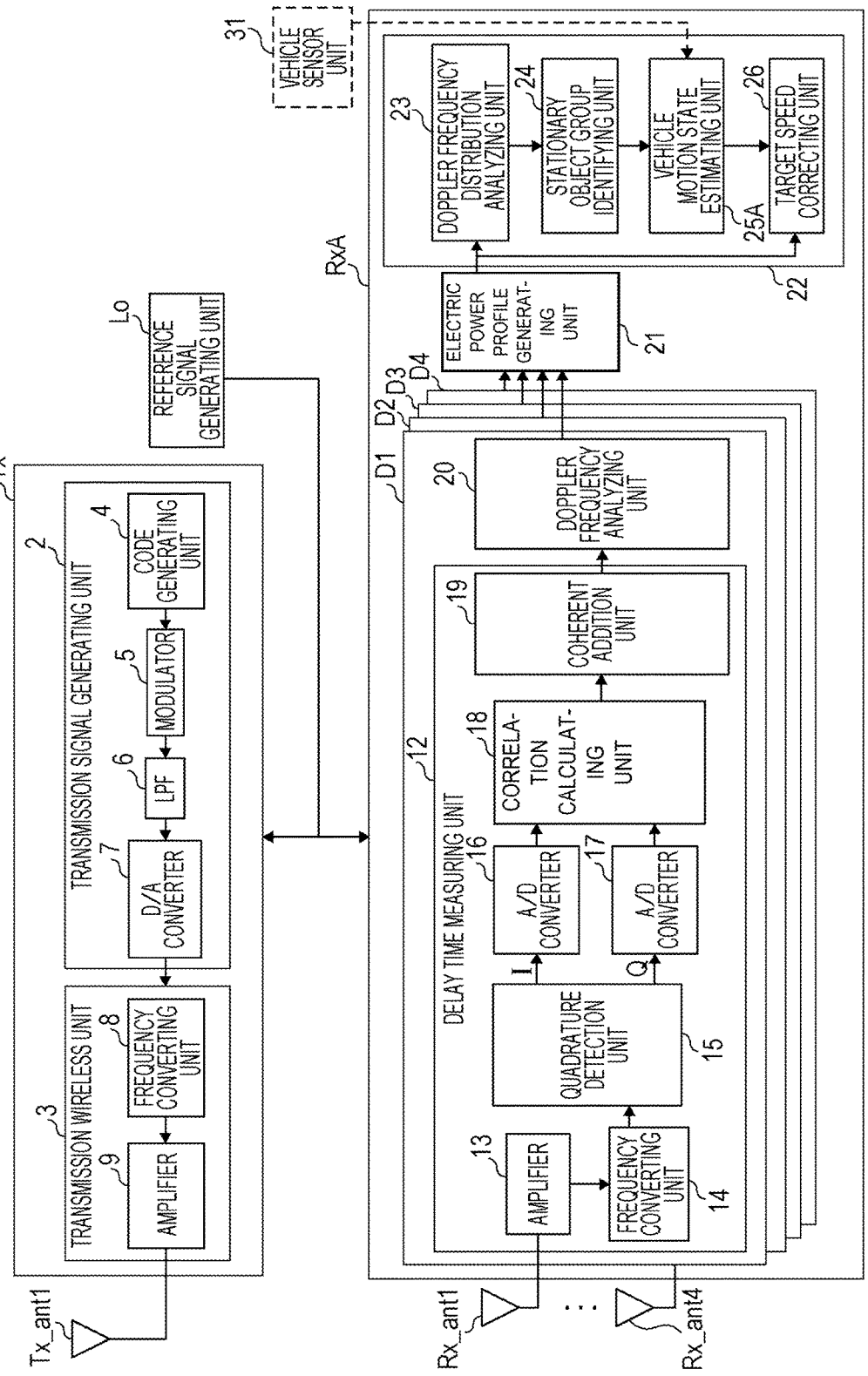

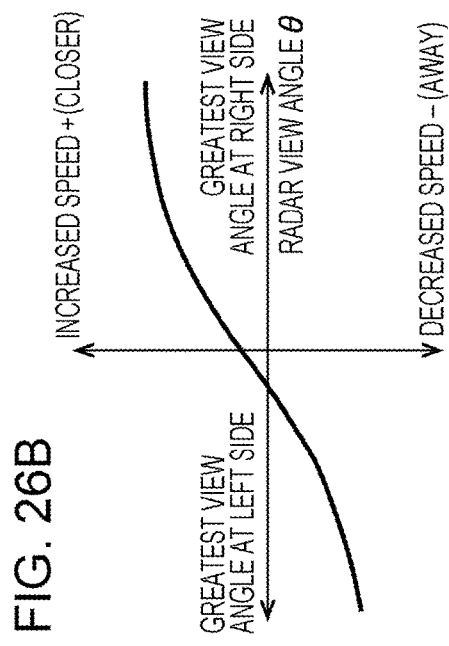
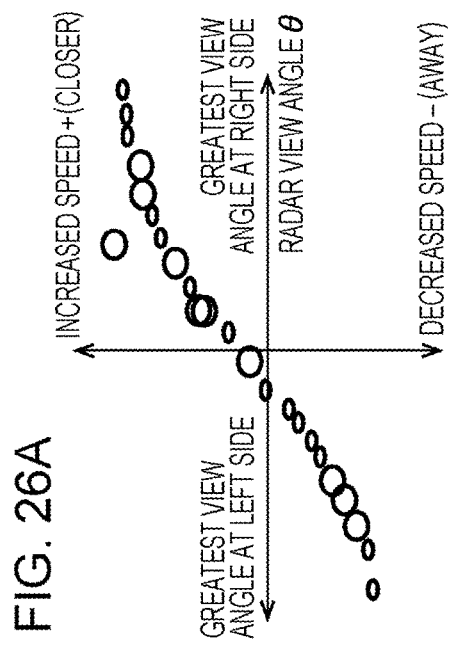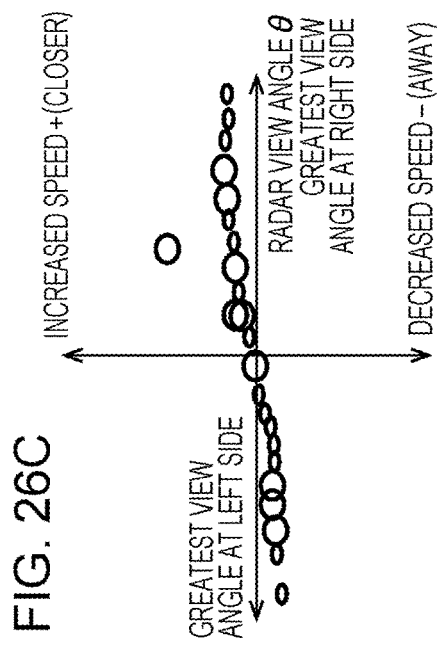

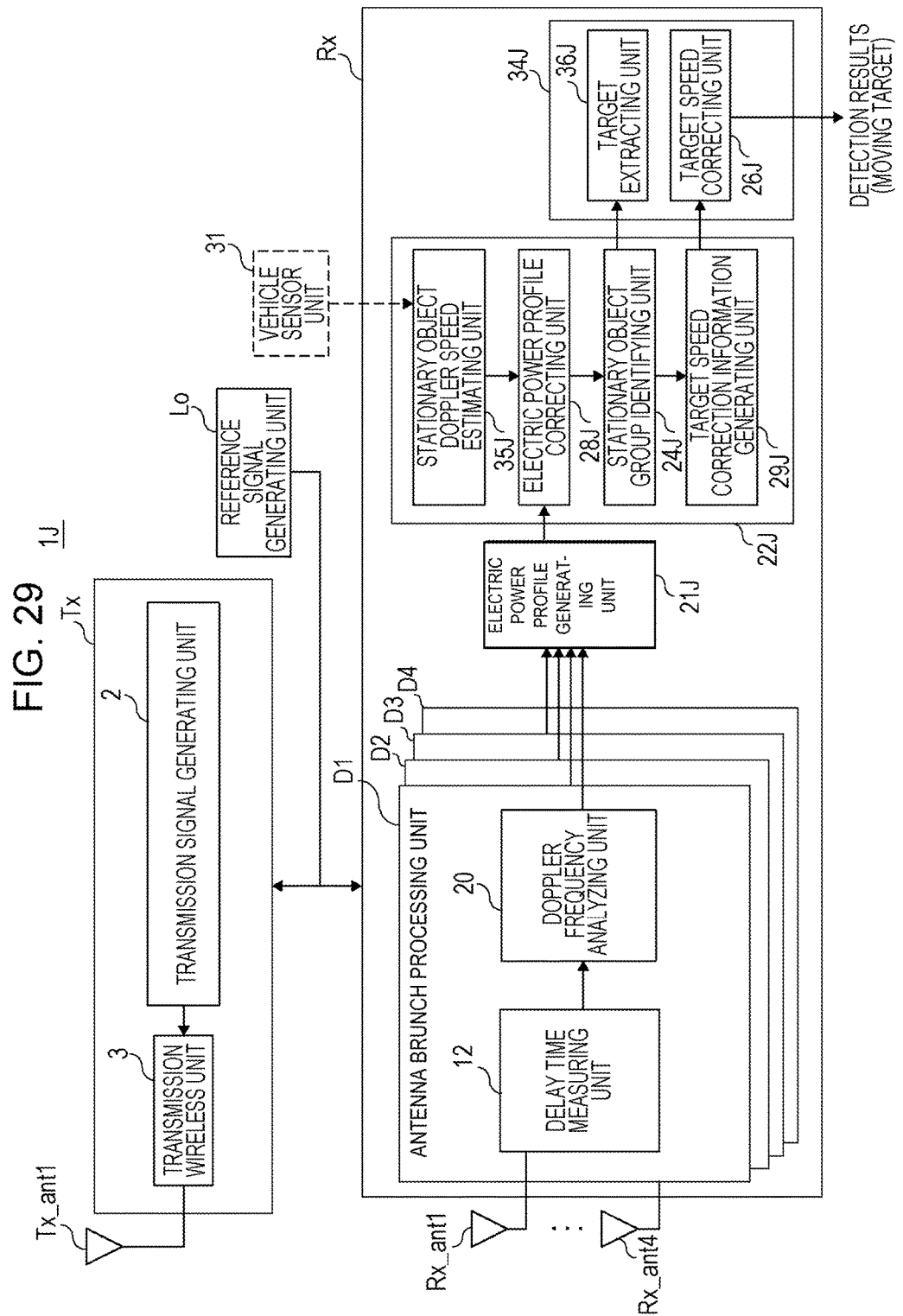

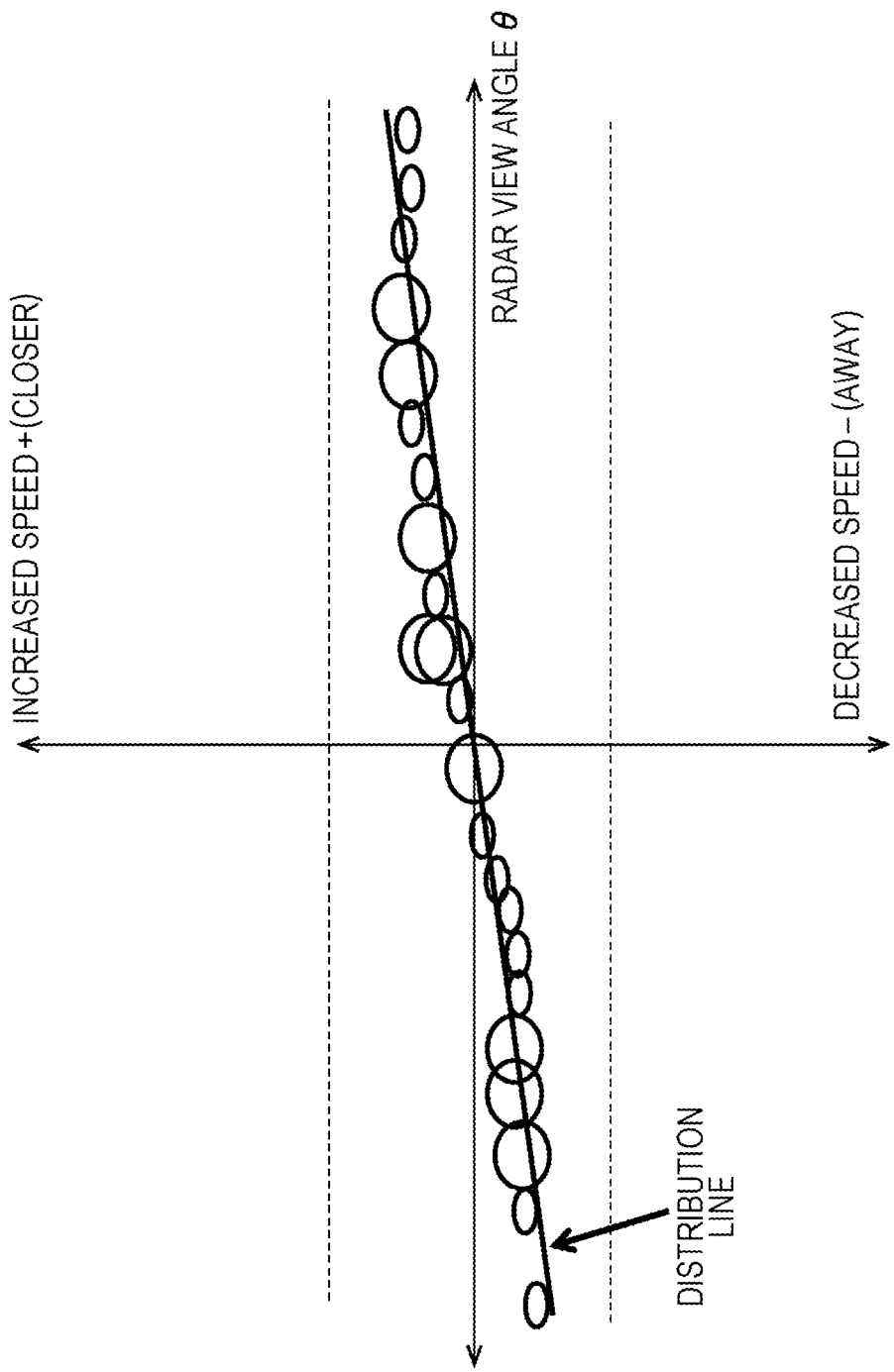

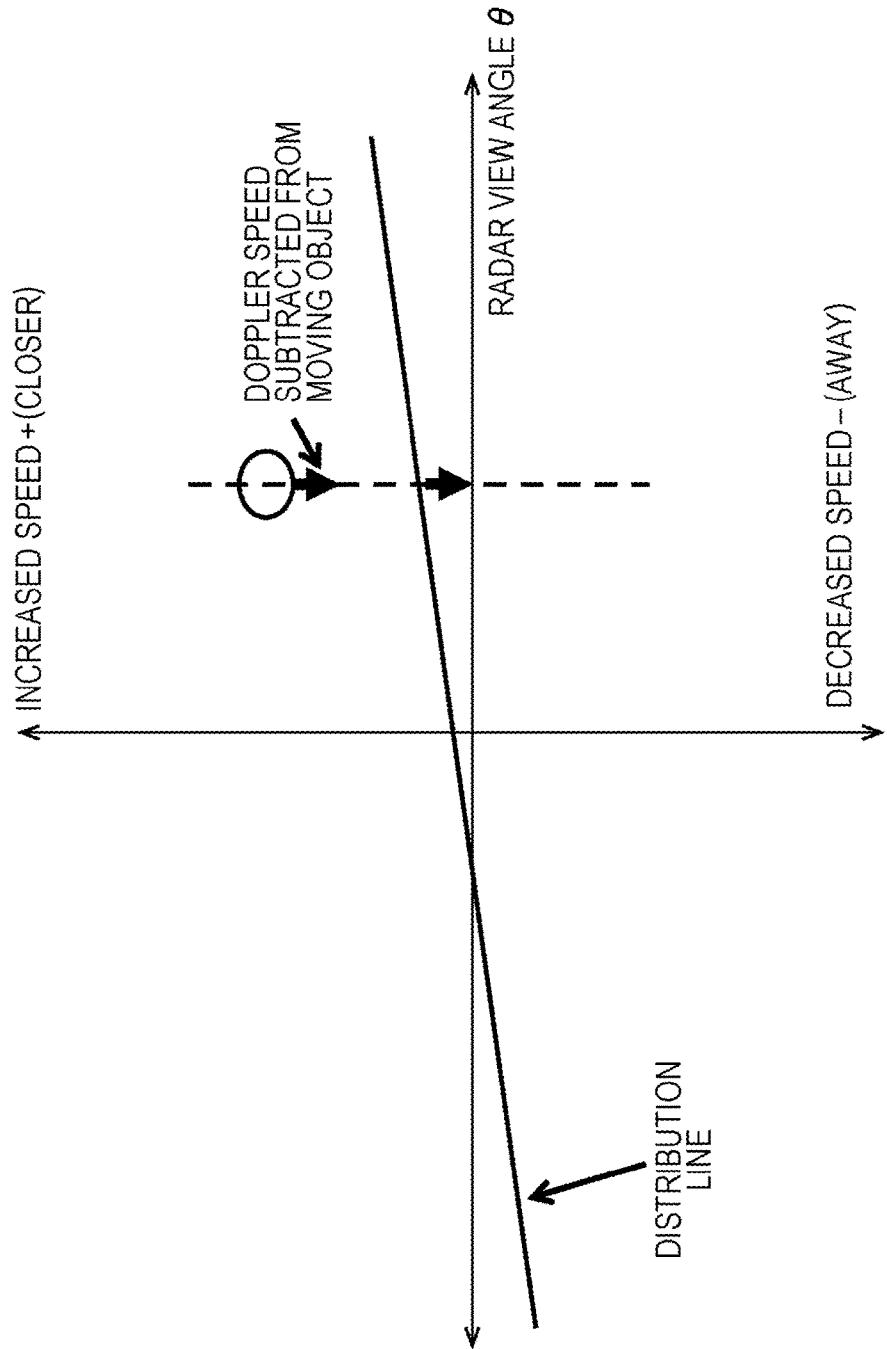

RADAR DEVICE, VEHICLE, AND MOVING OBJECT SPEED DETECTION METHOD

BACKGROUND

1. Technical Field

The present disclosure relates to a radar device installed in a moving object (e.g., a vehicle), the moving object in which the radar device is installed, and a moving object speed detection method of detecting a speed of travel of the moving object.

2. Description of the Related Art

There are known radar devices which receive returning signals reflected off of a target at an antenna array, and measure the phase difference of the reception signals received by reception antenna elements, thereby estimating a direction of arrival of returning signals from the target over a wide angle range.

Examples of related art relating to installing a radar device capable of wide angle range measurement in a moving object (e.g., a vehicle), and detecting the position and relative speed of a target in the perimeter, include Japanese Unexamined Patent Application Publication No. 2004-177289 and Japanese Unexamined Patent Application Publication No. 2010-043960.

A target speed calculating device shown in Japanese Unexamined Patent Application Publication No. 2004-177289 calculates, based on a radar device measuring relative speed Vr and an azimuth θr as to a target vehicle ahead of a subject vehicle, a vehicular speed sensor that detects vehicular speed Vs of the subject vehicle, and an azimuth θr of the object (target) which is to be measured by the radar device, an angle θ between the direction of travel of the vehicle and the azimuth of the object (=θr+θs). The speed Vo of the target is corrected to Vo=Vs×cos(θr+θs)−Vr at a computing unit, based on the relative speed Vr, speed Vs of the vehicle and the angle θ. Note that the angle θs between the direction of travel of the subject vehicle and the axle is calculated one combination out of the combinations "rudder angle sensor, vehicular speed sensor, and yaw rate sensor" and "vehicular speed sensor and side acceleration sensor".

Also, a vehicular moving state detection device shown in Japanese Unexamined Patent Application Publication No. 2010-043960 uses multiple side monitoring radar devices to identify stationary objects. Specifically, based on detection values of azimuth and relative speed for each electromagnetic wave reflection part, the vehicular moving state detection device uses an azimuth φ of an electromagnetic wave reflection part situated closest to the subject vehicle out of the electromagnetic wave reflection parts, and a relative speed Vd0, so as to correct the measurement value of relative speed Vd0 at the electromagnetic wave reflection part to Vd=Vd0×cos φ. In a case where the relative speed Vd after correction is equivalent to the detection value is equivalent to the detected value VO of the onboard speedometer, an aggregate of electromagnetic wave reflection parts is identified as being a stationary object. The azimuth φ of the electromagnetic wave reflection part is an azimuth with reference to the frontal direction of the subject vehicle (φ=0).

SUMMARY

Output values of a vehicular speed sensor installed onboard beforehand are used as the traveling speed (vehicular speed) of the subject vehicle, to calculate the corrected value Vo of the speed of the target in Japanese Unexamined Patent Application Publication No. 2004-177289, and the corrected value Vd of the relative speed of the electromagnetic wave reflection part in Japanese Unexamined Patent Application Publication No. 2010-043960, described above. The measurement error of the vehicular speed sensor tends to become larger the faster the traveling speed of the vehicle is, or the greater the acceleration is, which is problematic in that the detection precision of relative speed of a target (or electromagnetic wave reflection part) is insufficient.

One non-limiting and exemplary embodiment provides a radar device that suppresses measurement error in traveling speed of a moving object in which the radar device is mounted (e.g., a vehicle), and improves detection precision of the relative speed of the target.

In one general aspect, the techniques disclosed here feature a radar device mounted in a moving object. The radar transmitter that transmits a radio-frequency radar transmission signal from a transmission antenna, at each transmission cycle, and a radar receiver that receives a plurality of returning signals that are generated as a result of the radar transmission signal reflected off of a plurality of targets, by a plurality of reception antennas. The radar receiver includes a plurality of antenna brunch processors that perform correlation processing of the received returning signals and the radar transmission signal, and generate respective correlation signals each including arrival delay information of each of the received returning signals, an electric power profile generator that generates electric power profiles for each arrival direction of the received returning signals and Doppler frequency component, using the generated correlation signals, and a stationary object group distribution generator that, based on the generated electric power profiles, obtains a first distribution of Doppler frequency components of a stationary object group including a plurality of stationary objects as the plurality of targets in the perimeter of the moving object, for each azimuth angle.

According to the present disclosure, measurement error in traveling speed of a moving object in which the radar device is mounted (e.g., a vehicle) can be suppressed, and detection precision of the relative speed of the target improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3A is a diagram illustrating the relationship between transmission periods and transmission cycles of radar transmission signals, and FIG. 3B is a block diagram illustrating the internal configuration of another transmission signal generating unit.

FIG. 6A is a graph illustrating an output example of an electric power profile $F_{out}(k, f_s, \theta_u, w)$ at each distance/azimuth angle/Doppler frequency component, and FIG. 6B is a graph illustrating an example of an approximated line of Doppler frequency component $f\_N_{max}(\theta_u, w)$ in which the $f_s$ count value $N\_f\_N_{max}(\theta_u, w)$ in FIG. 6A, where electric power profile $F_{out}(k, f_s, \theta_u, w) > 0$, is greatest.

FIG. 7 is an explanatory diagram of a coordinates system as to the frontal direction (direction of travel) of a vehicle, in a case where the array antenna illustrated in FIG. 5 has been mounted to a vehicle CR.

FIG. 8 is a block diagram illustrating the internal configuration of the radar device according to a second embodiment in detail.

FIG. 26A is a diagram illustrating the relationship between the radar view angle θ obtained from an electric power profile and Doppler speed, FIG. 26B is a diagram illustrating the relationship between the radar view angle θ estimated from the traveling state of the vehicle and relative speed as to a stationary object, and FIG. 26C is a diagram illustrating distribution of electric power profile after performing correction processing using FIG. 26B.

FIG. 29 is a block diagram illustrating the configuration of a radar device according to the eighth embodiment.

FIG. 31 is a diagram illustrating a distribution line obtained as to an electric power profile extracted as a moving object, in a first modification of the eighth embodiment.

FIG. 32 is a diagram illustrating the relationship between the distribution line obtained in FIG. 31, and correction of the speed of the electric power profile extracted as a moving object, in the first modification of the eighth embodiment.

DETAILED DESCRIPTION

Figure 1:
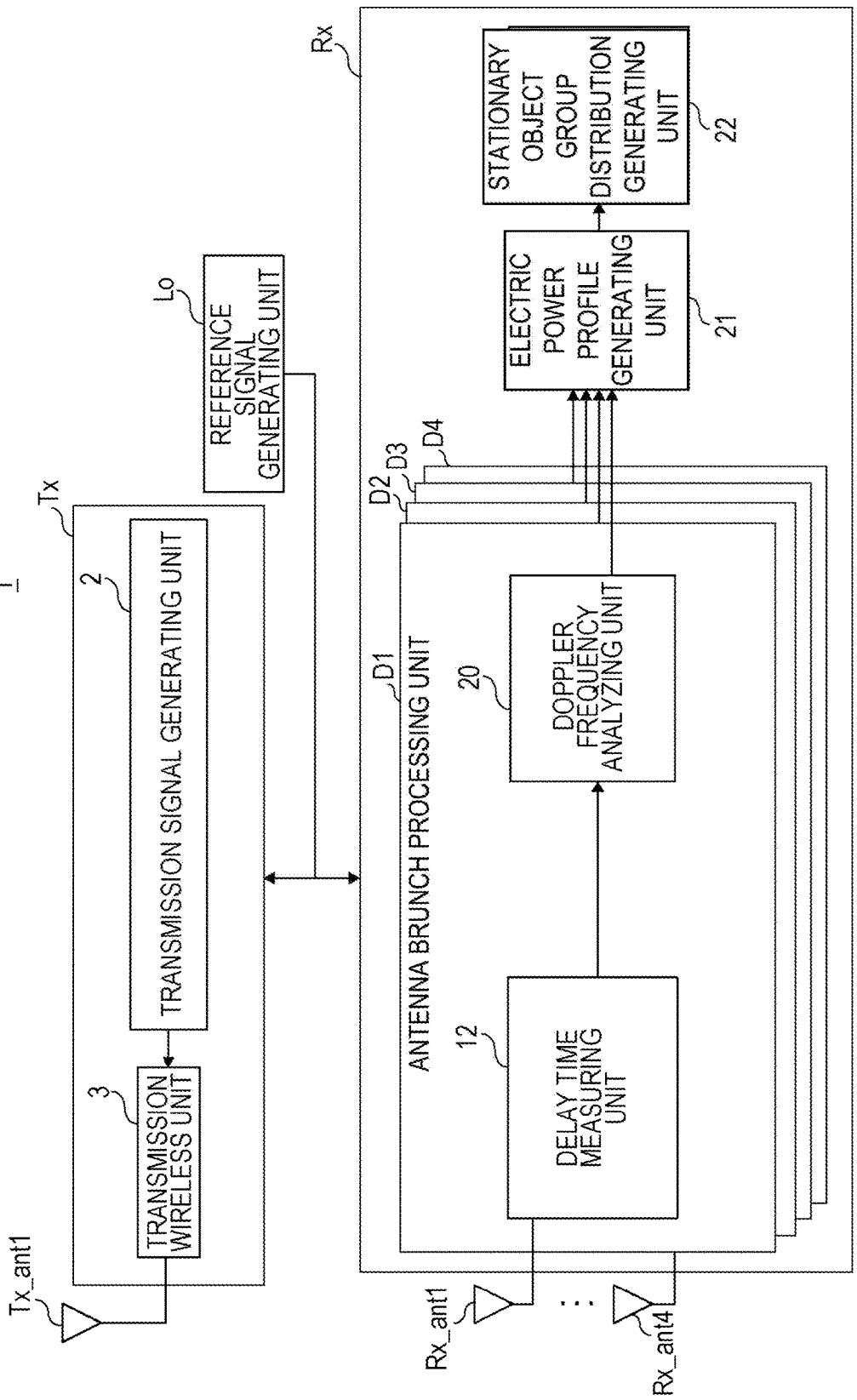
FIG. 1 is a block diagram illustrating the internal configuration of a radar device according to a first embodiment in brief.

Background Leading to the Content of the Embodiments of the Radar Device, Vehicle, and Moving Object Speed Detection Method According to the Present Disclosure First, the background leading to the content of the embodiments of the radar device, vehicle, and moving object speed detection method according to the present disclosure will be described, before describing the content of the embodiments of the radar device, vehicle, and moving object speed detection method according to the present disclosure.

A vehicular speed measurement value Vc acquired from a vehicular speed sensor installed in the vehicle beforehand, in the above-described Japanese Unexamined Patent Application Publication Nos. 2004-177289 and 2010-043960 includes vehicular speed measurement error due to the state of the vehicle (e.g., the state of wear of the tires of the vehicle), the state of travel of the vehicle (e.g., the state of sideslip of the vehicle when turning right and left), and the operating state of the vehicular speed sensor (e.g., delay in detection). Also, the faster the traveling speed of the vehicle is, and the greater the acceleration is, the greater the vehicular speed measurement error tends to be. That is to say, the vehicular speed measurement value Vc acquired from the vehicular speed sensor installed in the vehicle beforehand in the above-described Japanese Unexamined Patent Application Publication Nos. 2004-177289 and 2010-043960 includes error as to the actual vehicular speed, so the detection precision of relative speed of the target by the radar device deteriorates.

In a case where there is time delay until the vehicular speed measurement value Vc being obtained, the detection processing of the relative speed of the target by the radar device is delayed. In a case where the vehicle is accelerating, the vehicular speed charges, so the greater the difference between the time till the vehicular speed sensor detects the vehicular speed measurement value Vc and the time till the radar device detects the target is, the greater the deterioration in detection precision of the relative speed of the target by the radar device is.

Also, in a case where the vehicle is turning at an intersection, for example, or driving along a gentle curve, i.e., in a case where the vehicle is curving, Doppler frequency component shift occurs in the range (distance) direction of the radar device, in accordance with the moment of the vehicle. Accordingly, difference occurs between the Doppler frequency component estimated using the vehicular speed measurement value Vc acquired from the vehicular speed measurement sensor and the actual Doppler frequency component, so deterioration occurs in detection precision of the relative speed of the target by the radar device.

Note that when the vehicle is traveling along a straight road, the driver performs fine adjustments using the driving wheel to stay in the lane. However, the radius of curvature of the movement locus of the vehicle due to the fine adjustments by the driving wheel is sufficiently large to where movement of the vehicle due to the fine adjustments using the driving wheel to stay in the lane is determined to be the vehicle traveling straight.

Accordingly, examples of a radar device and moving object speed detection method where detection precision of the relative speed of a target is improved, will be described in the following embodiments. Embodiments of the radar device and moving object speed detection method according to the present disclosure will be described below with reference to the drawings.

First Embodiment

Figure 2:
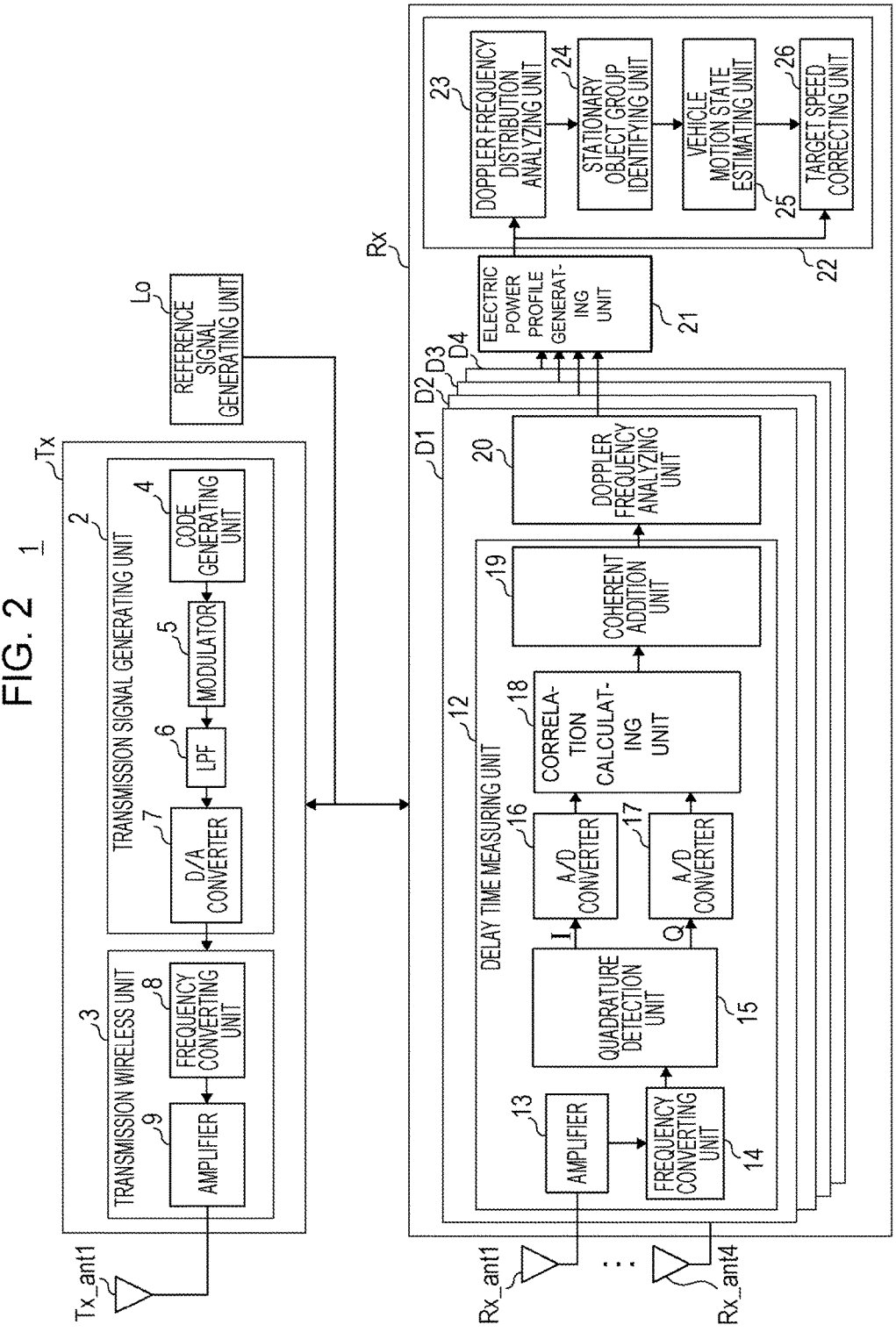
FIG. 2 is a block diagram illustrating the internal configuration of the radar device according to the first embodiment in detail.

The configuration and operations of a radar device 1 according to a first embodiment will be described with reference to FIGS. 1 through 5. FIG. 1 is a block diagram illustrating the internal configuration of the radar device 1 according to the first embodiment in brief. FIG. 2 is a block diagram illustrating the internal configuration of the radar device 1 according to the first embodiment in detail. FIG. 3A is a diagram illustrating the relationship between transmission periods and transmission cycles of radar transmission signals. FIG. 3B is a block diagram illustrating the internal configuration of another transmission signal generating unit.

The radar device 1 is installed in a moving object which travels straight or travels curving following a direction of travel (e.g., a vehicle CR, which is the same hereinafter) However, the moving object to which the radar device 1 is installed is not restricted to the vehicle CR, and includes motorcycles and autonomous robots, for example.

The radar device 1 transmits radio-frequency radar transmission signals generated at a radar transmission unit Tx from a transmission antenna Tx_ant1. The radar device 1 receives the radar transmission signals reflected off of a target (omitted from illustration) at an array antenna (e.g., four reception antennas Rx_ant1 through Rx_ant4 illustrated in FIG. 1) as returning signals. The radar device 1 uses the results of having performed signal processing on the returning signals received by the four reception antennas Rx_ant1 through Rx_ant4 to detect whether or not there is a target, and further estimates a vehicular speed $v_c$ of the vehicle CR to which the radar device 1 is mounted, and a relative speed $v_d$ of the target.

Note that the target is an object of detection by the radar device 1, including automobile and people for example, which is the same in the following embodiments hereinafter. Note that the reception antennas Rx_ant1 through Rx_ant4 may be reception antenna elements. The array antenna of the radar device 1 is not restricted to the four reception antennas Rx_ant1 through Rx_ant4.

First, description will be made in brief of the configurations of the parts of the radar device 1. The radar device 1 illustrated in FIG. 1 includes a reference signal generating unit Lo, the radar transmission unit Tx, and a radar reception unit Rx. The radar transmission unit Tx includes a transmission signal generating unit 2, and a transmission wireless unit 3 to which the transmission antenna Tx_ant1 is connected.

The reference signal generating unit Lo is connected to the radar transmission unit Tx and the radar reception unit Rx. The reference signal generating unit Lo supplies the radar transmission unit Tx and radar reception unit Rx with reference signals, thereby synchronizing the radar transmission unit Tx and the radar reception unit Rx.

The radar reception unit Rx includes, for example, four antenna brunch processing units D1, D2, D3, and D4, an electric power profile generating unit 21, and a stationary object group distribution generating unit 22. While the radar reception unit Rx illustrated in FIG. 1 includes the four antenna brunch processing units D1 through D4 in accordance with the number of reception antennas, for example, the number of the antenna brunch processing units is not restricted to four, and may be two or more. Note that the antenna brunch processing units D1 through D4 have the same configuration, so the antenna brunch processing unit D1 will be exemplarily described in the following embodiments. The antenna brunch processing unit D1 includes a delay time measuring unit 12 to which the reception antenna Rx_ant1 is connected, and a Doppler frequency analyzing unit 20.

Next, the operations of the parts of the radar transmission unit Tx and radar reception unit Rx illustrated in FIG. 1 will be described in detail.

The transmission signal generating unit 2 generates a transmission reference clock signal based on the reference signal generated by the reference signal generating unit Lo, where the reference signal has been multiplied to a predetermined multiple. The parts of the transmission signal generating unit 2 operate based on the transmission reference clock signal.

Figure 18:
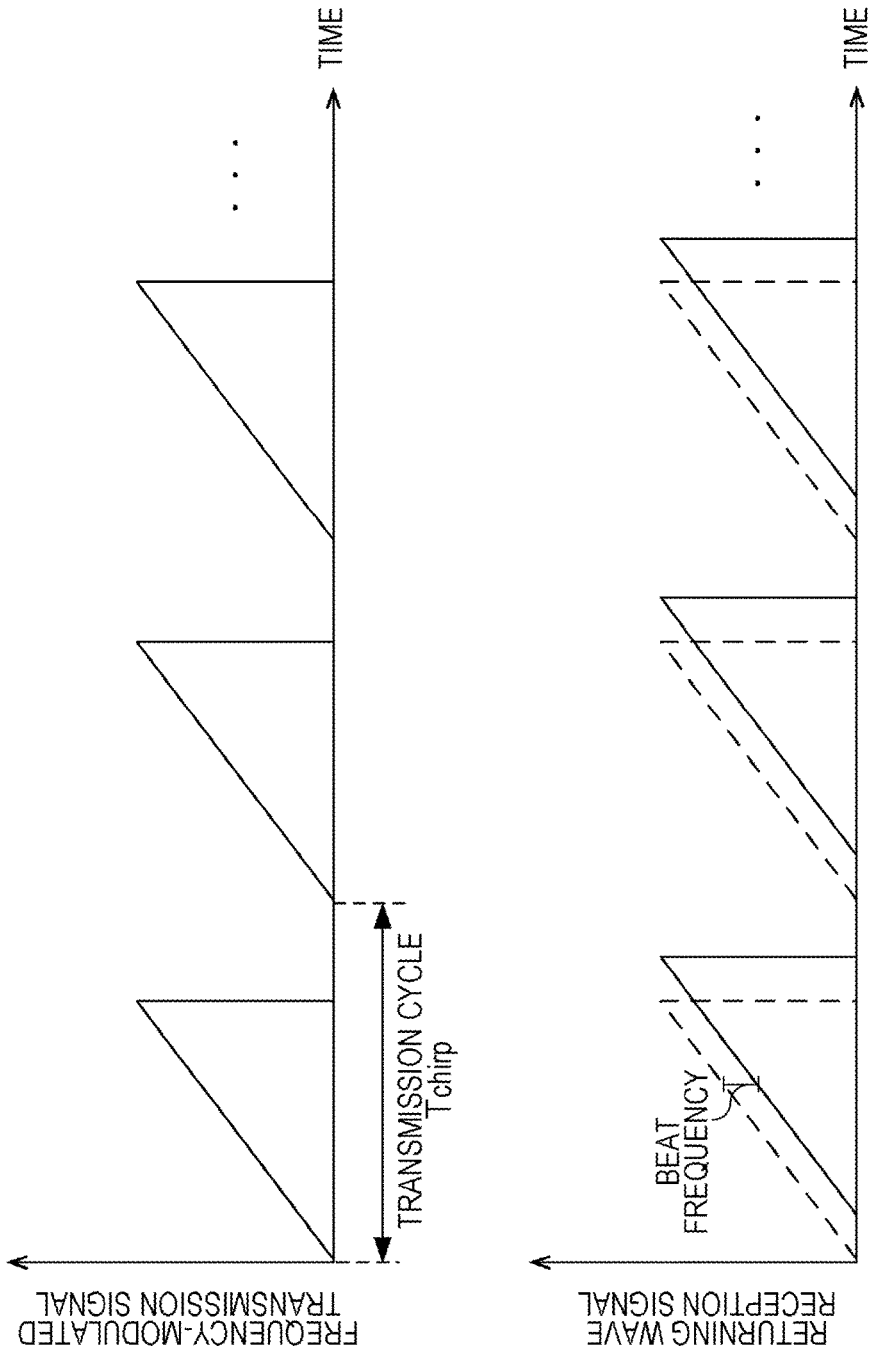
FIG. 18A is a diagram illustrating the relationship between frequency modulation transmission signals and transmission cycle.
FIG. 18B is a diagram illustrating received returning signals returning from a target of the frequency modulation transmission signals illustrated in FIG. 18A.

The baseband transmission signal generated by the transmission signal generating unit 2 may be a coded pulse such as illustrated in FIG. 3A or a chirp pulse illustrated in FIGS. 18A and 18B, being repeatedly transmitted according to a predetermined transmission frequency.

The transmission wireless unit 3 upconverts the transmission signal generated by the transmission signal generating unit 2 to generate a carrier frequency band (e.g., millimeter wave band) radar transmission signal. The transmission antenna Tx_ant1 emits the radar transmission signal generated by the transmission wireless unit 3 into space.

The reception antenna Rx_ant1 receives returning signals which are the radar transmission signals transmitted by the radar transmission unit Tx and reflected off of the target. The radio-frequency radar reception signals which the reception antenna Rx_ant1 has received are input to the delay time measuring unit 12.

The delay time measuring unit 12 downconverts the radar reception signals which the reception antenna Rx_ant1 has received, thereby generating baseband reception signals. The delay time measuring unit 12 performs correlation computation between the reception signals input from the reception antenna Rx_ant1 and the transmission signals at each transmission cycle, and measures the reception delay time of the returning signals reflected off of the target, i.e., a delay time τ from the transmission start time of the radar transmission signal.

The Doppler frequency analyzing unit 20 performs coherent addition processing on the output of each reception delay time, using phase shift according to multiple Doppler frequency components $f_s \Delta \theta$ as correction coefficients. Accordingly, the Doppler frequency analyzing unit 20 outputs coherent addition processing results of multiple Doppler frequency components at each arrival delay time. Note that the output of each correction coefficient and reception delay time is obtained at each transmission cycle or an integer multiple thereof.

The electric power profile generating unit 21 is input with the coherent addition calculation processing results of multiple Doppler frequency components each arrival delay time, and configures a correlation vector h. Note that the coherent addition calculation processing results are input from the antenna brunch processing units D1 through D4 at each transmission cycle or an integer multiple thereof.

In a case where the correlation vector h satisfies predetermined conditions, the electric power profile generating unit 21 obtains electric power profile $F_{out}$ for each distance/ azimuth angle/Doppler frequency component in returning signals reflected off of the target, by computing the square of the inner product of the correlation vector h and a directional vector "a" stored beforehand. On the other hand, in a case where the correlation vector h does not satisfy predetermined conditions, the electric power profile generating unit 21 obtains the electric power profile $F_{out}$ for each distance/ azimuth angle/Doppler frequency component as 0 (zero).

The stationary object group distribution generating unit 22 obtains the distribution of Doppler frequency components of a stationary object group including multiple stationary objects in the perimeter, for each azimuth angle with the vehicle CR as a reference, based on the electric power profile $F_{out}$ (electric power profile of the returning signals) input from the electric power profile generating unit 21.

The stationary object group distribution generating unit 22 analyzes the Doppler frequency distribution for each azimuth angle, based on the electric power profile $F_{out}$ obtained from the electric power profile generating unit 21 (See FIG. 6A). FIG. 6A is a graph illustrating an output example of the electric power profile $F_{out}$ for each distance/ azimuth angle/Doppler frequency component. FIG. 6A shows the electric power profile $F_{out}$ obtained from the electric power profile generating unit 21 for each discrete time k, azimuth angle in increments of radians, and Doppler frequency component $f_s$. The stationary object group distribution generating unit 22 obtains an approximation curve (distribution) of Doppler frequency components of the stationary object group, for each azimuth angle, as the distribution of Doppler frequency components of the stationary object group for each azimuth angle (see FIG. 6B).

Next, the configuration of the parts of the radar transmission unit Tx will be described in detail with reference to FIG. 2. The radar transmission unit Tx illustrated in FIG. 2 includes the transmission signal generating unit 2, and the transmission wireless unit 3 to which the transmission antenna Tx_ant1 is connected.

The transmission signal generating unit 2 includes a code generating unit 4, a modulator 5, a low pass filter (LPF) 6, and a digital analog (D/A) converting unit 7. The LPF 6 in FIG. 2 may be disposed externally from the transmission signal generating unit 2. The output of the LPF 6 is input to the D/A converter 7. The transmission wireless unit 3 includes a frequency converting unit 8 and an amplifier 9.

Now, a case of using coded pulses in the transmission signal generating unit 2 will be described. First, the coded pulses illustrated in FIG. 3A will be described. In a transmission period Tw (in increments of seconds) of a transmission cycle Tr, for example, modulation is performed using No samples of transmission reference clock signals per code of a code sequence $C_n$, having a code length L. Here, n is 1 through L (>0). L (an integer) represents the code length of the code sequence $C_n$.

The sampling rate at the transmission signal generating unit 2 is (No×L)/Tw, the transmission signal generating unit 2 performing modulation using Nr (=No×L) samples in a transmission period Tw (seconds) of a transmission cycle Tr. The transmission signal generating unit 2 performing modulation using Nu samples in a period without signal (Tr−Tw) (seconds) of a transmission cycle Tr.

The transmission signal generating unit 2 periodically generates baseband transmission signals r(k, M) illustrated in Expression (1), by modulation of the code sequence $C_n$ of the code length L. Here, j is an imaginary unit satisfying $j^2 = -1$, time k is a discrete time with the start timing of the transmission cycle Tr as a reference (k=1), k being a discrete value from 1 to (Nr+Nu), serving as a point-in-time representing the timing of generating the transmission signals (sample timing).

M represents the ordinal of the transmission cycle Tr of radar transmission signals. Transmission signal r(k, M) represents a transmission signal at discrete time k in at the M'th transmission cycle Tr, being the addition results of in-phase signal component I(k, M), and orthogonal signal component Q(k, M) multiplied by the imaginary unit j (see Expression (1)).

$$r(k,M)=I(k,M)+jQ(k,M) \quad (1)$$

The code generating unit 4 generates transmission code of the code sequence $C_n$, of code length L at each transmission cycle Tr. The elements of the code sequence $C_n$ are configured using the two values of −1 and 1, or the four values of 1, −1, j, and −j, for example. This transmission code is preferably code including at least one of a code sequence making up a pair of complementary codes, a Barker code sequence, a pseudorandom noise (PN) code, a Golay code sequence, an M-sequence code, and a code sequence making up a Spano code, so that the radar reception unit Rx will exhibit low side lobe characteristics. The code generating unit 4 outputs the transmission code of the generated code sequence $C_n$ to the modulator 5. Hereinafter, "transmission code of the code sequence $C_n$" will be written as "transmission code $C_n$" for sake of convenience.

In a case of generating a pair of complementary codes (e.g., Golay code sequence, Spano code sequence) as the transmission code $C_n$, the code generating unit 4 generates each of transmission codes $P_n$ and $Q_n$ which are alternately a pair each transmission cycle, using two transmission cycles (2Tr). That is to say, at the M'th transmission cycle, the code generating unit 4 generates and outputs to the modulator 5 the one transmission code $P_n$ making up the pair of complementary codes, and at the subsequent (M+1)'th transmission cycle, generates and outputs to the modulator 5 the other transmission code $Q_n$ making up the pair of complementary codes. In the same way, at the (M+2)'th and subsequent transmission cycles, the code generating unit 4 repeatedly generates and outputs to the modulator 5 the transmission codes $P_n$ and $Q_n$, with the two transmission cycles of the M'th and (M+1)'th as a single unit.

The modulator 5 performs pulse modulation of the transmission code $C_n$ which the code generating unit 4 has generated, and generates the baseband transmission signal r(k, M) shown in Expression (1). The pulse modulation is amplitude modulation, ASK (Amplitude Shift Keying), or phase modulation (PSK (Phase Shift Keying)), which is the same in the following embodiments.

For example, phase modulation (PSK) is binary phase shift keying (BPSK) for phase modulation if the code sequence $C_n$ is the two values of −1 and 1 for example, and is quadrature phase shift keying (QPSK) or 4-phase PSK if the code sequence $C_n$ is the four values of 1, −1, j, and −j, for example. That is to say, a predetermined modulation symbol in a constellation on an IQ plane is assigned in phase modulation (PSK).

The modulator 5 outputs, of the transmission signals r(k, M), transmission signals r(k, M) equal to or below a control band set beforehand, to the D/A converter 7 via the LPF 6. Note that the LPF 6 may be omitted from the transmission signal generating unit 2 and provided downstream from the D/A converter 7, which is true in the following embodiments as well.

The D/A converter 7 converts the digital transmission signals r(k, M) generated by the modulator 5 into analog transmission signals. The D/A converter 7 outputs the analog transmission signals to the transmission wireless unit 3.

The transmission wireless unit 3 generates a transmission reference signal of a carrier frequency band based on the reference signal generated by the reference signal generating unit Lo, where the reference signal has been multiplied to a predetermined multiple. Note that the multiplied signals may be signals multiple to the different multiplications at the transmission signal generating unit 2 and transmission wireless unit 3, or may be multiplied to the same multiple. The parts of the transmission wireless unit 3 operate based on the transmission reference signal.

The frequency converting unit 8 upconverts the transmission signals r(k, M) generated by the transmission signal generating unit 2, thereby generating a carrier frequency band (e.g., millimeter wave band) radar transmission signal. The frequency converting unit 8 outputs the radar transmission signals to the amplifier 9.

The amplifier 9 amplifies the signal level of the radar transmission signals generated by the frequency converting unit 8 to a predetermined signal level, and outputs to a transmission antenna Tx_ant1. The radar transmission signals which the amplifier 9 has amplified are emitted into space via the transmission antenna Tx_ant1.

The transmission antenna Tx_ant1 emits the radar transmission signals generated by the transmission wireless unit 3 into space. The radar transmission signals are transmitted during the transmission period $T_W$ out of the transmission cycle $T_r$, but are not transmitted during a non-transmission period ($T_r$−$T_W$) (see FIG. 3A).

Note that the transmission wireless unit 3 and the delay time measuring unit 12 of the antenna brunch processing units D1 through D4 are input in common with the reference signal generated by the reference signal generating unit Lo. The transmission wireless unit 3 operates based on the transmission reference signal where the reference signal has been multiplied to a predetermined multiple, and the delay time measuring unit 12 of the antenna brunch processing units D1 through D4 operates based on the transmission reference signal where the reference signal has been multiplied to the same predetermined multiple as with the transmission wireless unit 3. Accordingly, the transmission wireless unit 3 and the delay time measuring unit 12 of the antenna brunch processing units D1 through D4 operate synchronously.

Note that the transmission signal generating unit 2 may be a transmission signal generating unit 2r which does not have the code generating unit 4, modulator 5, and LPF 6, and which has a transmission code storage unit CM that stores beforehand the code sequence $C_n$, generated by the transmission signal generating unit 2 (See FIG. 3B).

The transmission code storage unit CM may store a pair of complementary codes, transmission codes $P_n$ and $Q_n$, for example, corresponding to a case where the transmission signal generating unit 2 generate transmission code which is a pair of complementary codes. The configuration of the transmission signal generating unit 2r illustrated in FIG. 3B is not restricted to the present embodiment, and can also be applied to the later-described embodiments as well. The transmission signal generating unit 2r includes the transmission code storage unit CM and the D/A converter 7.

The transmission code storage unit CM repeatedly reads out the code sequence $C_n$, or the transmission codes $P_n$ and $Q_n$ making up the pair of complementary codes, at each transmission cycle Tr, and outputs to the D/A converter 7, based on the transmission reference clock signal. The subsequent operations as the same as the operations of the D/A converter 7 described above, so description thereof will be omitted. Note that the transmission reference clock signal is the reference signal generated by the reference signal generating unit Lo that has been multiplied to a predetermined multiple.

Next, the configuration of the parts of the radar reception unit Rx will be described with reference to FIG. 2. The radar reception unit Rx illustrated in FIG. 2 includes four antenna brunch processing units D1, D2, D3, and D4 provided in accordance with the number (four in the case of FIG. 2, for example) of reception antennas making up the array antenna, the electric power profile generating unit 21, and, as the stationary object group distribution generating unit 22, a Doppler frequency distribution analyzing unit 23, a stationary object group identifying unit 24, a vehicle motion state estimating unit 25, and a target speed correcting unit 26.

The antenna brunch processing unit D1 includes the delay time measuring unit 12 to which the reception antenna Rx_ant1 has been connected, and the Doppler frequency analyzing unit 20. The delay time measuring unit 12 includes an amplifier 13, a frequency converting unit 14, a quadrature detecting unit 15, two A/D converters 16 and 17, a correlation calculating unit 18, and a coherent addition unit 19. The radar reception unit Rx periodically computes the transmission cycles Tr of the radar transmission signals as the signal processing periods of the antenna brunch processing units D1 through D4 at the delay time measuring unit 12.

Figure 4:
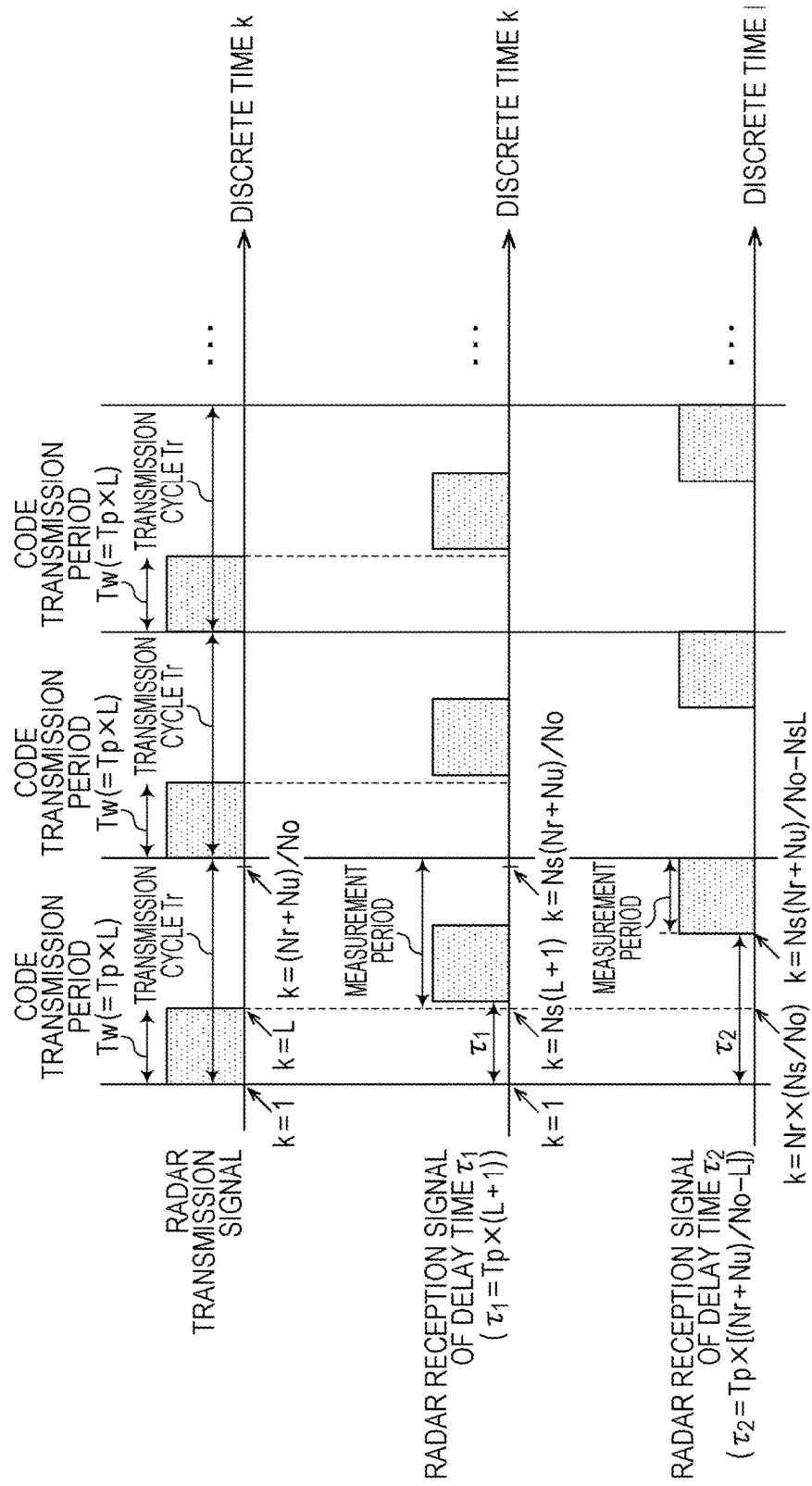
FIG. 4 is a diagram illustrating the relationship between radar transmission signals, radar reception signals at delay time τ1, and radar reception signals at delay time τ2.
Figure 5:
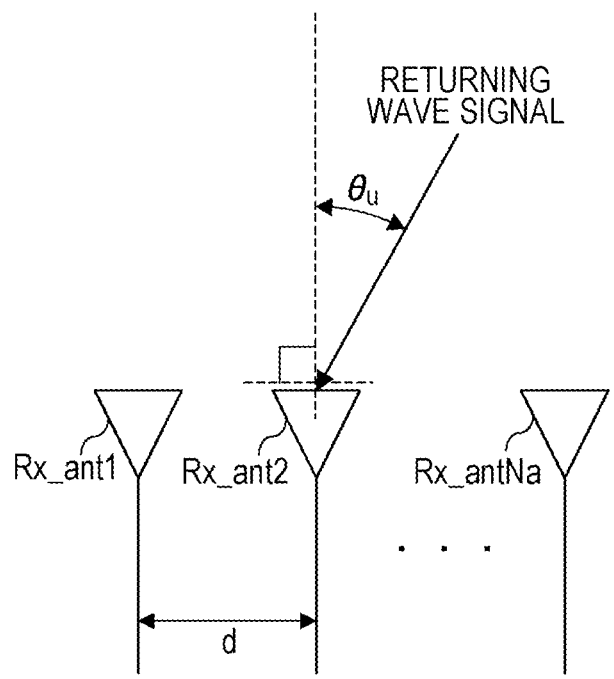
FIG. 5 is an explanatory diagram illustrating the relationship between the placement and azimuth angle $\theta_u$ of reception antenna elements making up an array antenna.

Next, the operations of the parts of the radar reception unit Rx will be described in detail with reference to FIG. 2, FIG. 4, and FIG. 5. FIG. 4 is a diagram illustrating the relationship between radar transmission signals, radar reception signals at delay time $\tau 1$, and radar reception signals at delay time $\tau 2$. FIG. 5 is an explanatory diagram illustrating the relationship between the placement and azimuth angle $\theta_u$ of the reception antenna elements reception antenna Rx_ant1 through Rx_ant4 making up the array antenna.

The reception antenna Rx_ant1 receives returning signals which are the radar transmission signals transmitted by the radar transmission unit Tx that have reflected off of the target. The radio-frequency radar reception signals received by the reception antenna Rx_ant1 are input to the delay time measuring unit 12.

In the same way as the transmission wireless unit 3, the delay time measuring unit 12 generates a reception reference signal of a carrier frequency band based on the reference signal generated by the reference signal generating unit Lo, where the reference signal has been multiplied to a predetermined multiple. The parts of the delay time measuring unit 12 operate based on the reception reference signal.

The amplifier 13 amplifies the signal level of the radar reception signal received by the reception antenna Rx_ant1 to a predetermined signal level, and outputs to the frequency converting unit 14.

The frequency converting unit 14 downconverts the radio-frequency radar reception signals to baseband, using the radar reception signals amplified by the amplifier 13 and the reception reference signal, thereby generating baseband receptions signals. The frequency converting unit 14 outputs the baseband reception signals to the quadrature detecting unit 15.

The quadrature detecting unit 15 generates reception signals configured using in-phase signals and quadrate signals, by performing quadrate detection of the baseband reception signals generated by the frequency converting unit 14. Of the baseband reception signals, the quadrature detecting unit 15 outputs the in-phase signals to the A/D converter 16 and the quadrate signals to the A/D converter 17.

The A/D converter 16 samples the baseband in-phase signals generated by the quadrature detecting unit 15 at each discrete time k, and converts the analog data in-phase signals into digital data. The A/D converter 16 outputs the in-phase signal component of the digital data to the correlation calculating unit 18.

The A/D converter 16 samples Ns transmission signals r(k, M) generated by the radar transmission unit Tx per pulse width (pulse duration) Tp (=Tw/L). That is to say, the sampling rate of the A/D converter 16 is (Ns×L)/Tw=Ns/Tp, so the number of oversamples per pulse is Ns.

The A/D converter 17 operates in the same way as the A/D converter 16 regarding the baseband quadrate signals generated by the quadrature detecting unit 15, and outputs the quadrate signal component of the digital data to the correlation calculating unit 18. The sampling rate of the A/D converter 17 is Ns/Tp, so the number of oversamples per pulse is Ns.

The baseband reception signal of the M'th transmission cycle Tr at discrete time k, as the output of the A/D converters 16 and 17, is expressed as complex signal x(k, M) in Expression (2), using in-phase signal component Ir(k, M) and quadrate signal component Qr(k, M).

$$x(k,M)=Ir(k,M)+jQr(k,M) \qquad (2)$$

The timing chart at the first tier in FIG. 4 represents the transmission timing of radar transmission signals. In the timing chart at the first tier in FIG. 4, the delay time measuring unit 12 cyclically operates according to a signal processing period from discrete time k=1, i.e., the start timing of each transmission cycle Tr, to k=Ns (Nr+Nu)/No which is the sample timing one sample before the transmission cycle Tr ends.

That is to say, the delay time measuring unit 12 cyclically operates at discrete time k=1 through Ns (Nr+Nu)/No (see the second tier in FIG. 4). The timing chart at the second tier in FIG. 4 is a timing chart indicating the reception timing of radar reception signals at delay time $\tau_1$. The timing chart at the third tier in FIG. 4 is a timing chart indicating the reception timing of radar reception signals at delay time $\tau_2$. Discrete time k=Nr×(Ns/No) indicates the point in time immediately before the end of the transmission period Tw in each transmission cycle Tr. Hereinafter, the digital reception signal x(k, M) as the output of A/D converters 16 and 17 will be referred to as discrete sample value x(k, M).

The correlation calculating unit 18 periodically generates the transmission code $C_n$ of code length L based on the reception reference clock signal, at each discrete time k. Here, n is an integer of 1 through L, L representing the code light of the code sequence $C_n$. Note that the reception reference clock signal is a signal where the reference signal generated by the reference signal generating unit Lo has been multiplied to a predetermined multiple.

The correlation calculating unit 18 computes a sliding correlation value AC(k, M) of the discrete sample value x(k, M) serving as the reception signal, and the transmission code $C_n$, thereby measuring the delay time $\tau$ from the start of transmission of the radar transmission signals. AC(k, M) represents the sliding correlation value of the M'th transmission cycle at discrete time k. Note that the discrete sample value x(k, M) is also the discrete sample values Ir(k, M) and Qr(k, M) as the output of the A/D converters 16 and 17, as well.

Specifically, the correlation calculating unit 18 computes the sliding correlation value AC(k, M) for each transmission cycle Tr shown in the timing chart at the second tier in FIG. 4, i.e., with regard to each discrete time k=1 through Ns (Nr+Nu)/No, according to Expression (3). The correlation calculating unit 18 outputs the sliding correlation value AC(k, M) for each discrete time k computed according to Expression (3), to the coherent addition unit 19. The * (asterisk) in Expression (3) is a complex conjugate operator.

$$AC(k, M) = \sum_{n=1}^{L} x(k + Ns(n-1), M)C_n^*  \quad (3)$$

The timing chart at the second tier in FIG. 4 shows the range of the measurement period at the radar reception unit Rx in a case where a radar reception signal has been received after the delay time $\tau_1$ has elapsed from starting transmission of the radar transmission signal. The timing chart at the third tier in FIG. 4 shows the range of the measurement period at the radar reception unit Rx in a case where a radar reception signal has been received after the delay time $\tau_2$ has elapsed from starting transmission of the radar transmission signal. The delay times $\tau_1$ and $\tau_2$ are shown in Expression (4) and Expression (5), respectively.

$$\tau_1 = Tp \times (L + 1) \quad (4)$$

$$\tau_2 = Tp \times \left\{ \frac{(Nr + Nu)}{No} - L \right\} \quad (5)$$

Note that the correlation calculating unit 18 may restrict the measurement range, i.e., the range of the discrete time k indicating the computation range of the sliding correlation value AC(k, M), according to the range of existence of the target which is to be measured by the radar device 1. Accordingly, the computation amount of the correlation calculating unit 18 can be reduced, so the amount of electric power consumed by the radar reception unit Rx can be reduced in the radar device 1 by reducing the amount of computation at the delay time measuring unit 12.

In a case of the correlation calculating unit 18 of the radar device 1 computing the sliding correlation value AC(k, M) in the range of discrete time k=Ns(L+1) through Ns(Nr+Nu)/No−NsL, the transmission period Tw of the transmission cycle Tr of radar transmission signals may be excluded from the measurement period.

Even in a case where radar transmission signals directly wrap around from the radar transmission unit Tx to the radar reception unit Rx, the effects of wraparound can be excluded from measurement in the radar device 1. Also, in a case of restricting a measurement range (range of discrete time k), the coherent addition unit 19, Doppler frequency analyzing unit 20, electric power profile generating unit 21, Doppler frequency distribution analyzing unit 23, stationary object group identifying unit 24, vehicle motion state estimating unit 25, and target speed correcting unit 26 also operate in the same restricted measurement range, so the amount of processing of each part can be reduced, and the electric power consumption at the radar reception unit Rx can be reduced even further.

The coherent addition unit 19 which services as a first coherent addition unit performs coherent addition (in-phase addition) of the sliding correlation value AC(k, M) over a predetermined number of times (Np times) of the transmission cycle Tr period (Np×Tr). Note that the sliding correlation value AC(k, M) is the correlation value which the correlation calculating unit 18 computes for the M'th transmission cycle Tr every discrete time k.

Specifically, the coherent addition unit 19 computes a coherent addition value CI(k, m) following Expression (6) by adding the sliding correlation value AC(k, M) over a predetermined number of times (Np times) of the transmission cycle Tr period (Np×Tr) every discrete time k. Np is a predetermined value representing the number of times of addition at the coherent addition unit 19, and m represents the ordinal of the coherent addition output of each coherent addition times count Np at the coherent addition unit 19 of each antenna brunch processing unit. For example, if m=1, this represents the first coherent addition output that is output from the coherent addition unit 19. The coherent addition unit 19 outputs the coherent addition value CI(k, m) to the Doppler frequency analyzing unit 20.

$$CI(k, m) = \sum_{g=1}^{Np} AC(k, Np(m-1) + g) \quad (6)$$

The adding of the sliding correlation value AC(k, M) for Np times by the coherent addition unit 19 enables the coherent addition unit 19 to suppress noise component included in the returning signals, by performing addition including the phase of time periods in which returning signals from the target have a high level of correlation, and thus the reception quality (sound/noise ratio, hereinafter "SNR") of the returning signals can be improved. Being able to improve the reception quality of the returning signals means that the coherent addition unit 19 can improve the precision of estimating the direction of arrival of returning signals from the target.

In order to obtain ideal additional gain, the phase component of the sliding correlation value AC(k, M) has to come within a certain range in the addition times count Np adding period of the sliding correlation value AC(k, M). That is to say, in a case where the target moves, phase shift occurs along with the movement, so the addition times count Np is preferably set based on the assumed maximum movement speed of the target.

The larger the assumed maximum movement speed of the target is, the greater the amount of shift of Doppler frequency contained in the returning signals from the target is, and accordingly the sorter the discrete time intervals having high correlation value will be. Accordingly, the addition times count Np becomes smaller, and the effect of improved coherent addition gain at the coherent addition unit 19 is diminished.

Note that in the embodiments including the present embodiment, providing the coherent addition unit 19 upstream of the Doppler frequency analyzing unit 20 yields the advantage the number of times of addition at the Doppler frequency analyzing unit 20 can be reduced, but a configuration may be made where the coherent addition unit 19 is not provided. While operations using a configuration including the coherent addition unit 19 will be described in the embodiments including the present embodiment, the coherent addition unit 19 is not indispensable, and the advantages of the radar device 1 according to the present embodiment can be obtained even if the coherent addition unit 19 is not provided. Note that the operations in a case of not providing the coherent addition unit 19 are the same as the coherent addition times count being Np=1 at the coherent addition unit 19, with not difference in the subsequent description and similar advantages can be obtained.

The Doppler frequency analyzing unit 20 serving as a second coherent addition unit performs coherent addition in increments of coherent addition results CI(k, Nc (w−1)+1) through CI(k, Nc×w) (see Expression (8)), using the phase shift θ($f_s$) (see Expression (7)) as a correction coefficient. Note that the phase shift θ($f_s$) is a value corresponding to 2Nf different Doppler frequency components $f_s$Δθ, and that coherent addition results CI(k, Nc (w−1)+1) through CI(k, Nc×w) are Nc outputs of the coherent addition unit 19 obtained at each discrete time k. The Doppler frequency analyzing unit 20 outputs the coherent addition results of the number of times according to the coherent addition times count Nc to the electric power profile generating unit 21. The Δθ here is a parameter to adjust the range of the Doppler frequency components being detected, and is a value set beforehand in accordance with the assumed range of Doppler frequency components of the target, and is an increment of phase rotation (predetermined value).

$$\theta(f_s) = 2\pi f_s(Tr \times Np)\Delta\theta \tag{7}$$

$$FT\_CI^{Nant}(k, f_s, w) = \sum_{q=1}^{Nc} CI(k, Nc(w-1)+q)\exp[-jq\theta(f_s)] \tag{8}$$

$$= \sum_{q=1}^{Nc} CI(k, Nc(w-1)+q)\exp[-jq2\pi f_s TrNp)]$$

The computation shown in Expression (8) is equivalent to discrete Fourier transform processing of the output of the coherent addition unit 19, with the sampling interval Tm=(Tr×Np) and the sampling frequency fm=1/Tm. w is an integer of 1 or larger, and represents the number of times of repetition of the transmission cycle Tr per Np×Nc times. For example, if w=1, this represents a total of Np×Nc transmission cycles Tr from the first transmission cycle Tr to the (Np×Nc)'th transmission cycle Tr. That is to say, each time the transmission cycle Tr is repeated Np×Nc times, the Doppler frequency analyzing unit 20 outputs the coherent addition results shown in Expression (8) to the electric power profile generating unit 21.

In Expression (8), Nant is the ordinal (number) of the antenna brunch processing unit, i.e., 1 through Na (constant), Na=4 for the radar reception unit Rx illustrated in FIG. 2, for example. Further, the exponential portion (exp component) of Expression (8) represents the amount of cancellation to cancel out the phase shift θ($f_s$). The phase shift θ($f_s$) is included in the returning signals in accordance with movement of the target, and is a value corresponding to 2Nf different Doppler frequency components $f_s$Δθ. Also, q is a natural number of 1 through Nc, representing the range of the number of times of coherent addition at the Doppler frequency analyzing unit 20.

FT_CI$^{Nant}$(k, $f_s$, w) represents the with output of the Doppler frequency analyzing unit 20, representing the coherent addition results corresponding to the Doppler frequency component $f_s$Δθ of the Nant'th antenna brunch processing unit at discrete time k. Also, k is 1 through ((Nr+Nu)×Ns/No), $f_s$ is −Nf+1, . . . , 0, . . . , Nf, and j is an imaginary unit.

Accordingly, FT_CI$^{Nant}$(k, −Nf+1, w) through FT_CI$^{Nant}$(k, Nf, w), which are the coherent addition results, are obtained by the computation of Expression (8) at each period (Tr×Np×Nc) which is (Np×Nc) times the transmission cycle Tr, at each of the antenna brunch processing units D1 through D4. A coherent addition result is a value corresponding to the 2Nf Doppler frequency components $f_s$Δθ at each discrete time k.

Also, fast Fourier transform (FFT) can be applied to the computation shown in Expression (8) by setting Nf to a number which is a power of 2, in a region where Nf>Nc and q>Nc, by zero padding where CI(k, Nc (w−1)+q)=0. Thus, the computation processing amount of the radar device 1 can be reduced. Note that an arrangement may be made where the Doppler frequency analyzing unit 20 does not use fast Fourier transform processing, but rather performs the computation processing shown in Expression (8) by generating a coefficient exp[−jq2π$f_s$TrNp] corresponding to $f_s$=−Nf+1, . . . , 0, . . . , Nf and then performing the computation sequentially. Here, q=1 through Nc. Note that the computation processing shown in Expression (8) is CI(k, Nc (w−1)+q), which is Nc outputs of the coherent addition unit 19 obtained each discrete time k, for example.

The FT_CI$^1$(k, $f_s$, w) through FT_CI$^{Na}$(k, $f_s$, w), which are the output of the Doppler frequency analyzing units of the antenna brunch processing units D1 through D4, are input to the electric power profile generating unit 21 as correlation vector h(k, $f_s$, w) (see Expression (9)).

$$h(k, f_s, w) = \begin{bmatrix} FT\_CI^1(k, f_s, w) \\ FT\_CI^2(k, f_s, w) \\ \vdots \\ FT\_CI^{Na}(k, f_s, w) \end{bmatrix} \tag{9}$$

Note that instead of the correlation vector h(k, $f_s$, w) shown in Expression (9), a correlation vector h(k, $f_s$, w) using one antenna brunch processing unit of the multiple antenna brunch processing units D1 through D4 as a reference, may be input to the electric power profile generating unit 21 (see Expression (10)). In Expression (10), the superscript suffix asterisk (*) represents a complex conjugate operator.

$$h(k, f_s, w) = \begin{bmatrix} FT\_CI^1(k, f_s, w) \\ FT\_CI^2(k, f_s, w) \\ \vdots \\ FT\_CI^{Na}(k, f_s, w) \end{bmatrix} FT\_CI^1(k, f_s, w)^* \tag{10}$$

The electric power profile generating unit 21 determines whether or not the correlation vector h(k, $f_s$, w) obtained from each of the antenna brunch processing units D1 through D4 at the with Np×Nc times of transmission cycle Tr, satisfies the conditional expression using threshold const1 and threshold const2 shown in Expression (11). The threshold const1 and threshold const2 are real numbers of a predetermined value. The threshold const1 is a predetermined value exceeding the noise level. The threshold const2 is a predetermined value included in a range larger than 0 but smaller than 1. The closer to 1 the threshold const2 is, the higher the correlation of a directional vector a($\theta_u$) and correlation vector h(k, $f_s$, w) (correlation coefficient value) for the conditions of selecting returning signals is. Description of the threshold const1 and threshold const2 is the same in the following embodiments as well.

In a case where the electric power profile generating unit 21 determines that the correlation vector h(k, $f_s$, w) satisfies the conditional expression using threshold const1 and threshold const2 shown in Expression (11), the electric power profile $F_{out}(k, f_s, \theta_u, w)$ is obtained following Expression (11). Note that the electric power profile $F_{out}(k, f_s, \theta_u, w)$ is obtained for each distance/azimuth angle/Doppler frequency component in returning signals from the target, by computing the square of the inner product of the correlation vector $h(k, f_s, w)$ and the directional vector $a(\theta_u)$ stored beforehand.

On the other hand, in a case where the electric power profile generating unit 21 determines that the correlation vector $h(k, f_s, w)$ does not satisfy the conditional expression using threshold const1 and threshold const2 shown in Expression (11), the electric power profile $F_{out}(k, f_s, \theta_u, w)$ for each distance/azimuth angle/Doppler frequency component is obtained as 0 (zero). Note that instead of 0 (zero), the electric power profile $F_{out}(k, f_s, \theta_u, w)$ may be a predetermined value sufficiently smaller than the returning signals of the target, for example, a sufficiently small value around noise level. The electric power profile generating unit 21 outputs the electric power profile $F_{out}(k, f_s, \theta_u, w)$ for each distance/azimuth angle/Doppler frequency component to the Doppler frequency distribution analyzing unit 23 and target speed correcting unit 26.

if $$h(k,f_s,\theta_u,w)^H h(k,f_s,\theta_u,w) > \text{const1}$$

and $$|a(\theta_u)^H h(k,f_s,\theta_u,w)|^2/a(\theta_u) > \text{const2} \times h(k,f_s,\theta_u,w)^H h(k,f_s,\theta_u,w)$$

then $$F_{out}(k,f_s,\theta_u,w) = |a(\theta_u)^H h(k,f_s,\theta_u,w)|^2$$

else $$F_{out}(k,f_s,\theta_u,w) = 0 \quad (11)$$

The directional vector $a(\theta_u)$ is an Na-order column vector representing complex response of each reception antenna, in a case where the returning signals from the target arrive from the direction of azimuthal angle $\theta_u$. Note that the directional vector $a(\theta_u)$ is a complex response of the reception antennas at each azimuthal angle $\theta_u$. The directional vector $a(\theta_u)$ includes, in addition to phase difference information measured beforehand in a radio-frequency anechoic chamber, for example, and computed geometrically in accordance with the intervals between the reception antennas, coupling among antenna elements of the reception antennas, and the deviation information of amplitude error and phase error. Note that the directional vector $a(\theta_u)$ includes the same information in the latter-described embodiments as well.

For example, in a case where the intervals of the reception antenna elements making up the array antenna are disposed at equal interval d on a straight line (see FIG. 5), an ideal directional vector $a(\theta_u)$ with no amplitude deviation nor phase deviation between reception antennas is as shown in Expression (12).

$$a(\theta_u) = \begin{bmatrix} 1 \\ \exp\{j2\pi d \sin\theta_u/\lambda\} \\ \vdots \\ \exp\{j2\pi(Na-1)d\sin\theta_u/\lambda\} \end{bmatrix} \quad (12)$$

The azimuthal angle $\theta_u$ is a variable changed every predetermined interval $\Delta\theta$ over an estimated range $[\theta_{min}, \theta_{max}]$ of arrival direction of returning signals to the radar device 1, and is as illustrated in Expression (13), for example. Here, u is an integer from 0 to NU. NU is shown in Expression (14). In Expression (14), floor[y] is a function which outputs the largest integer value that does not exceed the real number y.

$$\theta_u = \theta_{min} + u\Delta\theta \quad (13)$$

$$NU = \text{floor}[(\theta_{max} - \theta_{min})/\Delta\theta] + 1 \quad (14)$$

The stationary object group distribution generating unit 22 illustrated in FIG. 1 is a configuration including the Doppler frequency distribution analyzing unit 23, stationary object group identifying unit 24, and vehicle motion state estimating unit 25 illustrated in FIG. 2.

The stationary object group distribution generating unit 22 obtains the distribution of Doppler frequency components of a stationary object group including stationary objects in the perimeter, for in each azimuth angle with the vehicle CR as a reference, based on the output from the electric power profile generating unit 21 (the electric power profile of the returning signals). The detailed operations of the stationary object group distribution generating unit 22 will be described as the operations of the Doppler frequency distribution analyzing unit 23, stationary object group identifying unit 24, and vehicle motion state estimating unit 25.

The Doppler frequency distribution analyzing unit 23 analyzes the Doppler frequency distribution for each azimuth angle $\theta_u$, based on the electric power profile $F_{out}(k, f_s, \theta_u, w)$ obtained from the electric power profile generating unit 21 in the with Np×Nc times of transmission cycle Tr (see FIG. 6A). FIG. 6A is a graph illustrating an output example of the electric power profile $F_{out}(k, f_s, \theta_u, w)$ each distance/azimuth angle/Doppler frequency component. FIG. 6A illustrates the electric power profile $F_{out}(k, f_s, \theta_u, w)$ obtained from the electric power profile generating unit 21 for each discrete time k, azimuth (angle) $\theta_u$, and Doppler frequency component $f_s\Delta\theta$.

Specifically, the Doppler frequency distribution analyzing unit 23 counts the number of Doppler frequency components $f_s\Delta\theta$ where electric power profile $F_{out}(k, f_s, \theta_u, w) > 0$ holds, in the range of discrete time k=1 through (Nr+Nu)×Ns/No, for each azimuth $\theta_u$. The Doppler frequency distribution analyzing unit 23 obtains the count value $N\_f\_N_{max}(\theta_u, w)$ of the number of Doppler frequency components $f_s\Delta\theta$ where electric power profile $F_{out}(k, f_s, \theta_u, w) > 0$ holds, and Doppler frequency component $f\_N_{max}(\theta_u, w)$ yielding the maximum value for the count value, and outputs these to the stationary object group identifying unit 24 (FIG. 6B).

FIG. 6B is a graph illustrating an example of an approximation line of Doppler frequency component $f\_N_{max}(\theta_u, w)$ yielding the maximum count value $N\_f\_N_{max}(\theta_u, w)$ for $f_s$ where electric power profile $F_{out}(k, f_s, \theta_u, w) > 0$ holds, illustrated in FIG. 6A. The horizontal axis in FIG. 6B represents the azimuth (angle) $\theta_u$, and the vertical axis in FIG. 6B represents the Doppler frequency component $f_s\Delta\theta$.

The stationary object group identifying unit 24 extracts the Doppler frequency component $f\_N_{max}(\theta_u, w)$ yielding the maximum count value where the count value $N\_f\_N_{max}(\theta_u, w)$ is a predetermined value or larger, within the range $[\theta_{min}, \theta_{max}]$ of the azimuth angle $\theta_u$. The stationary object group identifying unit 24 identifies the extracted Doppler frequency component $f\_N_{max}(\theta_u, w)$ as being a Doppler frequency component of a stationary object group including multiple stationary objects existing around the vehicle CR.

The stationary object group identifying unit 24 outputs the Doppler frequency component f_$N_{max}$($\theta_u$, w) of the stationary object group to the vehicle motion state estimating unit 25.

For example, FIG. 6B linearly illustrates the distribution of the Doppler frequency components $f_s\Delta\theta$ yielding the maximum value of the count value, for each azimuth angle $\theta_u$. The circles in FIG. 6B represent frequency components where N_f_$N_{max}$($\theta_u$, w) is a predetermined value or larger, and the line connecting the circles is an approximation line of the Doppler frequency components $f_s\Delta\theta$ at each azimuth angle $\theta_u$.

The vehicle motion state estimating unit 25 obtains distribution of Doppler frequency components of the stationary object group in each azimuth angle, based on the azimuth angle $\theta_u$_sel, and Doppler frequency components f_$N_{max}$($\theta_u$, w) corresponding to the azimuth angle $\theta_u$_sel. Note that the azimuth angle $\theta_u$_sel is an azimuth angle where Doppler frequency components are obtained in which the N_f_$N_{max}$ ($\theta_u$, w) from the stationary object group identifying unit 24 is a predetermined value or larger. The vehicle motion state estimating unit 25 obtains the approximation curve (distribution) of the Doppler frequency components of the stationary object group in each azimuth angle, as the distribution of Doppler frequency components of the stationary object group in each azimuth angle (see FIG. 6B).

FIG. 7 is an explanatory diagram of a coordinates system regarding the front direction (direction of travel) of the vehicle CR in which the array antenna in FIG. 5 has been installed. The horizontal axis in FIG. 7 represents the front direction (direction of travel) of the vehicle CR in which the radar device 1 according to the present embodiment has been installed. The vertical axis in FIG. 7 represents the side direction of the vehicle CR in which the radar device 1 according to the present embodiment has been installed. Here, the approximation curve (distribution) of Doppler frequency components $f_d$ of a stationary object group ST at each azimuth angle is shown in Expression (15), using the angle $\theta_u$, of which the reference is the broadside direction, perpendicular to the opening faces of the reception antennas Rx_ant1 through Rx_ant4 of the radar device 1.

$$f_d = A \times \sin(\theta_u + \theta_s + \beta) + B \quad (15)$$

In Expression (15), the absolute value of A is a parameter of which the value is greater the greater the vehicular speed of the vehicle CR is, $\beta$ is the angle at which the radar device 1 is attached to the vehicle CR, and $\theta_s$ is an angle that is determined dependent on the yaw rate of the vehicle CR turning left or turning right. The attachment angle $\beta$ of the radar device 1 to the vehicle CR is the angle in the broadside direction that is perpendicular to the opening plane of the reception antenna, with the side direction of the vehicle (a direction perpendicular to the front direction of the vehicle) as a reference. The attachment angle $\beta$ takes the front direction of the vehicle as a positive value (see FIG. 7). $\theta_s$ is approximately equal to 0 (zero) if the vehicle CR is traveling in the front direction (direction of travel). In a case where the vehicle CR curves in the same direction as the side of the vehicle CR to which the radar device 1 has been attached, $\theta_s$>0, and in a case where the vehicle CR curves in the opposite direction from the side of the vehicle CR to which the radar device 1 has been attached, $\theta_s$<0. Note that in FIG. 7, $\theta_s$ is a negative value.

In a range where ($\theta_u+\theta_s+\beta$) is small, the relationship shown in Expression (16) holds, and the Doppler frequency component $f_d$ shown in Expression (15) is as shown in Expression (17). Accordingly, the vehicle motion state estimating unit 25 may obtain the approximation curve (distribution) of Doppler frequency components of the stationary object group at each azimuth angle, by obtaining inclination A and intercept B according to the relationship shown in Expression (17).

$$\sin(\theta_u+\theta_s+\beta) \approx \theta_u+\theta_s+\beta \quad (16)$$

$$f_d = A \times (\theta_u+\theta_s+\beta) + B \quad (17)$$

The vehicle motion state estimating unit 25 uses the approximation curve of Doppler frequency components of the stationary object group at each azimuth angle, calculated by the above Expression (15) or Expression (17), to estimate the vehicular speed $v_c$ of the vehicle CR (see Expression (18)). In Expression (18), $\lambda$ represents the wavelength of the carrier frequency of the radar transmission signals transmitted from the transmission wireless unit 3.

$$v_c = \frac{\lambda}{2} A \Delta\theta \quad (18)$$

Note that in a case where the vehicle CR travels straight in the front direction (direction of travel), $\theta_s \approx 0$, and in this case, $\sin(\theta_u+\beta)=0$ at azimuth angle $\theta_u=-\beta$. On the other hand, in a case where the vehicle CR curves (e.g., turning a corner or going around a curve), the Doppler frequency component calculated from the approximation curve increases or decreases in accordance with the yaw rate of the vehicle CR. Thus, the vehicle motion state estimating unit 25 can estimate the state of occurrence of $\theta_s$ which changes dependent on the state of traveling straight or the state of curving.

Specifically, in a case where the vehicle CR is curving, the azimuth angle where $\sin(\theta_u+\beta)=0$ ($\theta_u=-\beta$) shifts to an azimuth angle $\theta_u=-\theta_s-\beta$ where $\sin(\theta_u+\theta_s+\beta)=0$. By detecting the $\theta_s$ which is the shift amount of the azimuth angle $\theta_u$, the vehicle motion state estimating unit 25 can estimate the rudder angle Ha or yaw rate $\Phi$ of the vehicle CR according to Expression (19) in a case where the vehicular speed is low (e.g., up to around 10 km/h), and according to Expression (20) in a case where the vehicular speed is mid-speed (e.g., around 10 km/h or faster). In Expression (19), η represents the overall gear ratio of the vehicle CR. In Expression (20), WB represents the wheelbase of the vehicle CR, and R represents the turning radius of the vehicle CR.

$$Ha \approx \eta \theta_s \quad (19)$$

$$\Phi \approx \theta_s Vd/WB \quad (20)$$

With regard to a target where electric power profile $F_{out}$(k, $f_s$, $\theta_u$, w)>threshold const3, the target speed correcting unit 26 corrects the Doppler frequency component $f_s\Delta\theta$ in the azimuth angle $\theta_u$ where the target exists, using the Doppler frequency component $f_d(\theta_u)$, thereby computing the relative speed $v_d(f_s, \theta_u)$ of the target according to Expression (21). The Doppler frequency component $f_d(\theta_u)$ is a frequency component obtained by the approximation curve estimated by the vehicle motion state estimating unit 25. The threshold const3 is a threshold value representing reception electric power of returning signals set for each target (e.g., people and vehicles).

$$v_d(f_s, \theta_u) = \frac{\lambda}{2} f_s \Delta\theta - f_d(\theta_u)\Delta\theta \quad (21)$$

$$= \frac{\lambda}{2}[f_s - (A\sin(\theta_u + \theta_s + \beta) + B)]\Delta\theta$$

Accordingly, the target speed correcting unit 26 can exclude effects of Doppler frequency components occurring due to movement of the vehicle CR regardless of whether the vehicle CR in which the radar device 1 is installed is traveling straight or curving, and thus the precision of estimation of the relative speed $v_d(f_s, \theta_u)$ of the target with the radar device 1 as a reference can be improved. Note that the target speed correcting unit 26 may store past vehicular speed measurement values, apply averaging processing thereto, and using this as the vehicular speed measurement value. The target speed correcting unit 26 may also take a value obtained by applying Kalman filter tracking processing, for example, as the vehicular speed estimation value.

According to the above, the radar device 1 according to the present embodiment computes the electric power profile $F_{out}(k, f_s, \theta_u, w)$ of a stationary object group including multiple stationary objects existing around the vehicle CR in which the radar device 1 has been installed, using the correlation vector $h(k, f_s, w)$ as the output of the multiple antenna brunch processing units D1 through D4. Based on the electric power profile $F_{out}(k, f_s, \theta_u, w)$ of the stationary object group, the radar device 1 obtains the distribution (approximation curve) of the Doppler frequency components $f_s\Delta\theta$ of the stationary object group for each azimuth angle $\theta_u$, and estimates the vehicular speed $v_c$ of the vehicle CR using the approximation curve of the Doppler frequency components $f_s\Delta\theta$, for each azimuth angle $\theta_u$ of the stationary object group.

Further, the radar device 1 corrects the Doppler frequency component $f_s\Delta\theta$ of the azimuth angle $\theta_u$ where the target exists, using the Doppler frequency components $f_d(\theta_u)$ obtained by the approximation curve estimated by the vehicle motion state estimating unit 25, thus computing the relative speed $v_d(f_s, \theta_u)$ of the target according to Expression (21).

Accordingly, the radar device 1 can remove the effects of Doppler frequency components occurring due to movement of the vehicle CR, regardless of whether the vehicle CR in which the radar device 1 is installed is traveling straight or curving, and thus deterioration in the precision of estimation of the relative speed $v_d(f_s, \theta_u)$ of the target with the radar device 1 as a reference can be suppressed. The radar device 1 can also estimate the rudder angle Ha and yaw rate $\Phi$ besides the vehicular speed $v_c$ of the vehicle CR, and the movement locus of the vehicle CR or target can be calculated using the movement vector estimation values of the vehicle CR. The radar device 1 according to the present embodiment does not use the output of a later-described vehicular speed sensor, so the relative speed of the target can be estimated without being influenced by measurement error of the vehicular speed sensor which is dependent on the state of the vehicle and the traveling state of the vehicle.

Modification of First Embodiment

The configuration of a radar device according to a modification of the first embodiment (hereinafter referred to as "present modification") is the same as the radar device 1 according to the first embodiment illustrated in FIG. 2, so description of the radar device 1 according to the present modification which would be redundant with the content of the radar device 1 according to the first embodiment will be simplified or omitted, and description will be made regarding content that is different.

The electric power profile $F_{out}(k, f_s, \theta_u, w)$ obtained by the electric power profile generating unit 21 according to the first embodiment was three-dimensional data of discrete time k, Doppler frequency component $f_s\Delta\theta$, and azimuth angle $\theta_u$. Accordingly, the amount of computation performed at the Doppler frequency distribution analyzing unit 23 and target speed correcting unit 26 using the electric power profile $F_{out}(k, f_s, \theta_u, w)$ is great, and the memory buffer in the Doppler frequency distribution analyzing unit 23 and target speed correcting unit 26 needs more capacity when performing computation.

In the present modification, the electric power profile generating unit 21 determines whether or not the correlation vector $h(k, f_s, w)$ satisfies a conditional expression using const1, const2, and electric power profile $FP_{out}(k, \theta_u, w)$ shown in Expression (22) or not.

In a case where determination is made that the correlation vector $h(k, f_s, w)$ satisfies the conditional expression using const1, const2, and electric power profile $FP_{out}(k, \theta_u, w)$ shown in Expression (22), the electric power profile generating unit 21 outputs the electric power profile $FP_{out}(k, \theta_u, w)$ in the returning signals, at each distance/azimuth angle, and a Doppler profile $FF_{out}(k, \theta_u, w)$ at distances/azimuth angles corresponding to the electric power profile $FP_{out}(k, \theta_u, w)$.

Note that the initial value of the electric power profile $FP_{out}(k, \theta_u, w)$ at each distance/azimuth angle may all be zero (or may be a predetermined value sufficiently smaller than the returning signals from the target, for example, a sufficiently small value around noise level), and the initial value of the Doppler profile $FF_{out}(k, \theta_u, w)$ at each distance/azimuth angle may all be "Not a Number" (also abbreviated to "NaN", meaning a non-integer, e.g., a symbol).

if $$h(k,f_s,\theta_u,w)^H h(k,f_s,\theta_u,w) > const1$$

and $$|a(\theta_u)^H h(k,f_s,\theta_u,w)|^2/a(\theta_u) > const2 \times h(k,f_s,\theta_u,w)^H h(k,f_s,\theta_u,w)$$

and $$|a(\theta_u)^H h(k,f_s,\theta_u,w)|^2/a(\theta_u) > FP_{out}(k,\theta_u,w)$$

then $$FP_{out}(k,\theta_u,w) = |a(\theta_u)^H h(k,f_s,\theta_u,w)|^2$$

$$FF_{out}(k,\theta_u,w) = f_s \qquad (22)$$

In a case where multiple Doppler frequency components $f_s\Delta\theta$ are obtained from the same discrete time k and azimuth angle $\theta_u$, the electric power profile generating unit 21 selects the Doppler frequency component $FF_{out}(k, \theta_u, w)$ where the electric power of each Doppler frequency component $f_s\Delta\theta$ is the greatest, and the corresponding electric power profile $FP_{out}(k, \theta_u, w)$, and stores these in the memory of the electric power profile generating unit 21. Note that the electric power being the greatest means that the value of the electric power profile is the greatest.

According to the above, the radar device 1 according to the present modification stores the electric power profile $F_{out}(k, f_s, \theta_u, w)$ in the memory of the electric power profile generating unit 21 in a state separated into the distance/azimuth angle electric power profile $FP_{out}(k, \theta_u, w)$, and the corresponding distance/azimuth angle Doppler frequency component $FF_{out}(k, \theta_u, w)$.

Accordingly, the radar device 1 according to the present modification can reduce the computation amount of the Doppler frequency distribution analyzing unit 23 and target speed correcting unit 26 using the electric power profile $F_{out}(k, f_s, \theta_u, w)$, as compared to the radar device 1 of the first embodiment, and can greatly suppress the buffer size of the memory in the Doppler frequency distribution analyzing unit 23 and target speed correcting unit 26.

Also, the electric power profile generating unit 21 according to the present modification may use Expression (23) instead of Expression (22) as a conditional expression.

if $$h(k,f_s,\theta_u,w)^H h(k,f_s,\theta_u,w) > \text{const1}$$

and $$|a(\theta_u)^H h(k,f_s,\theta_u,w)|^2 / a(\theta_u)^H a(\theta_u) > \text{const2} \times h(k,f_s,\theta_u,w)^H h(k,f_s,\theta_u,w)$$

then $$FP_{out}(k,\theta_u,w) = FP_{out}(k,\theta_u,w) + \oplus a(\theta_u)^H h(k,f_s,\theta_u,w)|^2$$

if $$|a(\theta_u)^H h(k,f_s,\theta_u,w)|^2/a(\theta_u)^H a(\theta_u) > |a(\theta_u)^H h(k,FF_{out}(k,\theta_u,w),\theta_u,w)|^2/a(\theta_u)^H a(\theta_u) FF_{out}(k,\theta_u,w) = f_s \quad (23)$$

In a case where multiple Doppler frequency components $f_s \Delta\theta$ are obtained from the same discrete time k and azimuth angle $\theta_u$, the electric power profile generating unit 21 selects the Doppler frequency component $FF_{out}(k, \theta_u, w)$ where the electric power sum of each Doppler frequency component $f_s \Delta\theta$ is the greatest, and the corresponding electric power sum $FP_{out}(k, \theta_u, w)$, and stores these in the memory of the electric power profile generating unit 21. Note that the electric power sum is $FP_{out}(k, \theta_u, w)$ in Expression (23).

Accordingly, the radar device 1 according to the present modification can reduce the computation amount of the Doppler frequency distribution analyzing unit 23 and target speed correcting unit 26 using the electric power profile $F_{out}(k, f_s, \theta_u, w)$, as compared to the radar device 1 of the first embodiment, and can greatly suppress the buffer size of the memory in the Doppler frequency distribution analyzing unit 23 and target speed correcting unit 26.

Second Embodiment

In a second embodiment, a vehicle motion state estimating unit 25A switches the vehicular speed of the vehicle CR between a vehicular speed detection value obtained from a vehicle sensor unit 31 installed in the vehicle CR and a vehicular speed estimated by the vehicle motion state estimating unit 25A (estimated value), in accordance with the detection state of the stationary object group.

FIG. 8 is a block diagram illustrating the internal configuration of a radar device 1A according to the second embodiment in detail. The configuration of the radar device 1A according to the present embodiment is a configuration where the radar device 1 according to the first embodiment illustrated in FIG. 2 further includes the vehicle sensor unit 31. Description of the radar device 1A according to the present embodiment which would be redundant with the content of the radar device 1 according to the first embodiment will be simplified or omitted, and description will be made regarding content that is different. Note that the radar device 1A according to the second embodiment can also be applied to the radar device according to the modification of the first embodiment.

The vehicle sensor unit 31 serving as an example of a sensor unit detects the vehicular speed of the vehicle CR, the rudder angle, or the yaw rate, and outputs a detection value of the vehicular speed, rudder angle, or yaw rate, to the vehicle motion state estimating unit 25A. Note that an arrangement may be made where the vehicle sensor unit 31 is not included in the radar device 1A but is installed in the vehicle CR in which the radar device 1A is installed, and is connected to the radar device 1A so as to be capable of output of the detection value to the radar device 1A.

The vehicle motion state estimating unit 25A selects, as the vehicular speed of the vehicle CR, one of a vehicular speed detection value obtained from the vehicle sensor unit 31, and a vehicular speed estimated by the vehicle motion state estimating unit 25A (estimated value), based on the azimuth angle $\theta_u\_\text{sel}$ regarding which Doppler frequency components where $N\_f\_N_{max}(\theta_u, w)$ is a predetermined value or larger, and the Doppler frequency components $f\_N_{max}(\theta_u, w)$ corresponding to the azimuth angle $\theta_u\_\text{sel}$. The $N\_f\_N_{max}(\theta_u, w)$ is the count value of $f_s$ where electric power profile $F_{out}(k, f_s, \theta_u, w) > 0$ obtained at the Doppler frequency distribution analyzing unit 23.

Specifically, in a case where the number of azimuth angles $\theta_u\_\text{sel}$ is smaller than a predetermined value, the vehicle motion state estimating unit 25A determines that a valid approximation curve is not obtainable as to the distribution of Doppler frequency components for each azimuth angle, and selects the vehicular speed detection value obtained from the vehicle sensor unit 31 as the vehicular speed of the vehicle CR.

On the other hand, in a case where the number of azimuth angles $\theta_u\_\text{sel}$ is equal to or greater than the predetermined value, the vehicle motion state estimating unit 25A determines that a valid approximation curve is obtainable as to the distribution of Doppler frequency components for each azimuth angle, and selects the estimated vehicular speed value estimated based on the approximation curve of the distribution of Doppler frequency components for each azimuth angle (see Expression (18)) as the vehicular speed of the vehicle CR.

Note that the method the vehicle sensor unit 31 of calculating a detection value of the vehicular speed of the vehicle CR based on a detected value of the vehicular speed, rudder angle, or yaw rate, is described in the aforementioned Japanese Unexamined Patent Application Publication No. 2004-177289, which is true for the embodiments below as well.

On the other hand, the vehicle motion state estimating unit 25A according to the present embodiment may select between the vehicular speed detection value obtained from the vehicle sensor unit 31 and the vehicular speed estimated by the vehicle motion state estimating unit 25A (estimated value), in accordance with the traveling state of the vehicle CR, as the vehicular speed of the vehicle CR. The traveling state of the vehicle CR is information relating to the vehicular speed of the vehicle CR, and whether traveling straight or curving.

That is to say, with regard to vehicular speed, in a case where the vehicle CR is traveling at a low speed, the vehicle motion state estimating unit 25A uses vehicle detection values obtained from the vehicle sensor unit 31, and uses the estimated vehicular speed value estimated based on the approximation curve of the distribution of Doppler frequency components for each azimuth angle (see Expression (18)) in a case where the vehicle CR is traveling at mid-or-high speed.

More specifically, in a case where the vehicular speed detection value obtained from the vehicle sensor unit 31 is smaller than a predetermined value, the vehicle motion state estimating unit 25A uses vehicle detection values obtained from the vehicle sensor unit 31, and uses the estimated vehicular speed value estimated based on the approximation curve of the distribution of Doppler frequency components for each azimuth angle (see Expression (18)) in a case where the vehicular speed detection value obtained from the vehicle sensor unit 31 is equal to or greater than the predetermined value.

On the other hand, with regard to traveling straight or curving, in a case where the vehicle CR is traveling straight, the vehicle motion state estimating unit 25A selects vehicle detection values obtained from the vehicle sensor unit 31, and selects the estimated vehicular speed value estimated based on the approximation curve of the distribution of Doppler frequency components for each azimuth angle (see Expression (18)) in a case where the vehicle CR is curving.

More specifically, in a case where determination has been made that the vehicle CR is traveling straight, based on the detection value of the rudder angle or yaw rate obtained from the vehicle sensor unit 31, the vehicle motion state estimating unit 25A selects the vehicle detection values obtained from the vehicle sensor unit 31. In a case where determination has been made that the vehicle CR is curving, based on the detection value of the rudder angle or yaw rate obtained from the vehicle sensor unit 31, the vehicle motion state estimating unit 25A selects the estimated vehicular speed value estimated based on the approximation curve of the distribution of Doppler frequency components for each azimuth angle (see Expression (18)).

Note that the vehicle motion state estimating unit 25A may use the approximation curve of the distribution of Doppler frequency components $f_d$ for each azimuth angle in determining whether the vehicle CR is traveling straight or curving. The approximation curve of the Doppler frequency components $f_d$ for each azimuth angle is as shown in Expression (15) in a case of representing using the azimuth angle $\theta_u$ of which the reference is a direction perpendicular to the direction of travel of the vehicle CR. In Expression (15), A corresponds to the vehicular speed of the vehicle CR, β is a fixed shift angle occurring in the installation of the radar device 1A to the vehicle CR (attachment angle), and $\theta_s$ is an angle determined dependent on the yaw rate when the vehicle CR turns left or turns right. Accordingly, in a case where the $\theta_s$ is a predetermined value or larger, the vehicle motion state estimating unit 25A can determine that the vehicle CR is curving, and in a case where the $\theta_s$ is smaller than the predetermined value, that the vehicle CR is traveling straight.

The detection error of the vehicular speed detection value obtained from the vehicle sensor unit 31 becomes greater the faster the traveling speed is, and further, the detection error of the vehicular speed detection value becomes greater than curving when turning left or turning right, so the radar device 1A according to the present embodiment selects, as the vehicular speed of the vehicle CR, one of the vehicular speed detection value obtained from the vehicle sensor unit 31 installed in the vehicle CR, and the vehicular speed estimated by the vehicle motion state estimating unit 25A (estimated value), according to the detection state of the stationary object group or the traveling state of the vehicle CR.

Note that the vehicle sensor unit 31 may output a vehicular speed selection signal indicating which of the vehicular speed detection value obtained from the vehicle sensor unit 31 and the vehicular speed estimated by the vehicle motion state estimating unit 25A has been used for output, for processing downstream.

Accordingly, the radar device 1A according to the present embodiment can reduce estimation error of the vehicular speed of the vehicle CR in which the radar device 1A is installed. Accordingly, the radar device 1A according to the present embodiment can suppress deterioration in estimation precision of the relative speed $v_d(f_s, \theta_u)$ of the target as seen from the radar device 1A.

Third Embodiment

In a third embodiment, the configuration of a radar device 1B where the radar device 1A according to the second embodiment illustrated further includes a correction coefficient calculation storage unit 32, that calculates and stores correction coefficients for correcting the vehicular speed detection values obtained from the vehicle sensor unit 31, will be described with reference to FIG. 9.

Figure 9:
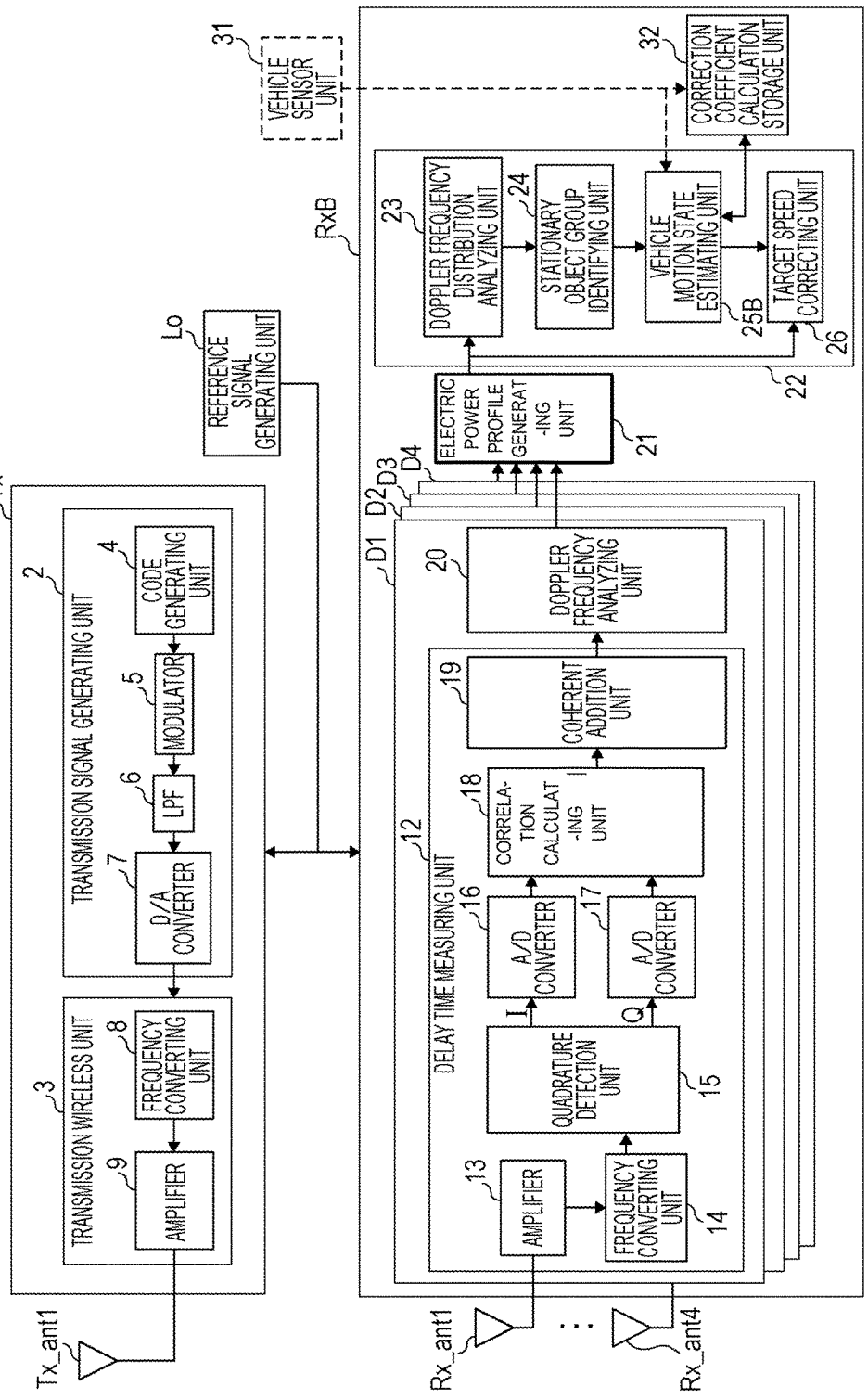
FIG. 9 is a block diagram illustrating the internal configuration of the radar device according to a third embodiment in detail.

FIG. 9 is a block diagram illustrating the internal configuration of the radar device 1B according to the third embodiment in detail. The configuration of the radar device 1B according to the present embodiment is a configuration where the radar device 1A according to the second embodiment illustrated in FIG. 8 further includes the correction coefficient calculation storage unit 32. Description of the radar device 1B according to the present embodiment which would be redundant with the content of the radar device 1A according to the second embodiment will be simplified or omitted, and description will be made regarding content that is different.

The correction coefficient calculation storage unit 32 computes a correction coefficient Corr_$V_c$ for correcting the vehicular speed detection value obtained from the vehicle sensor unit 31, using the vehicular speed which the vehicle motion state estimating unit 25B has estimated (estimated value), following Expression (24), and stores the correction coefficient Corr_$V_c$ in the correction coefficient calculation storage unit 32. $V_c$ in Expression (24) represents the vehicular speed detection value obtained from the vehicle sensor unit 31, and $V_c$_est represents the vehicular speed which the vehicle motion state estimating unit 25B has estimated (estimated value).

$$\text{Corr\_}V_c = V_c\_est/V_c \quad (24)$$

The correction coefficient calculation storage unit 32 also computers a correction coefficient Corr_Ha or Corr_Φ for correcting the detection values of the rudder angle Ha or yaw rate Φ obtained from the vehicle sensor unit 31 so as to match the estimated rudder angle Ha_est (see Expression (19)) or yaw rate Φ_est (see Expression (20)) estimated by the vehicle motion state estimating unit 25B, following Expression (25) or Expression (26), and stores the correction coefficient Corr_Ha or Corr_Φ in the correction coefficient calculation storage unit 32.

$$\text{Corr\_}Ha = Ha\_est/Ha \quad (25)$$

$$\text{Corr\_}\Phi = \Phi\_est/\Phi \quad (26)$$

The vehicle motion state estimating unit 25B switches the vehicular speed of the vehicle CR to the vehicular speed detection value obtained from the vehicle sensor unit 31, or the vehicular speed estimated by the vehicle motion state estimating unit 25B (estimated value), based on the azimuth angle $\theta_u$_sel regarding which obtained Doppler frequency components where N_f_$N_{max}(\theta_u, w)$ are a predetermined value or larger, and the Doppler frequency components f_$N_{max}(\theta_u, w)$ corresponding to the azimuth angle $\theta_u$_sel.

Specifically, in a case where the number of azimuth angles $\theta_{u\_}$sel is smaller than a predetermined value, the vehicle motion state estimating unit 25B determines that a valid approximation curve is not obtainable as to the distribution of Doppler frequency components $f_d$ for each azimuth angle, and takes results obtained by multiplying the vehicular speed detection value obtained from the vehicle sensor unit 31 by the correction coefficient Corr_$V_c$ read out from the correction coefficient calculation storage unit 32 as the vehicular speed of the vehicle CR.

Alternatively, the vehicle motion state estimating unit 25B may take results obtained by multiplying the detection values for the rudder angle Ha or the yaw rate Φ obtained from the vehicle sensor unit 31 by the correction coefficient Corr_Ha or Corr_Φ read out from the correction coefficient calculation storage unit 32 as the rudder angle or the yaw rate of the vehicle CR.

On the other hand, in a case where the number of azimuth angles $\theta_{u\_}$sel is equal to or greater than the predetermined value, the vehicle motion state estimating unit 25B determines that a valid approximation curve is obtainable as to the distribution of Doppler frequency components for each azimuth angle, and selects the vehicular speed estimated based on the valid approximation curve of the distribution of Doppler frequency components for each azimuth angle (see Expression (18)) as the vehicular speed of the vehicle CR.

Note that even in a case where the vehicular speed of the vehicle CR is switched in accordance with the traveling state of the vehicle CR, the vehicle motion state estimating unit 25B may multiply the vehicular speed $V_c$, rudder angle Ha, and yaw rate Φ, obtained from the vehicle sensor unit 31, by corresponding correction coefficients read out from the correction coefficient calculation storage unit 32.

Accordingly, even in a case of using detection values of the vehicular speed $V_c$, rudder angle Ha, and yaw rate Φ, obtained from the vehicle sensor unit 31, the radar device 1B according to the present embodiment can improve estimation precision of the vehicular speed, rudder angle, and yaw rate of the vehicle CR in which the radar device 1B is installed, so estimation error in the vehicular speed, rudder angle, and yaw rate, can be reduced. Accordingly, the radar device 1B according to the present embodiment can suppress deterioration in estimation precision of the relative speed $v_d(f_s, \theta_u)$ of the target with the radar device 1B as a reference.

Fourth Embodiment

In a fourth embodiment, the configuration of a radar device 1C where the radar device 1A according to the second embodiment further includes a radar operation change detecting unit 33, that determines whether or not there is change in the operation of the radar device, will be described with reference to FIG. 10.

Figure 10:
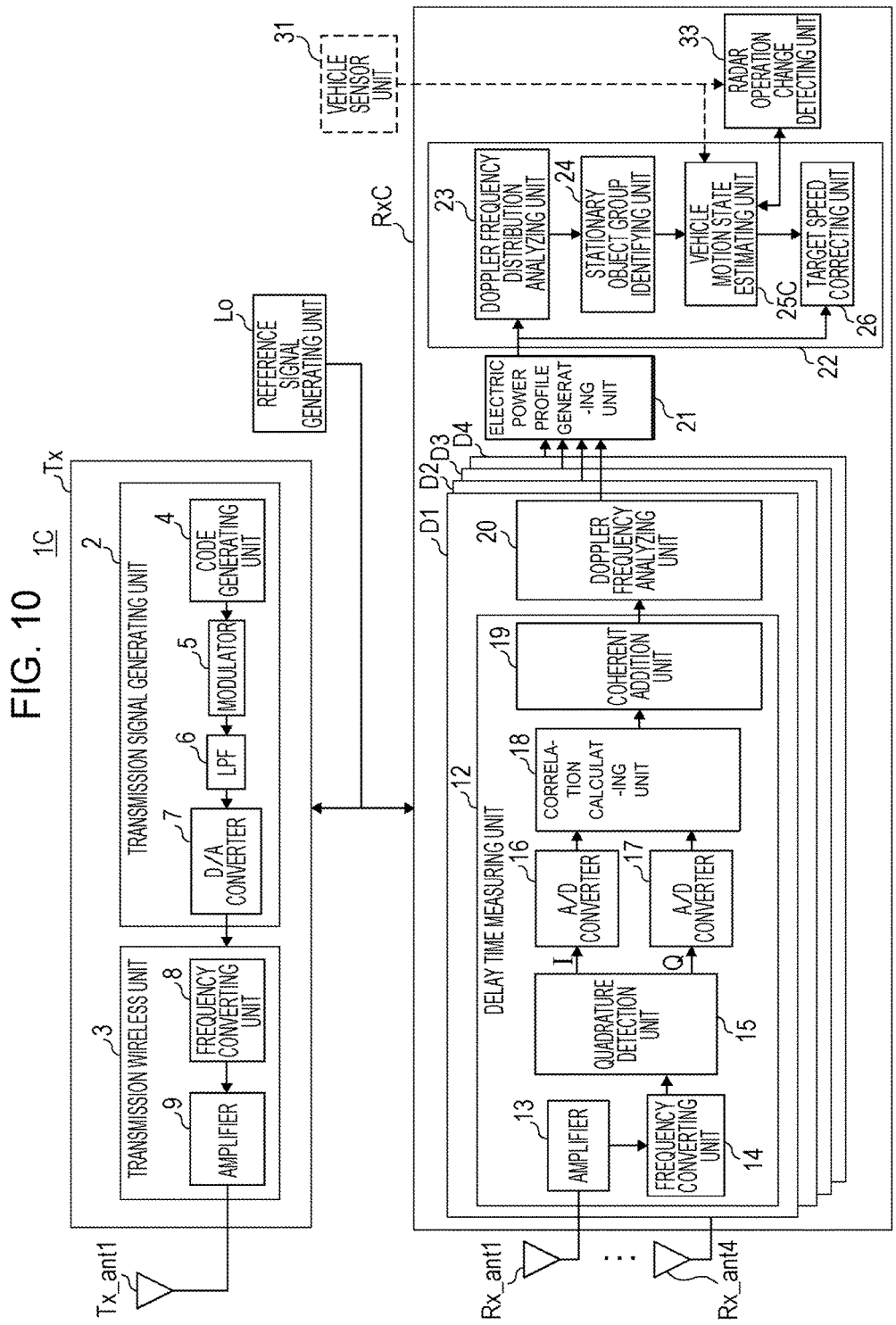
FIG. 10 is a block diagram illustrating the internal configuration of the radar device according to a fourth embodiment in detail.

FIG. 10 is a block diagram illustrating the internal configuration of the radar device 1C according to the fourth embodiment in detail. The configuration of the radar device 1C according to the present embodiment is a configuration where the radar device 1A according to the second embodiment illustrated in FIG. 8 further includes the radar operation change detecting unit 33. Description of the radar device 1C according to the present embodiment which would be redundant with the content of the radar device 1A according to the second embodiment will be simplified or omitted, and description will be made regarding content that is different.

The radar operation change detecting unit 33, which is an example of a first operation change detecting unit, computes a difference $\Delta V_c$ between the vehicular speed which the vehicle motion state estimating unit 25C has estimated (estimated value) and the vehicular speed detection value obtained from the vehicle sensor unit 31 installed in the vehicle CR, based on the azimuth angle $\theta_{u\_}$sel regarding which obtained Doppler frequency components where N_f_N$_{max}$($\theta_u$, w) are a predetermined value or larger, and the Doppler frequency components f_N$_{max}$($\theta_u$, w) corresponding to the azimuth angle $\theta_{u\_}$sel.

In a case where determination is made that a ratio Nerr/N_measure, between an occurrence count Nerr where the difference $\Delta V_c$ as the result of computation is larger than a predetermined value L_$V_c$_Err and a radar measurement count N_measure within a predetermined amount of time, is larger than a predetermined value, the radar operation change detecting unit 33 detects change in operations of the radar device 1C, and gives a predetermined warning.

The radar operation change detecting unit 33 may also detect change in operations of the radar device 1C and gives a predetermined warning, in a case where determination is made that the number of times where the difference $\Delta V_c$ as the result of computation is larger than the predetermined value L_$V_c$_Err a predetermined number of times or more.

Thus, in a case where a state where the difference $\Delta V_c$ between the estimated vehicular speed value of the vehicle CR estimated by the vehicle motion state estimating unit 25C and the vehicular speed detection value obtained from the vehicle sensor unit 31 exceeds a predetermined value, and this occurs over a predetermined number of transmission cycles (within a predetermined amount of time, i.e., predetermined number of times×Np×Nc×transmission cycle Tr) or more, the radar device 1C according to the present embodiment can detect change in operations of the radar device 1C, i.e., change in operations of the vehicle motion state estimating unit 25C, in a highly precise manner. Accordingly, the radar device 1C can detect change in operations based on the output results of the radar operation change detecting unit 33 from the vehicle motion state estimating unit 25C, which can be used for malfunction diagnosis of the radar device.

Fifth Embodiment

In a fifth embodiment, a radar device 1D1 having a configuration in which the radar transmission unit Tx of the radar device 1 according to the first embodiment has been replaced by a radar transmission unit TxD which switches the main beam direction of the radar transmission signals every Np×Nc times of the transmission cycle Tr, will be described with reference to FIG. 11 and FIG. 12. Note that the radar device 1D1 according to the fifth embodiment is applicable to radar devices according to the other embodiments as well.

Figure 11:
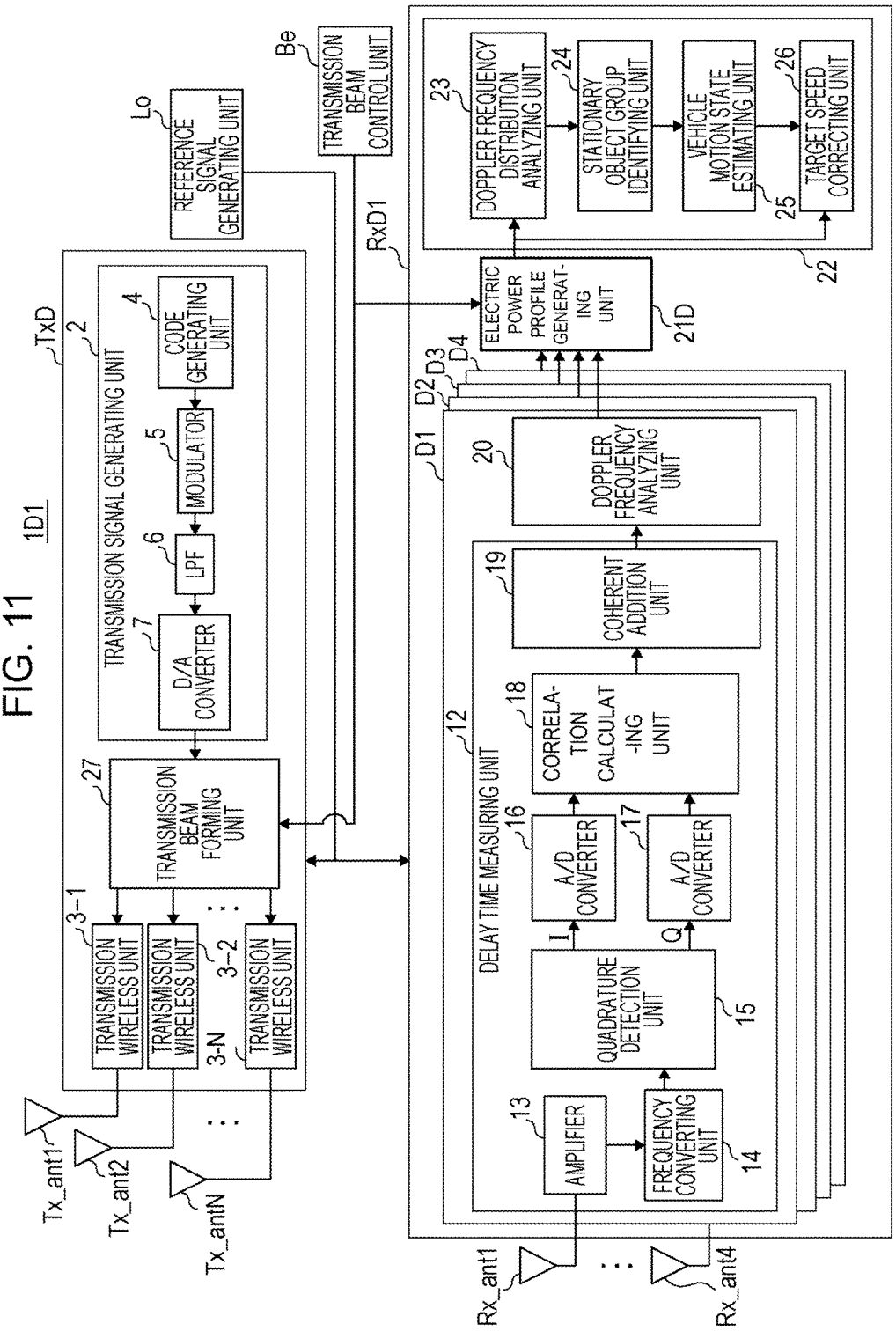
FIG. 11 is a block diagram illustrating the internal configuration of the radar device according to a fifth embodiment in detail.

FIG. 11 is a block diagram illustrating the internal configuration of the radar device 1D1 according to the fifth embodiment in detail. FIG. 12 is a diagram illustrating the relationship between the outputs of a transmission beam control unit Be, a transmission beam forming unit 27, and an electric power profile generating unit 21D, and the transmission cycle Tr. The radar device 1D1 includes the reference signal generating unit Lo, transmission beam control unit Be, a radar transmission unit TxD, and a radar reception unit RxD1.

The radar transmission unit TxD includes the transmission signal generating unit 2, a transmission beam forming unit 27, and a total of N transmission wireless units 3-1, 3-2, . . . , 3-N. The transmission wireless units 3-1, 3-2, . . . , 3-N are connected to corresponding transmission antennas Tx_ant1, Tx_ant2, . . . , Tx_antN.

Description of the radar device 1D1 according to the present embodiment which would be redundant with the content of the radar device 1 according to the first embodiment will be simplified or omitted, and description will be made regarding content that is different.

In the radar device 1D1 according to the present embodiment, the radar transmission unit TxD transmits radar transmission signals where the main beam direction has been switched using beam forming technology, and the electric power profile generating unit 21 of the radar reception unit RxD1 switches the estimated range of the direction of arrival of returning signals from the target in accordance with the main beam direction of the radar transmission signals.

The transmission beam control unit Be controls a main beam direction $\theta_{Tx}$ of the radar transmission signals transmitted by the radar transmission unit TxD. Specifically, every Np×Nc times of the transmission cycle Tr, the transmission beam control unit Be switches the main beam direction $\theta_{Tx}$ of the radar beam signals every predetermined interval $\Delta\theta_{Tx}$ in the same range as the estimated range of the direction of arrival of the returning signals (see FIG. 12).

During the m'th Np×Nc times of the transmission cycle Tr (Np×Nc×Tr), the transmission beam control unit Be outputs control signals so that the main beam direction of the radar transmission signals is $\theta_{Tx}(m)$, to the transmission beam forming unit 27 and the electric power profile generating unit 21D.

Figure 12:
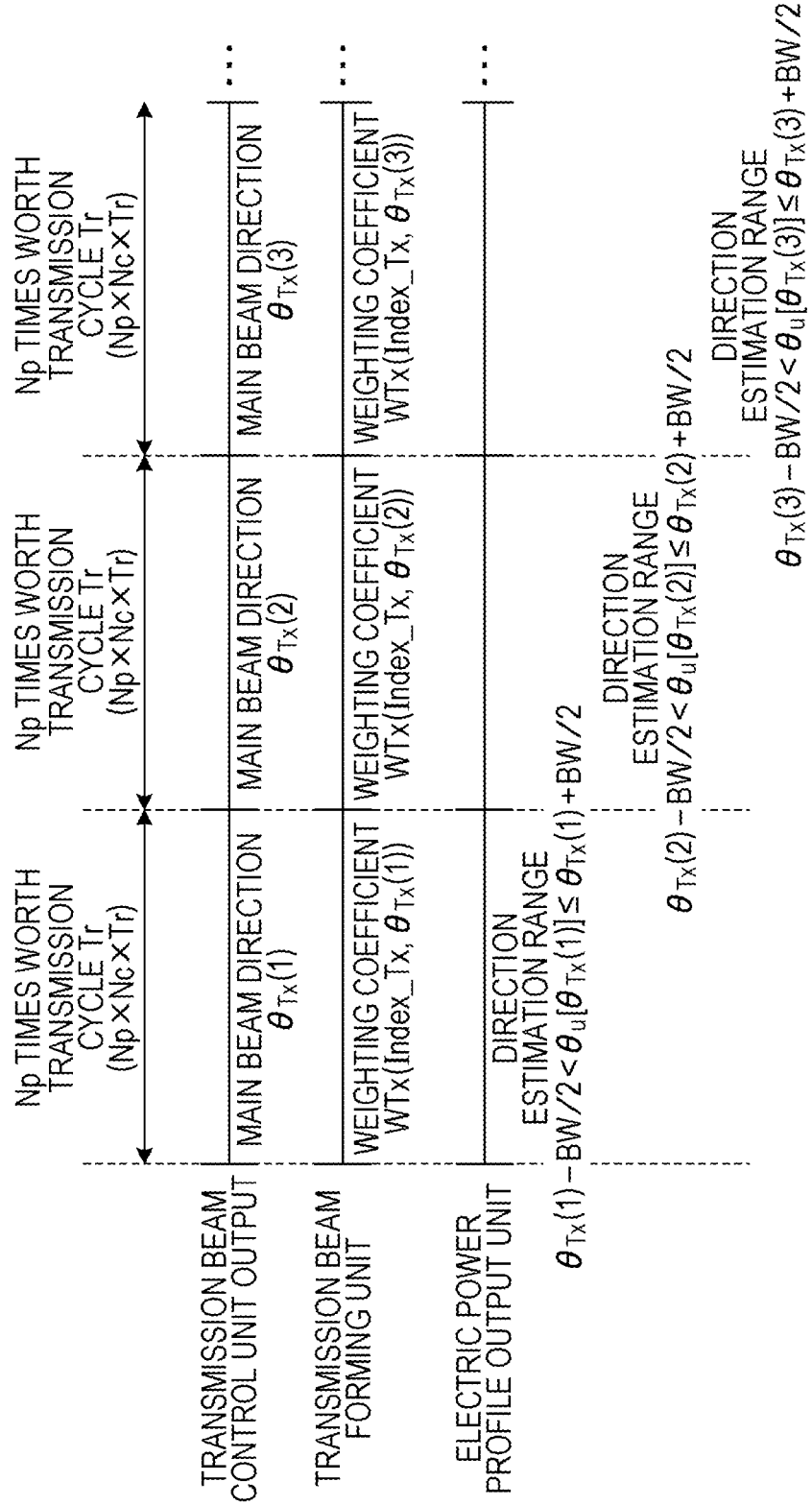
FIG. 12 is a diagram illustrating the relationship between the outputs of a transmission beam control unit, transmission beam forming unit, and electric power profile generating unit, and transmission cycle.

In FIG. 12, during the first Np×Nc times of the transmission cycle Tr (Np×Nc×Tr), the transmission beam control unit Be outputs control signals so that the main beam direction of the radar transmission signals is $\theta_{Tx}(1)$, to the transmission beam forming unit 27 and the electric power profile generating unit 21D.

Also, during the second Np×Nc times of the transmission cycle Tr (Np×Nc×Tr), the transmission beam control unit Be outputs control signals so that the main beam direction of the radar transmission signals is $\theta_{Tx}(2)$, to the transmission beam forming unit 27 and the electric power profile generating unit 21D.

Also, during the third Np×Nc times of the transmission cycle Tr (Np×Nc×Tr), the transmission beam control unit Be outputs control signals so that the main beam direction of the radar transmission signals is $\theta_{Tx}(3)$, to the transmission beam forming unit 27 and the electric power profile generating unit 21D.

Based on the transmission signals r(k, M) of the D/A converter 7, the transmission beam forming unit 27 forms the transmission beam with the main beam direction $\theta_{Tx}$ according to the control signals output by the transmission beam control unit Be.

Specifically, the transmission beam forming unit 27 multiplies each of a weighting coefficient WTx(Index_Tx, $\theta_{Tx}$(m)) having a total of N_Tx elements of first through N_Tx'th, for the transmission signals r(k, M) which are the output of the D/A converter 7. The weighting coefficient WTx(Index_Tx, $\theta$(m)) is a shown in Expression (27) in a case where the transmission antennas Tx_ant1 through Tx_antN are disposed equidistantly, and the spacing between the elements is d (see FIG. 5). λ is the wavelength of the radar transmission signals. While the antenna layout has being described as being a linear layout, this is not restrictive, and circular or elliptical antenna layouts can be similarly applied by setting weighting coefficients corresponding to the antenna layouts.

$$WTx(\text{Index\_Tx},\theta_{Tx}(m))=[_{exp}[j2\pi((\text{Index\_Tx})-1)d\sin\theta_{Tx}(m)/\lambda]] \quad (27)$$

The transmission beam forming unit 27 outputs the total of N transmission signals each multiplied by the weighting coefficient having the total of N elements, to the transmission wireless units 3-1 through 3-N matching the ordinals (Index_Tx) of the elements of the weighting coefficients, respectively. Index_Tx is an integer of 1 or larger from 1 to N.

In FIG. 12, during the first Np×Nc times of the transmission cycle (Np×Nc×Tr), the transmission beam forming unit 27 multiplies the transmission signals r(k, M) which are the output of the D/A converter 7 by the weighting coefficient WTx(Index_Tx, $\theta$(1)), in accordance with control signals output from the transmission beam control unit Be.

Also, during the second Np×Nc times of the transmission cycle (Np×Nc×Tr), the transmission beam forming unit 27 multiplies the transmission signals r(k, M) which are the output of the D/A converter 7 by the weighting coefficient WTx(Index_Tx, $\theta$(2)), in accordance with control signals output from the transmission beam control unit Be.

Also, during the third Np×Nc times of the transmission cycle (Np×Nc×Tr), the transmission beam forming unit 27 multiplies the transmission signals r(k, M) which are the output of the D/A converter 7 by the weighting coefficient WTx(Index_Tx, $\theta$(3)), in accordance with control signals output from the transmission beam control unit Be.

The transmission beam forming unit 27 may reduce side lobes of the radar transmission signals by forming radar transmission signals where the main beam direction is $\theta_{Tx}$, using a weight coefficient including amplitude component and phase component. Examples of applicable beam forming techniques to reduce side lobes include a binomial array, Chebyshev array, and a Taylor array.

Based on the reference signal generated by the reference signal generating unit Lo, the transmission wireless units 3-1 through 3-N each generate transmission reference signals of a carrier frequency band where the reference signal has been multiple to a predetermined multiple. The transmission wireless units 3-1 through 3-N operate based on the transmission reference signals.

The Index_Tx'th transmission wireless unit uses the transmission signals and transmission reference signals multiplied by the weighting coefficient WTx(Index_Tx, $\theta_{Tx}$(m)) to upconvert the baseband transmission signals to radio-frequency radar transmission signals.

The Index_Tx'th transmission wireless unit amplifies the signal level of the radar transmission signals to a predetermined signal level, and outputs to the transmission antenna connected to the Index_Tx'th transmission wireless unit. The radar transmission signals are emitted into space from the Index_Tx'th transmission antenna. Note that the radar transmission signals in the main beam direction $\theta_{Tx}$ are formed by the total of N radar transmission signals transmitted from the total of N transmission antennas being spatially composited.

Every Np×Nc times of the transmission cycle Tr (Np×Nc×Tr), the electric power profile generating unit 21D selects an estimation range $\theta_q[\theta_{Tx}(m)]$ of the azimuth angle of the direction of arrival of the returning signals, based on the main beam direction $\theta_{Tx}$(m) according to the control signals output from the transmission beam control unit Be and a range BW equivalent to around the transmission beam width (see Expression (28)).

Every Np×Nc times of the transmission cycle Tr, the electric power profile generating unit 21D selects a direction vector a ($\theta_u[\theta_{Tx}(m)]$) corresponding to, of the direction vectors a($\theta_u$) stored beforehand, the estimated range $\theta_u[\theta_{Tx}(m)]$ of the azimuth angle selected in accordance with the control signals output by the transmission beam control unit Be.

$$\theta_{Tx}(m) - \frac{BW}{2} \le \theta_u[\theta_{Tx}(m)] \le \theta_{Tx}(m) + \frac{BW}{2} \quad (28)$$

For example, during the first Np×Nc times of the transmission cycle (Np×Nc×Tr), the electric power profile generating unit 21D selects an estimated range $\theta_u[\theta_{Tx}(1)]$ of the direction of arrival of the returning signals at a range from "$\theta_{Tx}(1)$−BW/2" to "$\theta_{Tx}(1)$+BW/2", in accordance with the control signals output by the transmission beam control unit Be.

During the second Np×Nc times of the transmission cycle (Np×Nc×Tr), the electric power profile generating unit 21D selects an estimated range $\theta_u[\theta_{Tx}(2)]$ of the direction of arrival of the returning signals at a range from "$\theta_{Tx}(2)$−BW/2" to "$\theta_{Tx}(2)$+BW/2", in accordance with the control signals output by the transmission beam control unit Be.

Also, during the third Np×Nc times of the transmission cycle (Np×Nc×Tr), the electric power profile generating unit 21D selects an estimated range $\theta_u[\theta_{Tx}(3)]$ of the direction of arrival of the returning signals at a range from "$\theta_{Tx}(3)$−BW/2" to "$\theta_{Tx}(3)$+BW/2", in accordance with the control signals output by the transmission beam control unit Be.

During the with Np×Nc times of the transmission cycle Tr, the electric power profile generating unit 21D determines whether or not the correlation vector h(k, $f_s$, w) acquired from the antenna brunch processing units D1 through D4 satisfies the conditional expression using const1 and const2 shown in Expression (29).

In a case of having determined that the correlation vector h(k, $f_s$, w) satisfies the conditional expression using const1 and const2 shown in Expression (29), the electric power profile generating unit 21D obtains the electric power profile $F_{out}$(k, $f_s$, $\theta_u$, [$\theta_{Tx}(m)$], w) for each distance/azimuth angle/Doppler frequency component in the returning signals from the target, by computing the square of the inner product of the correlation vector h(k, $f_s$, w) and the direction vector a($\theta_u[\theta_{Tx}(m)]$) stored beforehand, in accordance with Expression (29).

In a case of having determined that the correlation vector h(k, $f_s$, w) does not satisfy the conditional expression using const1 and const2 shown in Expression (29), the electric power profile generating unit 21D obtains the electric power profile $F_{out}$(k, $f_s$, $\theta_u$, [$\theta_{Tx}(m)$], w) for each distance/azimuth angle/Doppler frequency component as 0 (zero). The electric power profile generating unit 21D outputs the electric power profile $F_{out}$(k, $f_s$, $\theta_u$, [$\theta_{Tx}(m)$], w) for each distance/azimuth angle/Doppler frequency component to the Doppler frequency distribution analyzing unit 23 and the target speed correcting unit 26.

if $$h(k,f_s,\theta_u[\theta_{Tx}(m)],w)^H h(k,f_s,\theta_u[\theta_{Tx}(m)],w) > \text{const1}$$

and $$|a(\theta_u[\theta_{Tx}(m)])^H h(k,f_s,\theta_u[\theta_{Tx}(m)],w)|^2 / a(\theta_u[\theta_{Tx}(m)])^H a(\theta_u[\theta_{Tx}(m)]) > \text{const2} \times h(k,f_s,\theta_u[\theta_{Tx}(m)],w)^H h(k,f_s,\theta_u[\theta_{Tx}(m)],w)$$

then $$F_{out}(k,f_s,\theta_u[\theta_{Tx}(m)],w) = |a(\theta_u[\theta_{Tx}(m)])^H h(k,f_s,\theta_u[\theta_{Tx}(m)],w)|^2$$

else $$F_{out}(k,f_s,\theta_u[\theta_{Tx}(m)],w) = 0 \quad (29)$$

In a case where switching the main beam direction $\theta_{Tx}$ of the radar transmission signals which the radar transmission unit TxD transmits from $\theta_{min}$ to $\theta_{max}$ has been completed, the Doppler frequency distribution analyzing unit 23 analyzes the Doppler frequency component distribution for each azimuth angle $\theta_u$ within the range [$\theta_{min}$, $\theta_{max}$] of the azimuth angle $\theta_u[\theta_{Tx}(m)]$, based on the electric power profile $F_{out}$(k, $f_s$, $\theta_u$, w) obtained from the electric power profile generating unit 21.

In a case where the switching of the main beam direction $\theta_{Tx}$($\theta_{min} \le \theta_{Tx} \le \theta_{max}$) of the radar transmission signals which the radar transmission unit TxD transmits is to be repeated from $\theta_{min}$ to $\theta_{max}$, the transmission beam control unit Be outputs control signals for switching the main beam direction $\theta_{Tx}$ from $\theta_{min}$ to $\theta_{max}$ or from $\theta_{max}$ to $\theta_{min}$ to the transmission beam forming unit 27 and the electric power profile generating unit 21D, which is the same hereinafter.

According to the above, the radar device 1D1 according to the present embodiment yields similar advantages to the advantages of the radar device 1 according to the first embodiment, and further, the direction of arrival of the returning signals is estimated in a range according to the main beam direction $\theta_{Tx}$ of the radar transmission signals from the transmission beam forming unit 27 in accordance with control signals output by the transmission beam control unit Be, and within the range BW equivalent to around the transmission beam width (see Expression (28)).

According to this, the radar device 1D1 can select an estimated range of the direction of arrival of returning signals using a range where the reception SNR of the returning signals reflected off of the target is best, whereby error in the estimation of the direction of returning signals can be reduced.

Also, even in a case where multiple targets of a number equal to or greater than the number of reception antennas exist within the distance resolution of the radar device 1D1, the radar device 1D1 switches the main beam direction $\theta_{Tx}$ of the radar transmission signals every Np×Nc times of transmission cycle Tr, so returning signals reflected off of targets existing at other than the estimated range $\theta_u[\theta_{Tx}(m)]$ according to the main beam direction $\theta_{Tx}$ of the radar transmission signals and the range BW of the transmission beam width, can be spatially suppressed.

Accordingly, the radar device 1D1 can increase the probability that the returning signals exist within a distance resolution (=$C_0 \times Tp/2$) included in a direction within the estimated range $\theta_u[\theta_{Tx}(m)]$ corresponding to the main beam direction $\theta_{Tx}$ of the radar transmission signals and the range BW of the transmission beam width, are targets which are fewer than the number of reception antennas, so one or multiple targets existing within the transmission beam width can be detected with high resolution and high precision.

Also, the radar device 1D1 uses the output of the electric power profile generating unit 21D at the Doppler frequency distribution analyzing unit 23, stationary object group identifying unit 24, vehicle motion state estimating unit 25, and target speed correcting unit 26, so the estimation precision of the vehicular speed of the vehicle CR and the relative speed of the target can be improved.

Figure 13:
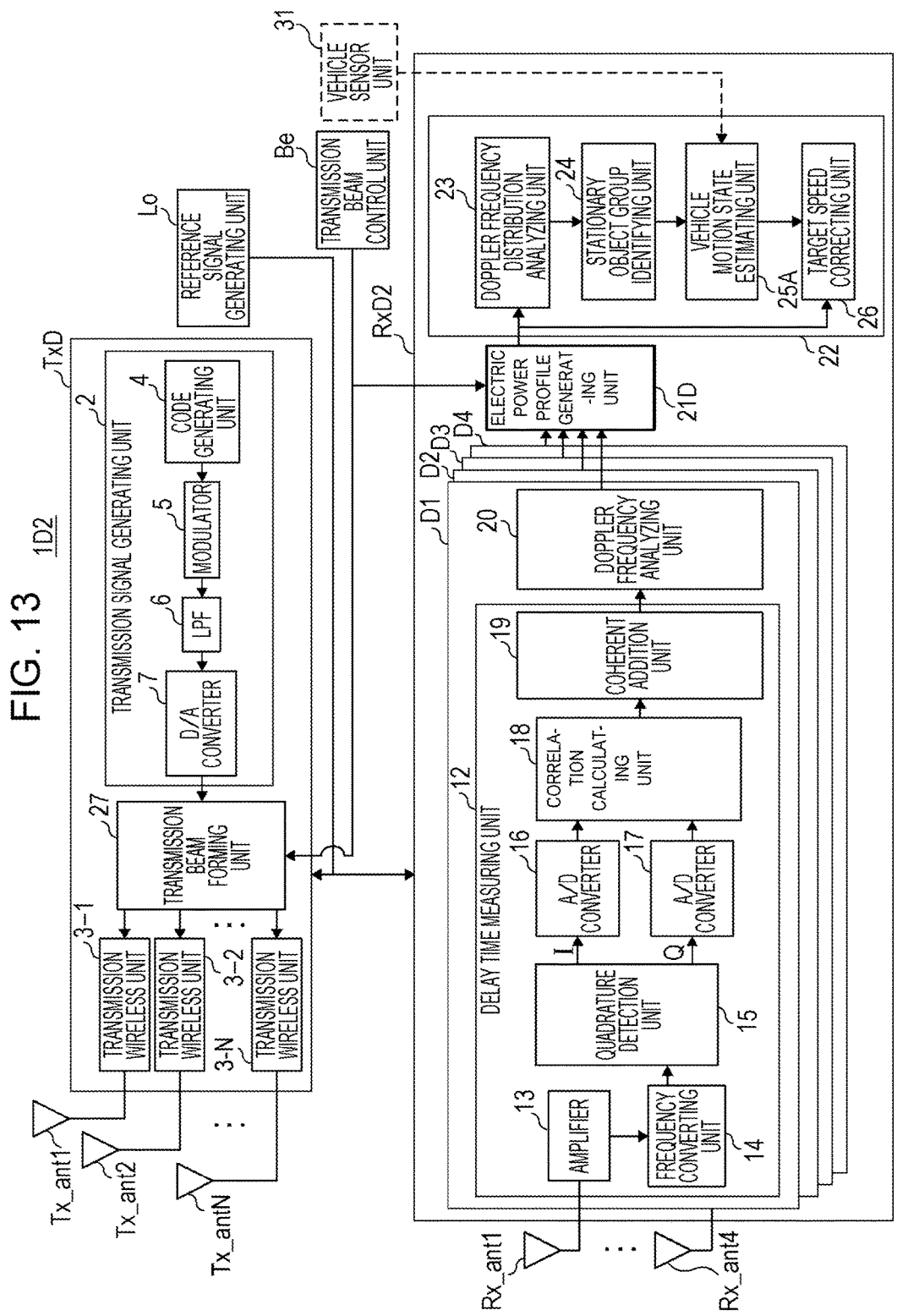
FIG. 13 is a block diagram illustrating the internal configuration of a radar device according to a first modification of the fifth embodiment in detail.
Figure 14:
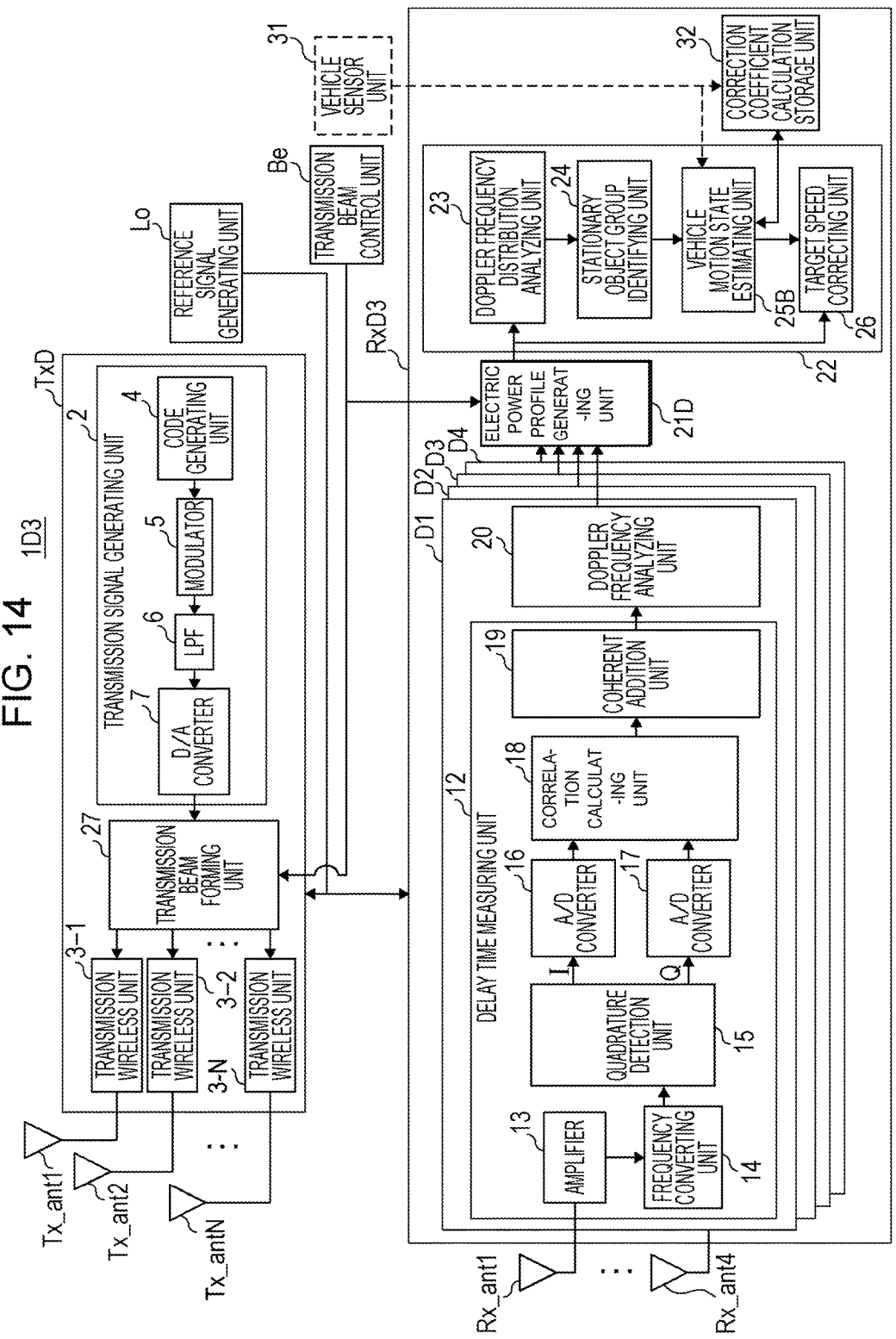
FIG. 14 is a block diagram illustrating the internal configuration of a radar device according to a second modification of the fifth embodiment in detail.
Figure 15:
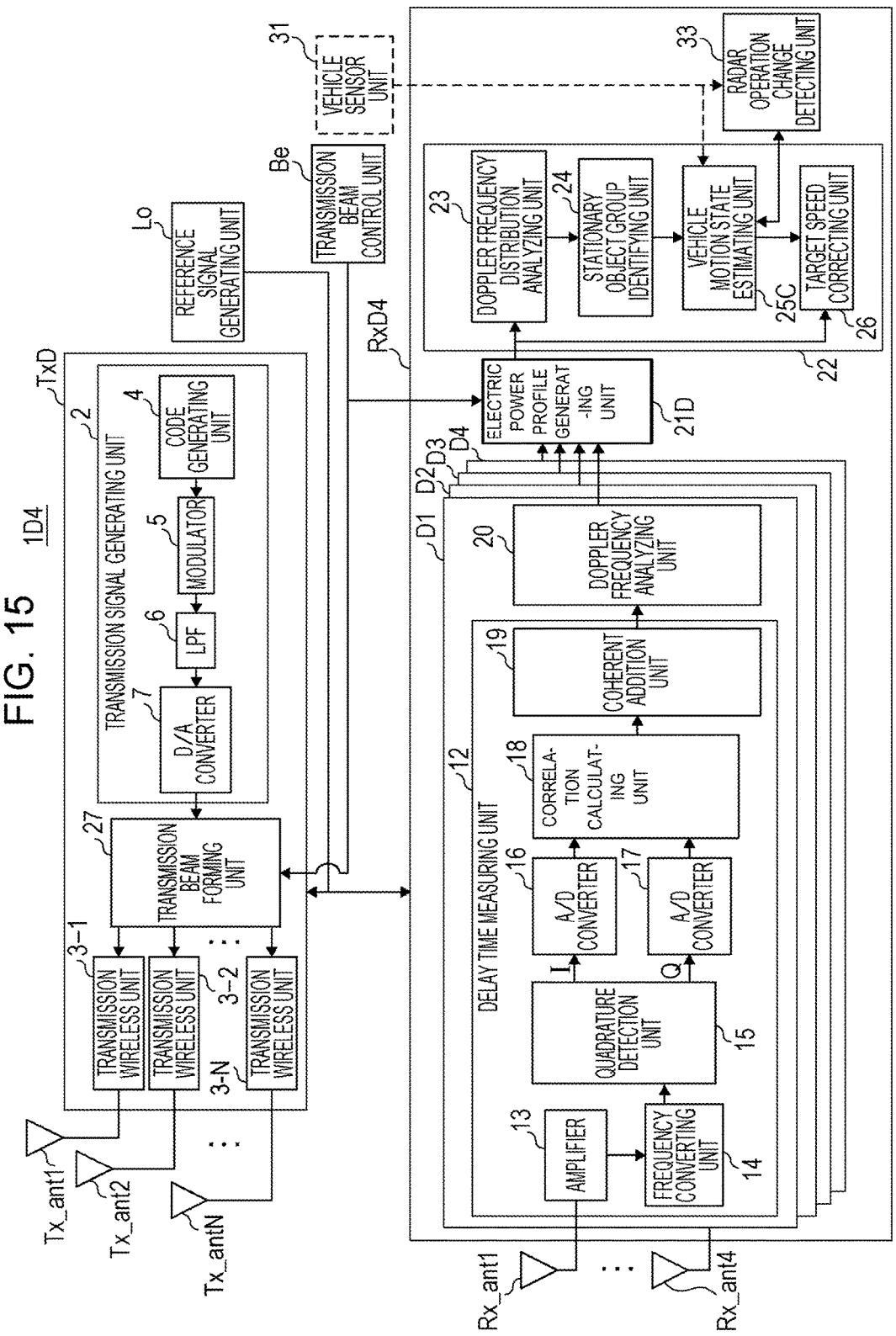
FIG. 15 is a block diagram illustrating the internal configuration of a radar device according to a third modification of the fifth embodiment in detail.

Also, arrangements may be made to the radar devices 1A through 1C illustrated in FIGS. 8 through 10, where the radar transmission unit Tx in the radar devices 1A through 1C are replaced with the radar transmission unit TxD according to the radar device 1D1 of the present embodiment (see FIGS. 13 through 15). FIG. 13 is a block diagram illustrating the internal configuration of a radar device 1 D2 according to a first modification of the fifth embodiment in detail. FIG. 14 is a block diagram illustrating the internal configuration of a radar device 1D3 according to a second modification of the fifth embodiment in detail. FIG. 15 is a block diagram illustrating the internal configuration of a radar device 1 D4 according to a third modification of the fifth embodiment in detail. Accordingly, the radar devices 1D2 through 1D4 each have the advantages of the radar devices 1A through 1C, and yield the advantages of the radar device 1D1 according to the fifth embodiment.

Sixth Embodiment

In a sixth embodiment, description will be made with reference to FIG. 16 regarding a case where one of the radar devices out of the radar devices 1, 1A, 1B, 1C, 1D1 through 1D4 according to the above-described embodiments and modifications is mounted (installed) to both sides of the vehicle CR as sector radars, and the vehicle is mounted with a radar device 1E which integrates the detection results of the sector radars.

Figure 16:
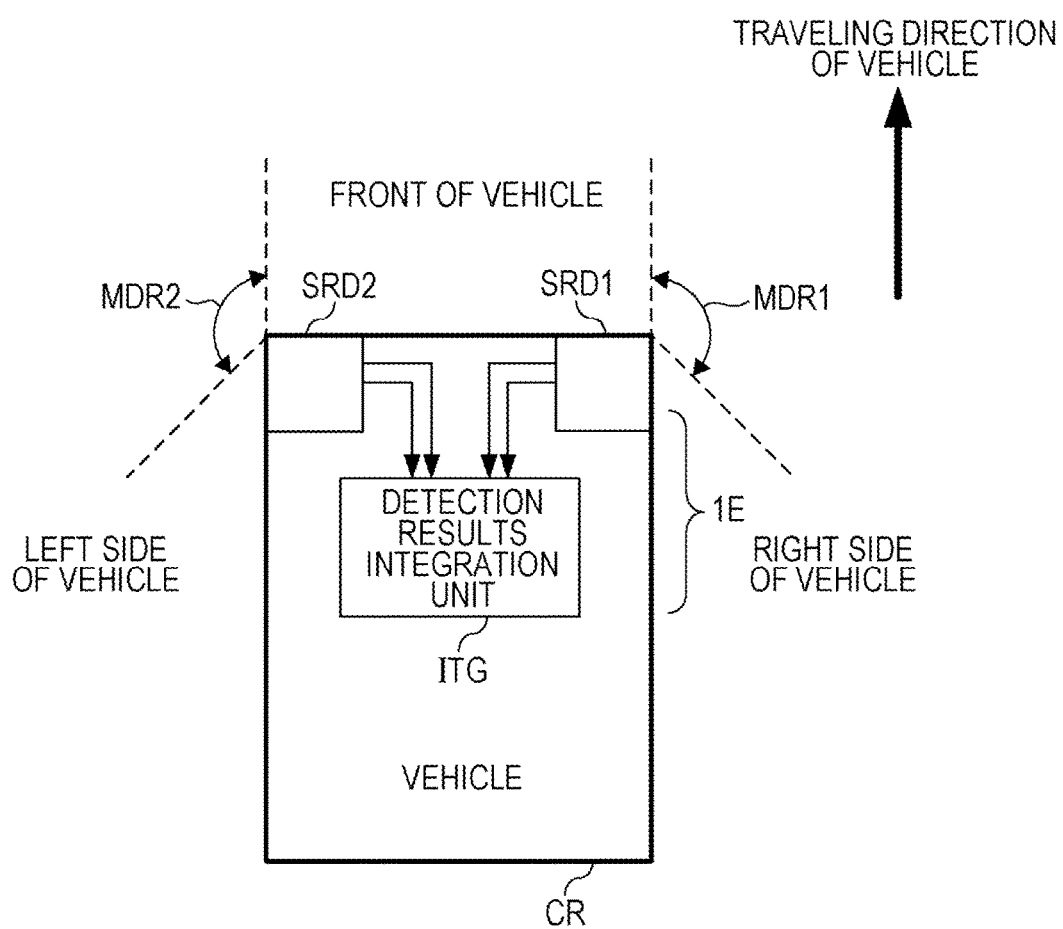
FIG. 16 is a block diagram illustrating the internal configuration of the radar device according to a sixth embodiment in detail.

FIG. 16 is a block diagram illustrating the internal configuration of the radar device 1E according to the sixth embodiment in detail. The radar device 1E according to the present embodiment includes two sector radars SRD1 and SRD2 which are of the same configuration as one of the radar devices out of the radar devices 1, 1A, 1B, 1C, 1D1 through 1D4 according to the above-described embodiments and modifications, and a detection result integration unit ITG.

Description of the radar device 1E according to the present embodiment which would be redundant with the content according to any one of the radar devices out of the radar devices 1, 1A, 1B, 1C, 1D1 through 1D4 according to the above-described embodiments and modifications will be simplified or omitted, and description will be made regarding content that is different.

The sector radar SRD1 is installed in the vehicle CR so that the right front area to the right side area of the vehicle CR is a detection area MDR1. The sector radar SRD1 outputs an approximation curve detection result $(A_1, B_1, \theta_{s1})$ and vehicular speed $v_{c1}$ ($=\lambda A_1 \Delta\theta/2$) obtained from a vehicle motion state estimating unit within the sector radar SRD1, and a relative speed $V_{d1}(f_s, \theta_u)$ obtained from a target speed correcting unit within the sector radar SRD1 to the detection result integration unit ITG. The sector radar SRD1 also outputs information to the detection result integration unit ITG relating to the number of azimuth angles $\theta_u\_\text{sel}$ where Doppler frequency components are obtained from a stationary object group identifying unit in the sector radar SRD1 where $N\_f\_N_{max}(\theta_u, w)$ is a predetermined value or larger.

The sector radar SRD2 is installed in the vehicle CR so that the left front area to the left side area of the vehicle CR is a detection area MDR2. The sector radar SRD2 outputs an approximation curve detection result $(A_2, B_2, \theta_{s2})$ and vehicular speed $v_{c2}$ ($=\lambda A_2 \Delta\theta/2$) obtained from a vehicle motion state estimating unit within the sector radar SRD2, and a relative speed $V_{d2}(f_s, \theta_u)$ obtained from a target speed correcting unit within the sector radar SRD2 to the detection result integration unit ITG. The sector radar SRD2 also outputs information to the detection result integration unit ITG relating to the number of azimuth angles $\theta_u\_\text{sel}$ where Doppler frequency components are obtained from a stationary object group identifying unit in the sector radar SRD2 where $N\_f\_N_{max}(\theta_u, w)$ is a predetermined value or larger.

The detection result integration unit ITG computes the difference $|v_{c1}-V_{c2}|$ between the vehicular speed $v_{c1}$ obtained from the sector radar SRD1 and the vehicular speed $v_{c2}$ obtained from the sector radar SRD2, and determines whether or not the difference $|v_{c1}-V_{c2}|$ is a predetermined value or greater.

In a case where determination is made that the difference $|v_{c1}-V_{c2}|$ is a predetermined value or greater, the detection result integration unit ITG compares the number of azimuth angles $\theta_u\_\text{sel}$ where Doppler frequency components are obtained in which $N\_f\_N_{max}(\theta_u, w)$ acquired from the sector radar SRD1 is a predetermined value or larger, with the number of azimuth angles $\theta_u\_\text{sel}$ where Doppler frequency components are obtained in which $N\_f\_N_{max}(\theta_u, w)$ acquired from the sector radar SRD2 is a predetermined value or larger.

The detection result integration unit ITG determines that the vehicular speed with the larger number of azimuth angles $\theta_u\_\text{sel}$ has higher accuracy, and corrects the relative speed of the target following Expression (30) or Expression (31), using the vehicular speed $v_c\_\text{sel}$ obtained from the sector radars SRD1 or SRD2 yielding the greater number of azimuth angles $\theta_u\_\text{sel}$. Expression (30) shows the relative speed after correcting the relative speed $v_{d1}(f_s, \theta_u)$ obtained from the sector radar SRD1. Expression (31) shows the relative speed after correcting the relative speed $v_{d2}(f_s, \theta_u)$ obtained from the sector radar SRD2.

$$v_{d1}(f_s, \theta_u) = \frac{\lambda}{2}f_s\Delta\theta - v_c\_\text{sel} \times \{\sin(\theta_u + \theta_{s1} + \beta_1) + B_1\} \quad (30)$$

$$v_{d2}(f_s, \theta_u) = \frac{\lambda}{2}f_s\Delta\theta - v_c\_\text{sel} \times \{\sin(\theta_u + \theta_{s2} + \beta_2) + B_2\} \quad (31)$$

On the other hand, in a case where determination is made that the difference $|v_{c1}-V_{c2}|$ is smaller than the predetermined value, the detection result integration unit ITG discards the output values obtained from the sector radars SRD1 and SRD2 (e.g., vehicular speed and relative speed), or calculates an average vehicular speed value $v_c\_\text{ave}$ (see Expression (32)). The detection result integration unit ITG uses the average vehicular speed value $v_c\_\text{ave}$ to correct the relative speed of the target obtained from the sector radars SRD1 and SRD2 following Expression (33) or Expression (34).

$$v_c\_\text{ave} = \frac{1}{2}(v_{c1} + v_{c2}) \quad (32)$$

$$v_{d1}(f_s, \theta_u) = \frac{\lambda}{2}f_s\Delta\theta - v_c\_\text{ave} \times \{\sin(\theta_u + \theta_{s1} + \beta_1) + B_1\} \quad (33)$$

$$v_{d2}(f_s, \theta_u) = \frac{\lambda}{2}f_s\Delta\theta - v_c\_\text{ave} \times \{\sin(\theta_u + \theta_{s2} + \beta_2) + B_2\} \quad (34)$$

In a case where the sector radars SRD1 and SRD2 are a radar device according to the above-described second embodiment or a subsequent embodiment (e.g., radar device 1A, 1B, 1C, 1D2, 1D3, 1D4), and the detection result integration unit ITG determines that the difference $|v_{c1}-V_{c2}|$ between the vehicular speed $v_{c1}$ obtained from the sector radar SRD1 and the vehicular speed $v_{c2}$ obtained from the sector radar SRD2 is a predetermined value or greater, the relative speed of the target is corrected according to which of the following three patterns the vehicular speed obtained from the sector radars SRD1 and SRD2 satisfies.

Pattern 1: Case where one is vehicular speed estimation value obtained from vehicle motion state estimating unit 25, and other is vehicular speed detection value obtained from vehicle sensor unit 31

The detection result integration unit ITG corrects the relative speed of the target following Expression (30) or Expression (31), using a vehicular speed estimation value (e.g., vehicular speed $v_{c\_}$sel) obtained from the vehicle motion state estimating unit of the sector radar SRD1 or SRD2.

Now, assumption will be made that the vehicle sensor unit 31 of the sector radar SRD1 and sector radar SRD2 have a vehicular speed selection signal indicating which of the vehicular speed detection value obtained from the vehicle sensor unit 31 and the vehicular speed estimated by the vehicle motion state estimating unit 25A (estimated value) has been used for output, to determine whether the vehicular speed estimation value is a vehicular speed estimation value obtained from the vehicle motion state estimating unit 25 or a vehicular speed detection value obtained from the vehicle sensor unit, each being output to the detection result integration unit ITG.

Pattern 2: Case where both are vehicular speed estimation value obtained from vehicle motion state estimating unit The detection result integration unit ITG compares the number of azimuth angles $\theta_{u\_}$sel where Doppler frequency components are obtained in which $N\_f\_N_{max}(\theta_u, w)$ acquired from the sector radar SRD1 is a predetermined value or larger, with the number of azimuth angles $\theta_{u\_}$sel where Doppler frequency components are obtained in which $N\_f\_N_{max}(\theta_u, w)$ acquired from the sector radar SRD2 is a predetermined value or larger.

The detection result integration unit ITG determines that the vehicular speed with the larger number of azimuth angles $\theta_{u\_}$sel has higher estimation precision, and corrects the relative speed of the target following Expression (30) or Expression (31), using the vehicular speed $v_{c\_}$sel obtained from the sector radars SRD1 or SRD2 yielding the greater number of azimuth angles $\theta_{u\_}$sel.

Pattern 3: Case where both are vehicular speed detection value obtained from vehicle sensor unit The detection result integration unit ITG calculates an average vehicular speed $v_{c\_}$ave (see Expression (32)) using the vehicular speed obtained from the sector radars SRD1 and SRD2, and uses the average vehicular speed value $v_{c\_}$ave to correct the relative speed of the target obtained from the sector radars SRD1 and SRD2, following Expression (33) or Expression (34).

Accordingly, the radar device 1E according to the present embodiment can improve the estimation precision of the relative speed of the target with the radar device 1E as a reference, using the vehicular speed obtained from the sector radars SRD1 and SRD2 installed on both sides of the vehicle CR.

Seventh Embodiment

A seventh embodiment will be described regarding a radar device 1F which transmits frequency-modulated radar transmission signals at a radar transmission unit TxF (e.g., chirp pulses are used), with reference to FIG. 17 and FIGS. 18A and 18B.

Figure 17:
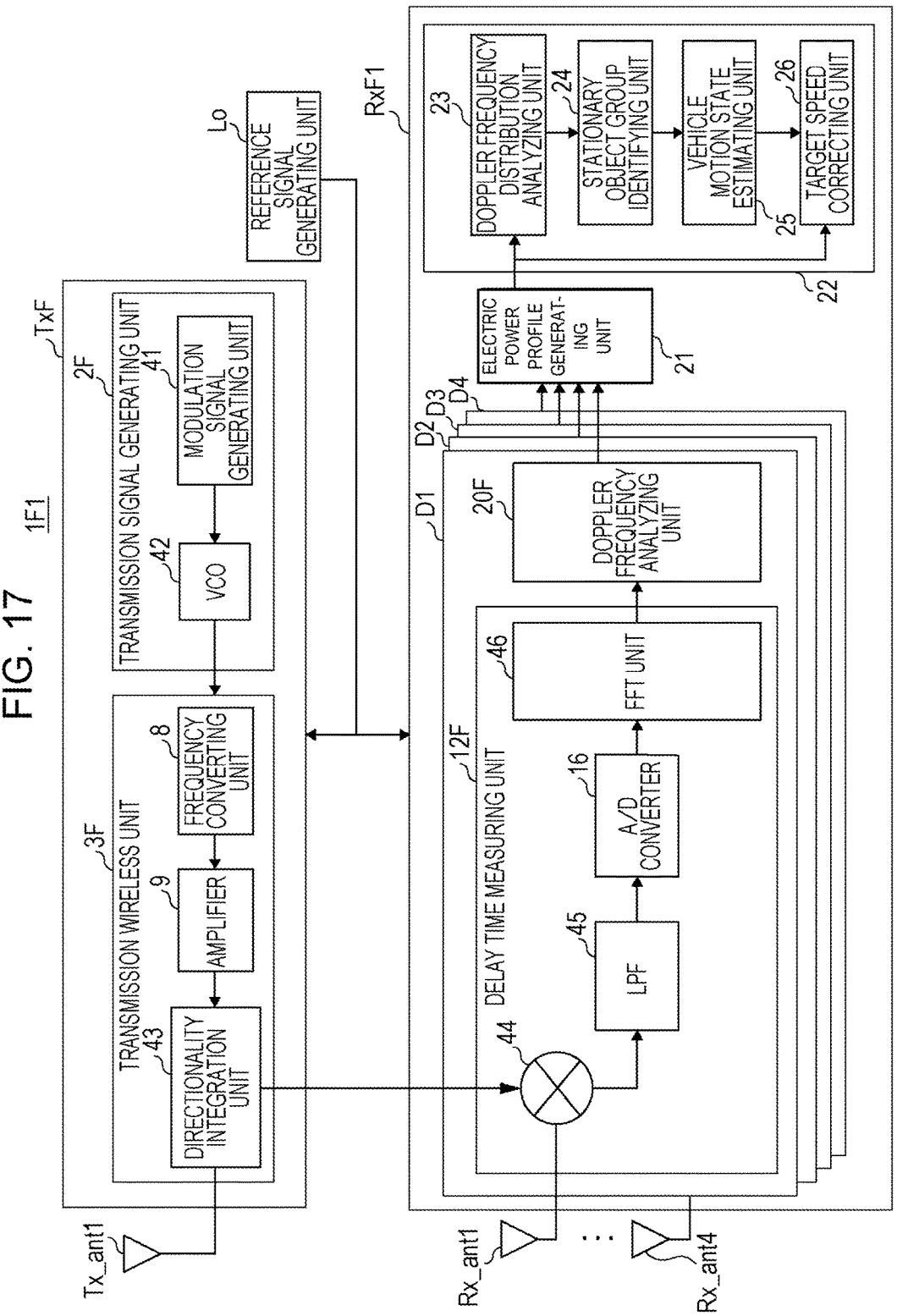
FIG. 17 is a block diagram illustrating the internal configuration of the radar device according to a seventh embodiment in detail.

FIG. 17 is a block diagram illustrating the internal configuration of the radar device according to the seventh embodiment in detail. FIG. 18A is a diagram illustrating the relationship between frequency modulation transmission signals and transmission cycle. FIG. 18B is a diagram illustrating received returning signals returning from a target of the frequency modulation transmission signals illustrated in FIG. 18A. Description of the radar device 1F1 according to the present embodiment which would be redundant with the content of the radar device 1 according to the first embodiment will be simplified or omitted, and description will be made regarding content that is different.

The radar device 1F1 illustrated in FIG. 17 includes the reference signal generating unit Lo, a radar transmission unit TxF, and a radar reception unit RxF1. The radar transmission unit TxF includes a transmission signal generating unit 2F including a modulation signal generating unit 41 and a VCO (Voltage Control Oscillator) 42, the frequency converting unit 8, the amplifier 9, and a transmission wireless unit 3F including a directionality integration unit 43 to which the transmission antenna Tx_ant1 is connected.

The antenna brunch processing unit D1 of the radar reception unit RxF1 includes a delay time measuring unit 12F to which the reception antenna Rx_ant1 has been connected, and a Doppler frequency analyzing unit 20F. The delay time measuring unit 12F includes a mixer 44, an LPF 45 as an example of a filter unit, the A/D converter 16, and an FFT unit 46.

Next, the operations of the parts of the radar transmission unit TxF will be described in detail. The modulation signal generating unit 41 generates sawtooth modulation signals (see FIG. 18A) every transmission cycle Tchirp, and outputs to the VCO 42.

The VCO 42 performs frequency modulation of the modulation signals generated by the modulation signal generating unit 41, to generate radar transmission signals which are output to the directionality integration unit 43.

The directionality integration unit 43 outputs part of the radar transmission signals generated by the VCO 42 to the mixer 44 of the delay time measuring unit 12F of the radar reception unit RxF1, and transmits the remaining radar transmission signals from the transmission antenna Tx_ant1.

Next, the operations of the parts of the radar reception unit RxF1 will be described in detail. In the delay time measuring unit 12F, the mixer 44 serving as an example of a mixer unit mixes returning signals received by the reception antenna Rx_ant1 and the radar transmission signals output from the directionality integration unit 43, and passes the mixed signals through the LPF 45. Accordingly, the LPF 45 outputs correlation signals subjected to correlation processing of the returning signals and radar transmission signals, and including a beat frequency corresponding to the reception delay time (arrival delay time) of the returning signals (see FIG. 18B) to the A/D converter 16.

In the delay time measuring unit 12F, the FFT unit 46 uses an Ndata number of discrete samples of correlation signals obtained from the A/D converter 16 at each transmission cycle Tchirp to perform FFT processing, thereby yielding a frequency spectrum response of the correlation signals (coherent addition results) CI_chirp($f_b$, m). The frequency spectrum response of the correlation signals (coherent addition results) CI_chirp($f_b$, m) includes a beat frequency component corresponding to the reception delay time (arrival delay time) of the returning signals included in the correlation signals. That is to say, the FFT unit 46 outputs correlation signals including information of the reception delay time (arrival delay time) correlated with the beat frequency component $f_b$, by subjecting correlation signals subjected to correlation processing by the mixer 44 and LPF unit 45. Note that m represents an ordinal of the transmission cycle Tchirp, and $f_b$ represents the frequency bin No. of the FFT at the FFT unit 46, where $f_b=1$ through Ndata/2.

The Doppler frequency analyzing unit 20F performs coherent addition (see Expression (36)) in increments of frequency spectrum responses (coherent addition results) CI_chirp($f_b$, Nc(w−1)+1) through CI_chirp($f_b$, Nc×w) which are Nc outputs of the FFT unit 46 obtained every beat frequency $f_b$, using phase shift $\theta(f_s)$ corresponding to 2Nf different Doppler frequency components $f_s\Delta\theta$ (see Expression (35)) as a correction coefficient. The Doppler frequency analyzing unit 20F outputs the coherent addition results of a number Nc which is the number of coherent additions, to the electric power profile generating unit 21.

$$\theta(f_s) = 2\pi f_s(Tchirp)\Delta\theta \quad (35)$$

$$FT\_CI^{Nant}(f_b, f_s, w) = \sum_{q=1}^{Nc} CI\_chirp(f_b, Nc(w-1)+q)\exp[-jq\theta(f_s)] \quad (36)$$

$$= \sum_{q=1}^{Nc} CI\_chirp(f_b, Nc(w-1)+q)\exp[-jq2\pi f_s Tchirp)]$$

where $FT\_CI^{Nant}(f_b, f_s, w)$ represents the with output of the Doppler frequency analyzing unit 20F, representing the coherent addition result corresponding to the Doppler frequency component $f_s\Delta\theta$ for each beat frequency $f_b$ of the Nant'th antenna brunch processing unit, $f_b$ is 1 through ((Nr+Nu)×Ns/No), $f_s$ is −Nf+1, ... , 0, ... , Nf, j is an imaginary unit, and $\Delta\theta$ is a phase rotation increment (predetermined value).

Accordingly, $FT\_CI^{Nant}(f_b, -Nf+1, w)$ through $FT\_CI^{Nant}(f_b, Nf, w)$, which are the coherent addition results according to the 2Nf'th Doppler frequency component $f_s\Delta\theta$ for each beat frequency $f_b$, are obtained by the computation of Expression (36) at each period (Tchirp×Nc) which is Nc times the transmission cycle Tchirp, at the antenna brunch processing units D1 through D4.

The operations of the electric power profile generating unit 21, Doppler frequency distribution analyzing unit 23, stationary object group identifying unit 24, vehicle motion state estimating unit 25, and target speed correcting unit 26 are those where the discrete time k has been replaced by the beat frequency $f_b$.

Accordingly, the radar device 1F1 according to the present embodiment can yield the same advantages as the radar device 1 according to the first embodiment, even in a case of transmitting radar transmission signals subjected to frequency modulation at the radar transmission unit TxF (e.g., chirp pulses).

Figure 19:
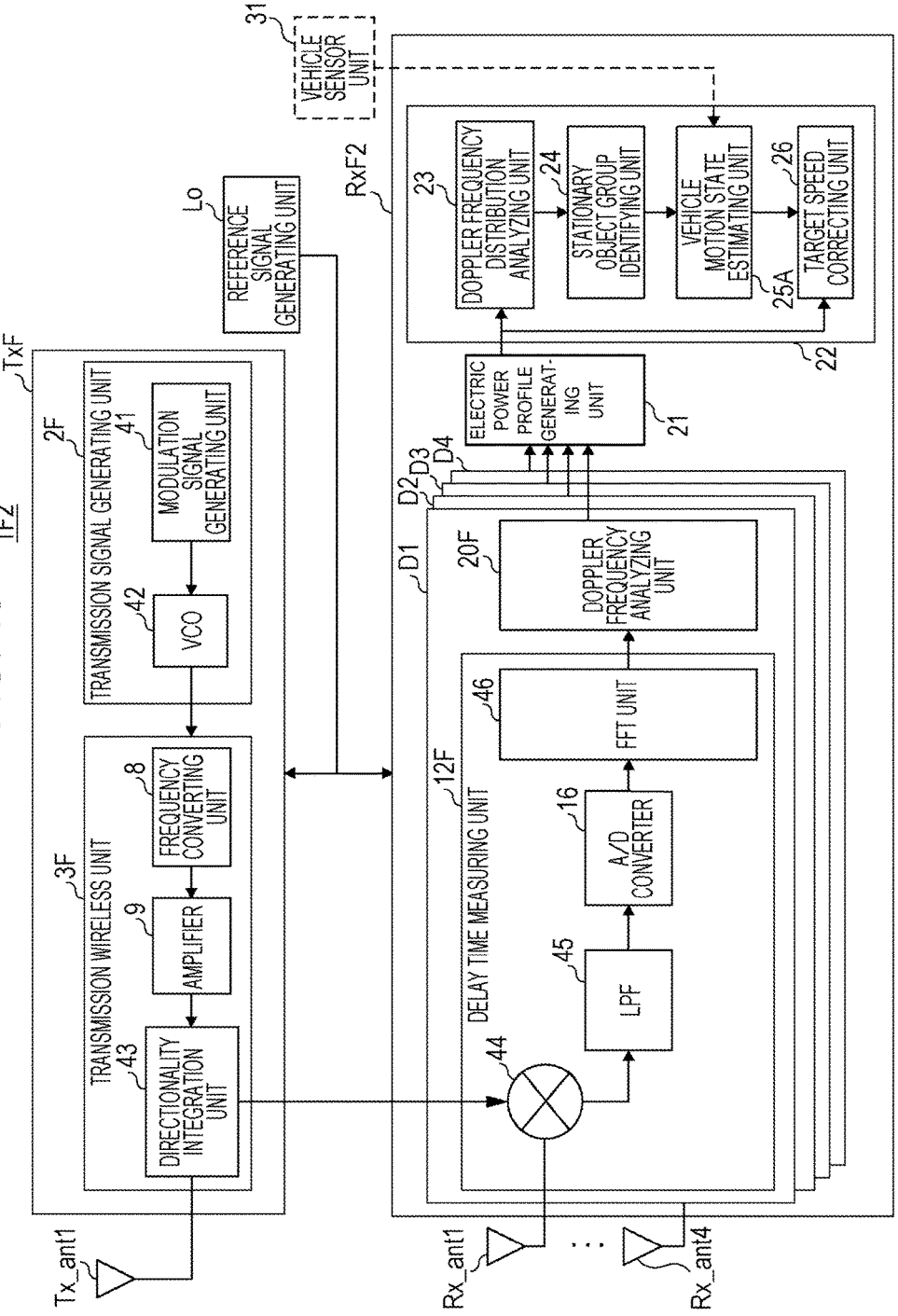
FIG. 19 is a block diagram illustrating the internal configuration of a radar device according to a first modification of the seventh embodiment in detail.
Figure 20:
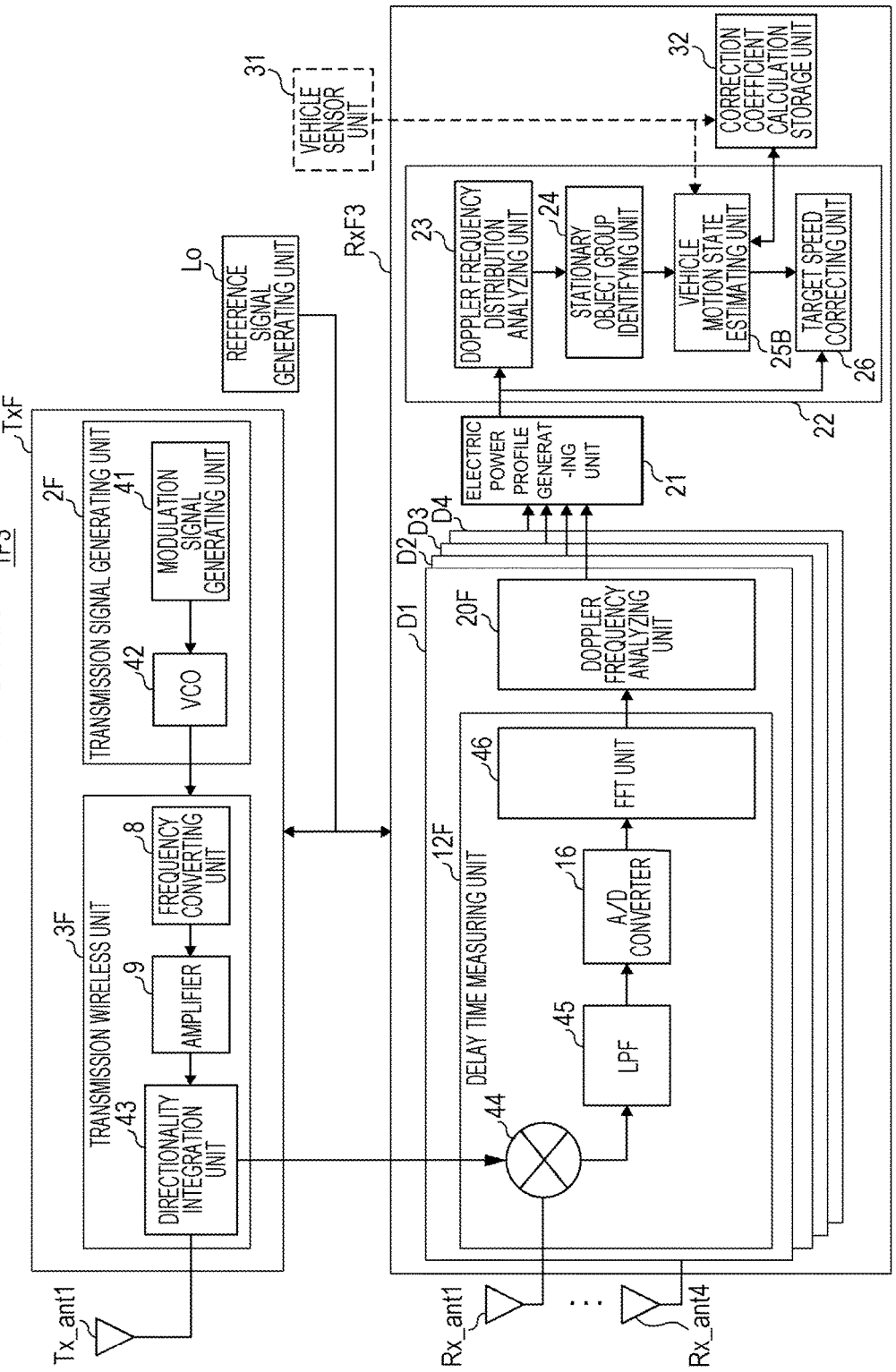
FIG. 20 is a block diagram illustrating the internal configuration of a radar device according to a second modification of the seventh embodiment in detail.
Figure 21:
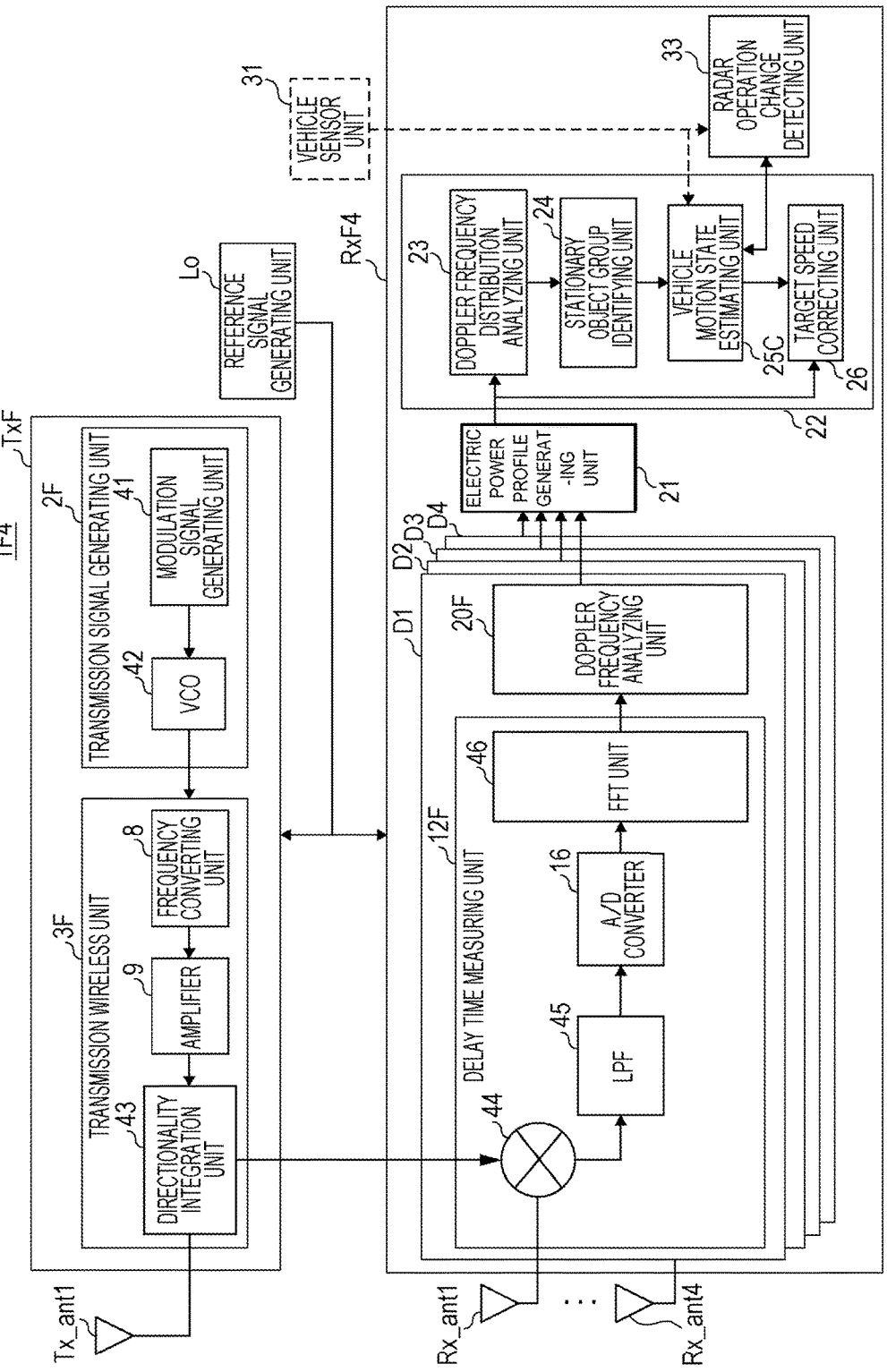
FIG. 21 is a block diagram illustrating the internal configuration of a radar device according to a third modification of the seventh embodiment in detail.

Also, arrangements may be made to the radar devices 1A through 1C illustrated in FIGS. 8 through 10, where the radar transmission unit Tx in the radar devices 1A through 1C are replaced with the radar transmission unit TxF according to the radar device 1F1 of the present embodiment (see FIGS. 19 through 21). FIG. 19 is a block diagram illustrating the internal configuration of a radar device 1 F2 according to a first modification of the seventh embodiment in detail. FIG. 20 is a block diagram illustrating the internal configuration of a radar device 1F3 according to a second modification of the seventh embodiment in detail. FIG. 21 is a block diagram illustrating the internal configuration of a radar device 1F4 according to a third modification of the seventh embodiment in detail. Accordingly, the radar devices 1F2 through 1F4 each have the advantages of the radar devices 1A through 1C, and yield the advantages of the radar device 1F1 according to the seventh embodiment.

Eighth Embodiment

Figure 22:
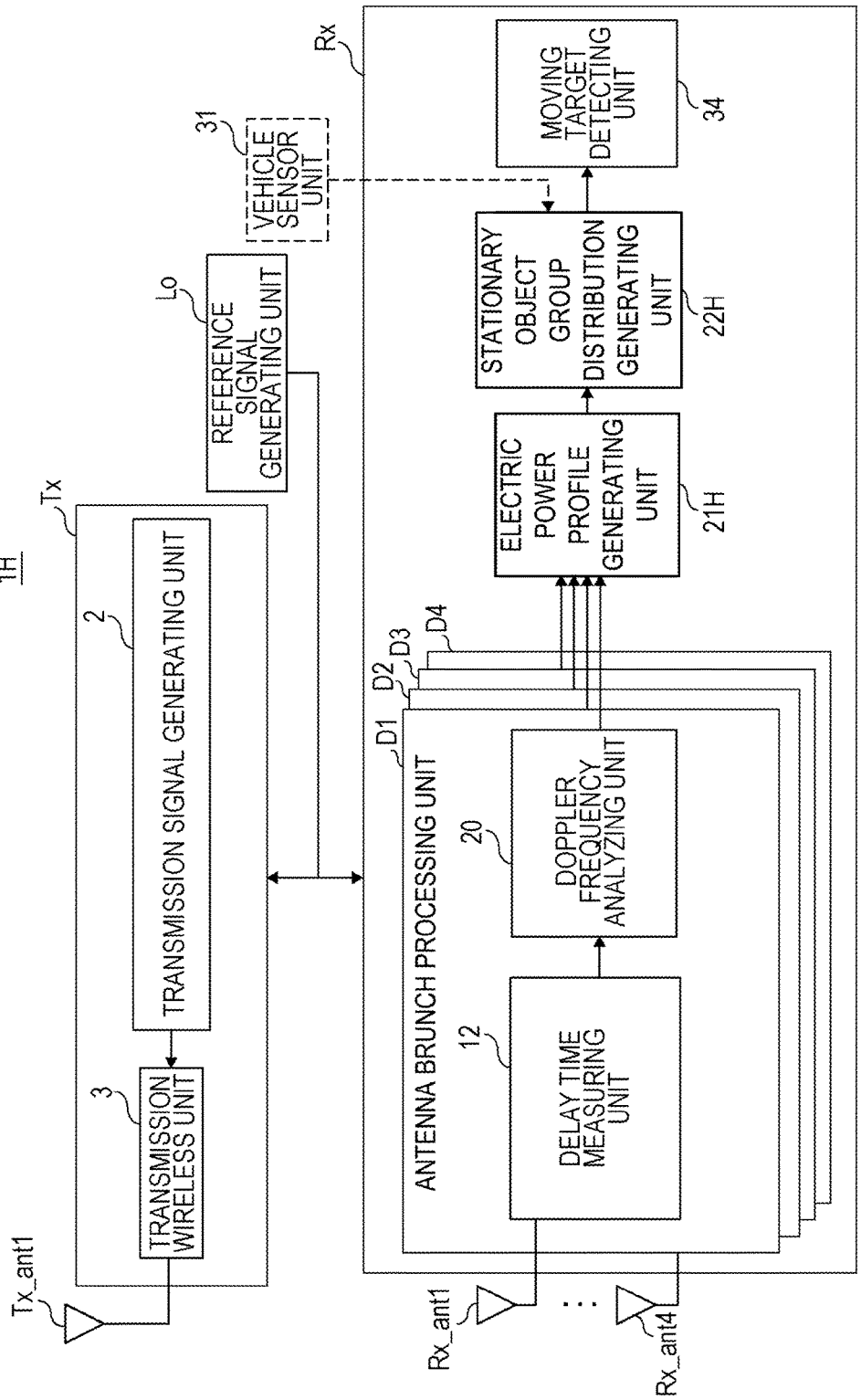
FIG. 22 is a block diagram illustrating the internal configuration of a radar device according to an eighth embodiment in detail.

In an eighth embodiment, a radar device which detects an object moving on a road using a distribution line of stationary objects will be described with reference to FIGS. 22 through 28. FIG. 22 is a block diagram illustrating the internal configuration of a radar device 1H according to the eighth embodiment in detail, which detects a target moving over a road using stationary object distribution output.

The configuration of an electric power profile generating unit 21H, a stationary object group distribution generating unit 22H, and a moving target detecting unit 34, differ from the radar device 1A illustrated in FIG. 8. The electric power profile generating unit 21H outputs the electric power profile per direction of arrival of returning signals and Doppler frequency components (first distribution) illustrated in FIG. 6B, and the distance profile on the same coordinate axis as the electric power profile, using the electric power profile $F_{out}$ for each distance/azimuth angle/Doppler frequency component in the returning signals reflected off of the target, that the electric power profile generating unit 21 in FIG. 8 outputs.

The distance profile is obtained by plotting a distance with a large electric power as a representative value, at each azimuth angle in the graph in FIG. 6A. Accordingly, the size of circles plotted differ in the electric power profile according to the magnitude of the electric power, while the size of the plotted circles for the distance profile differ according to distance. In a case where multiple targets exists, the moving target detecting unit 34 can select, for example, the closest target, or the target with the largest electric power, using the electric power profile and distance profile.

Figure 23:
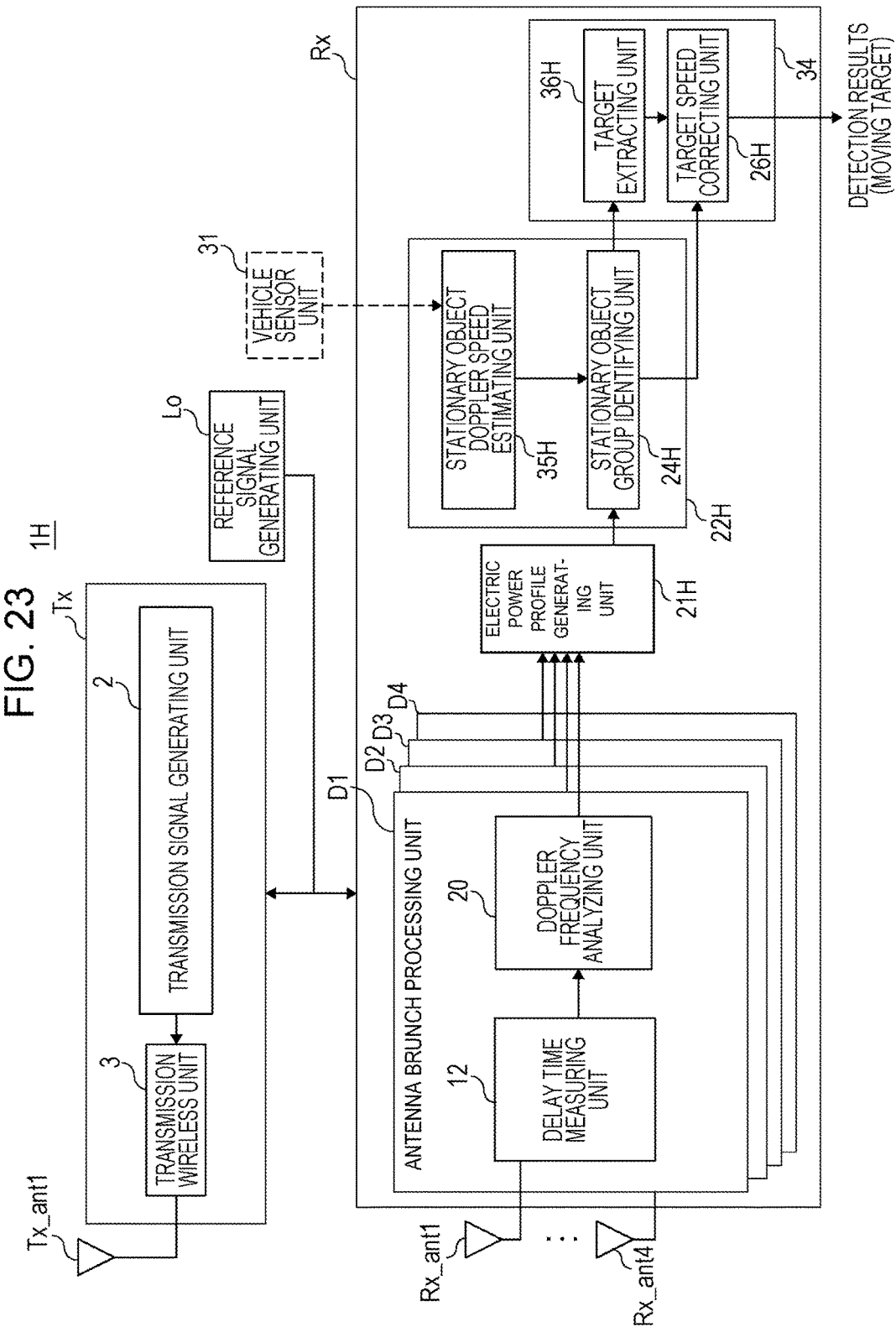
FIG. 23 is a block diagram illustrating the internal configuration of a stationary object group distribution generating unit and moving target detecting unit according to the eighth embodiment.

FIG. 23 is a diagram illustrating the internal configuration of the stationary object group distribution generating unit 22H and moving target detecting unit 34 in FIG. 22. As illustrated in FIG. 23, the stationary object group distribution generating unit 22H has a configuration including a stationary Doppler speed estimating unit 35H and a stationary object group identifying unit 24H.

The stationary Doppler speed estimating unit 35H estimates the Doppler speed (Doppler frequency components) from stationary objects, using the vehicle motion state obtained from the vehicle sensor unit 31 installed in the vehicle other than the radar device, such as a vehicular speed sensor or rudder angle sensor for example.

The Doppler speed (Doppler frequency components) obtained from the returning signals from the stationary objects is not dependent on the distance of the stationary object, so the Doppler speed obtained from the stationary object can be estimated from the moving state of the vehicle, and the azimuth which the radar device 1H has set for the vehicle.

Accordingly, the stationary Doppler speed estimating unit 35H estimates the moving state of the vehicle from the vehicular speed or rudder angle for example, and estimates the relative speed (Doppler speed) obtained from the returning signals from the stationary object in each azimuth of the radar view angle $\theta$, taking into consideration the position where the radar device 1H has been attached to the vehicle or the orientation of the radar device.

Figure 24B:
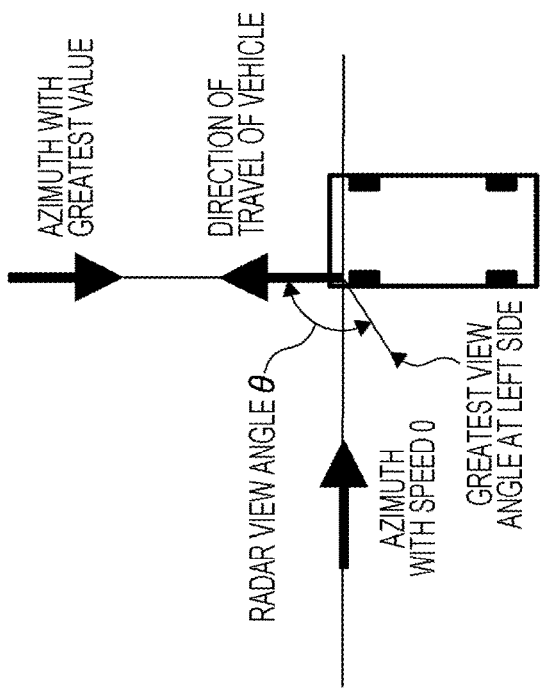
FIG. 24B is a diagram illustrating the relationship between a radar view angle θ of the radar device disposed on the vehicle in a state of proceeding straight, traveling direction θr of vehicle, azimuth at which an estimated relative speed (Doppler speed) Ve becomes greatest, and azimuth at which the estimated relative speed Ve becomes 0.
Figure 24A:
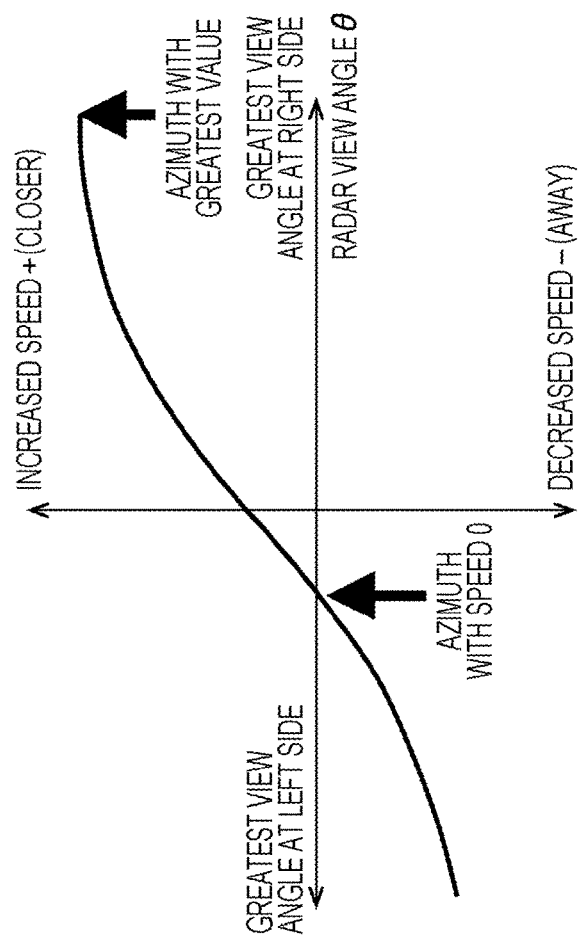
FIG. 24A is a diagram illustrating the relationship between relative speed (Doppler speed) and azimuth angle (second distribution) estimated in a case where the vehicle is in a state of proceeding straight and the radar device is disposed on the left front of the vehicle.

FIG. 24A is a diagram illustrating the relationship between relative speed (Doppler speed) and azimuth angle (second distribution) estimated in a case where the vehicle is in a state of proceeding straight and the radar device 1H is disposed on the left front of the vehicle. FIG. 24B is a diagram illustrating the relationship between a view angle θ of the radar device 1H disposed on the vehicle in a state of proceeding straight, traveling direction θr of vehicle, azimuth at which an estimated relative speed (Doppler speed) Ve becomes the greatest value, and azimuth at which the estimated relative speed Ve becomes 0.

FIG. 24B illustrates an example of installing the radar device 1H so that the largest view angle on the right side of the radar device 1H is the front of the vehicle. That is to say, the traveling direction θr of the vehicle is the azimuth of the largest view angle on the right side on the radar coordinates system. In a case where there is a stationary object at the front of the vehicle when traveling straight, the relative speed from the stationary object is greatest, so the direction of the largest view angle on the right side is estimated as being the largest value for the relative speed, as illustrated in FIG. 24A. Also, the azimuth where the relative speed is 0 in FIG. 24A is the direct sideways direction to the left side of the vehicle, as illustrated in FIG. 24B.

Figure 25B:
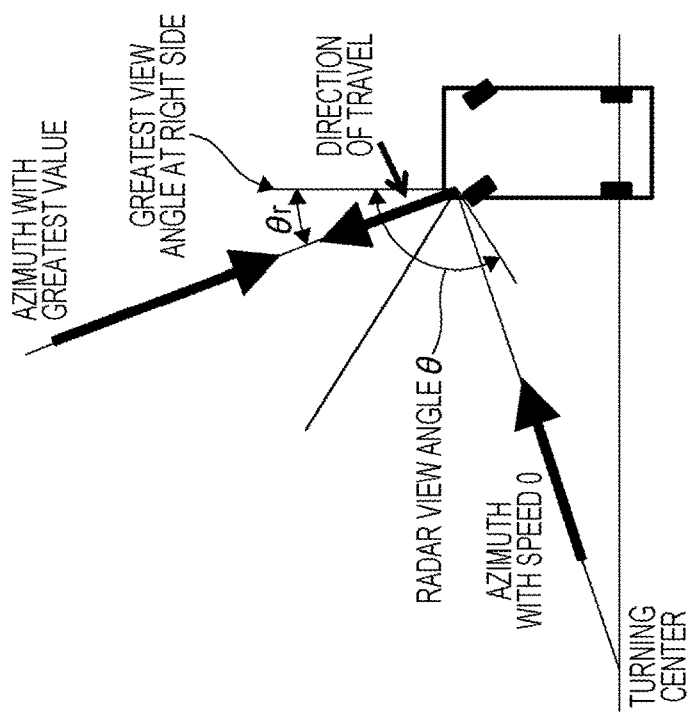
FIG. 25B is a diagram illustrating the relationship between a radar view angle θ of the radar device disposed on the vehicle in a state of turning left, traveling direction θr of vehicle, azimuth at which a relative speed Ve becomes greatest, and azimuth at which the relative speed Ve becomes 0.
Figure 25A:
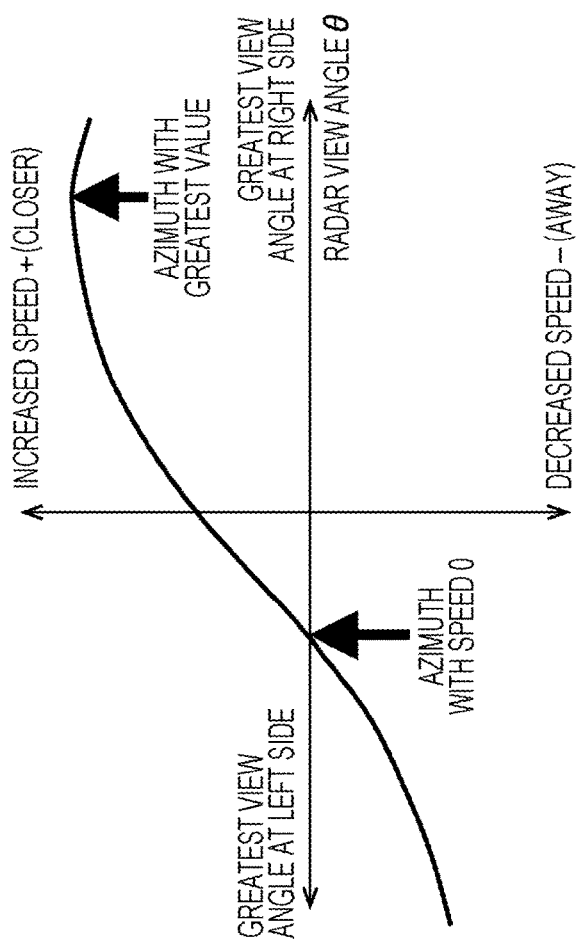
FIG. 25A is a diagram illustrating the relationship between relative speed Ve and azimuth angle θ estimated in a case where the vehicle is in a state of turning left and a radar device is disposed on the left front of the vehicle.

Also, description will be made regarding the azimuth of the maximum value of relative speed estimating when the vehicle is turning, and the azimuth of speed 0. FIG. 25A is a diagram illustrating the relationship between the relative speed Ve and the azimuth θ estimated in a case where the vehicle is turning left, and the radar device 1H has been installed at the left front of the vehicle. FIG. 25B is a diagram illustrating the relationship between the radar view angle θ of the radar device 1H installed in the vehicle turning left, the direction of travel θr of the vehicle, the azimuth where the relative speed Ve is the greatest value, and the azimuth θ where the relative speed Ve is 0.

As illustrated in FIG. 25B, the direction of travel of the radar device 1H is the azimuth where the relative speed is the maximum value, so with a vehicle turning left, the relative speed Ve at the left-side azimuth is the maximum value, in accordance with the turning direction of the radar device 1H from the largest view angle on the right side. The azimuth where the relative speed Ve is 0 is the direction of the center of turning of the vehicle.

The relative speed Ve from the stationary object, estimated using the moving state of the vehicle, can be calculated as shown in Expression (37), with the front of the vehicle as 0 degrees, and using the direction of travel θr of the vehicle, the vehicular speed Vr, and the radar view angle θ of the radar device 1H.

$$Ve = Vr \times \cos(\theta - \theta r) \qquad (37)$$

The radar device 1H illustrated in FIG. 23 will be described with reference to FIG. 26. The stationary object group identifying unit 24H obtains the relative speed between the vehicle and the stationary object (Doppler speed), using the estimated value of Doppler speed (relative speed) Ve of the stationary object at each azimuth θ obtained from the stationary Doppler speed estimating unit 35H, and the electric power profile (circles in FIG. 26A) for each arrival direction (radar view angle) and relative speed obtained from the electric power profile generating unit 21H.

FIG. 26A is a diagram illustrating the relationship between the radar view angle θ obtained from an electric power profile and Doppler speed, FIG. 26B is a diagram illustrating the relationship between the radar view angle θ estimated from the traveling state of the vehicle and relative speed as to a stationary object, and FIG. 26C is a diagram illustrating distribution of electric power profile after performing correction processing using FIG. 26B.

First, the stationary object group identifying unit 24H performs correction processing of the electric power profile where the estimated relative speed of the stationary object is subtracted. That is to say, the estimated relative speed in FIG. 26B is subtracted from the Doppler speed in the electric power profile in FIG. 26A. Note that in FIG. 26A, the reflection intensity of the output of the electric power profile is represented by the size (area) of the circles.

In a case where the relative speed of the stationary object estimated based on the moving state of the vehicle obtained from the vehicular speed or rudder angle sensor has little error, or the error is a negligible level, The Doppler speed is corrected to an absolute speed as to the road surface. Accordingly, in an ideal state, the electric power profile after correction processing should have stationary objects distributed on a straight light where speed is 0 at all azimuths, i.e., on the horizontal axis of the radar view angle θ.

However, even if the moving state of the vehicle is estimated form the vehicular speed or rudder angle sensor, error occurs due to unevenness of the road surface and tires slipping, so the absolute speed is not 0 even for stationary objects in the electric power profile after correction processing. That is to say, the distribution state of the electric power profile after correction processing illustrated in FIG. 26C is equivalent to the error in the estimation of vehicle motion.

Figure 27B:
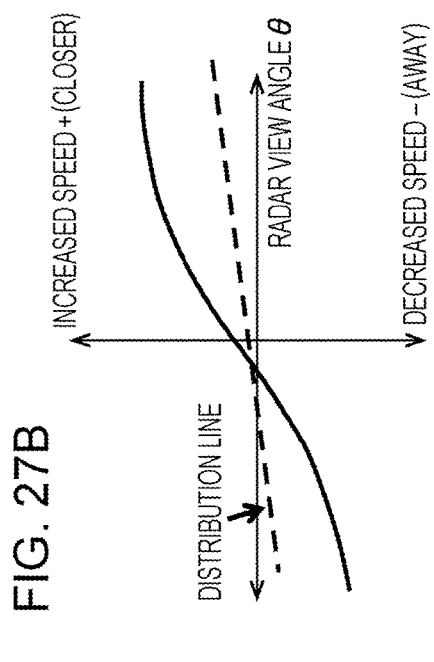
FIG. 27B is a diagram illustrating the relationship between the Doppler speed of estimated stationary objects and radar view angle.
Figure 27A:
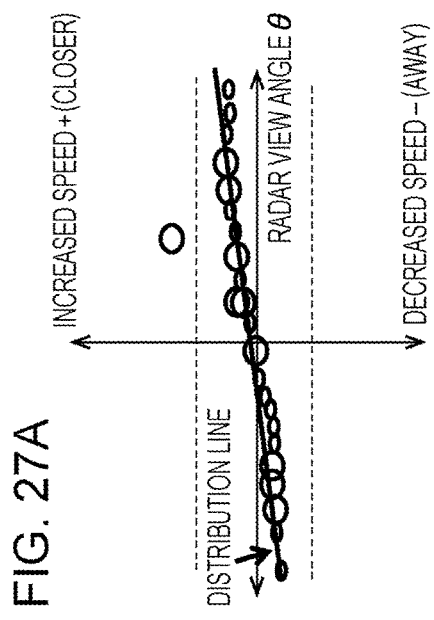
FIG. 27A is a diagram illustrating the relationship between the distribution of electric power profile after performing correction processing and a distribution line of stationary objects.
Figure 27C:
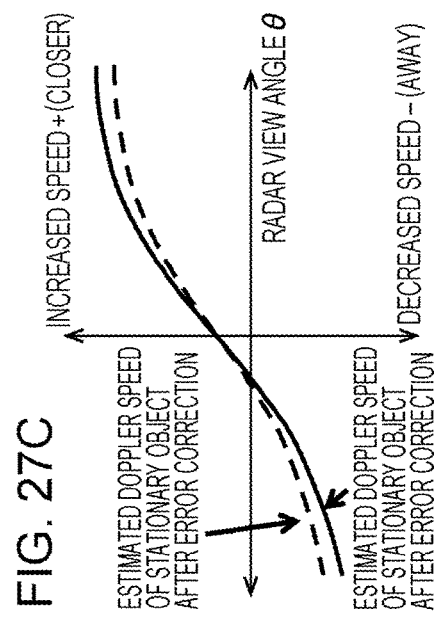
FIG. 27C is a diagram illustrating the relationship between the estimated Doppler speed of stationary objects after correction processing and radar view angle.

Next, the process of calculating the relative speed as to a stationary object for each azimuth, using the electric power profile after correction processing and estimated relative speed of the stationary object, with reference to FIG. 27. FIG. 27A is a diagram illustrating the relationship between the distribution of electric power profile after correction processing and a distribution line of stationary objects, FIG. 27B is a diagram illustrating the relationship between the Doppler speed of estimated stationary objects and radar view angle, and FIG. 27C is a diagram illustrating the relationship between the estimated Doppler speed of stationary objects after correction processing and radar view angle.

First, the stationary object group identifying unit 24H obtains the error in relative speed estimated from the moving state of the vehicle, with regard to the distribution of the electric power profile after correction processing that is illustrated in FIG. 26C. Specifically, the stationary object group identifying unit 24H obtains a regression line (distribution line) as to the electric power profile near speed 0 in the electric power profile after correction processing.

Next, the stationary object group identifying unit 24H adds the relative speed of the stationary object estimated in FIG. 27B to the distribution line obtained by finding the regression line. Accordingly, the stationary object group identifying unit 24H performs error correction for each accurate relative speed of the stationary object that has been estimated at each (azimuth (radar view angle θ). The stationary object group identifying unit 24H outputs the estimated Doppler speed of the after correction that is illustrated in FIG. 27C, to the moving target detecting unit.

The procedures for the processing where stationary object group identifying unit 24H outputs information of the electric power profile from which the electric power profile due to returning signals from the stationary object has been removed, to the moving target detecting unit, will be described with reference to FIGS. 28A through 28D.

Figure 28B:
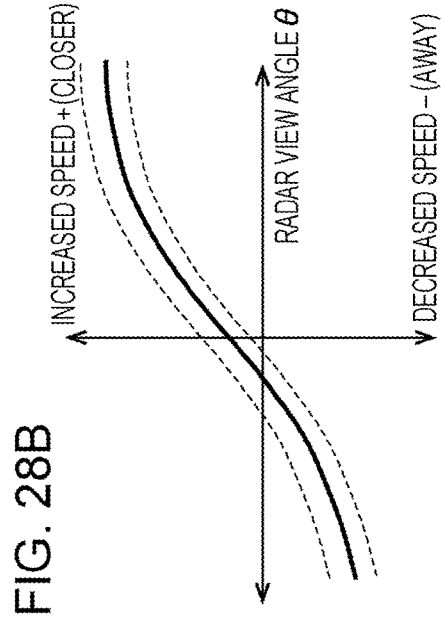
FIG. 28B is a diagram where a margin (dotted lines) has been added in the speed direction to the Doppler speed (solid line) of the stationary object estimated from the traveling state of the vehicle.
Figure 28D:
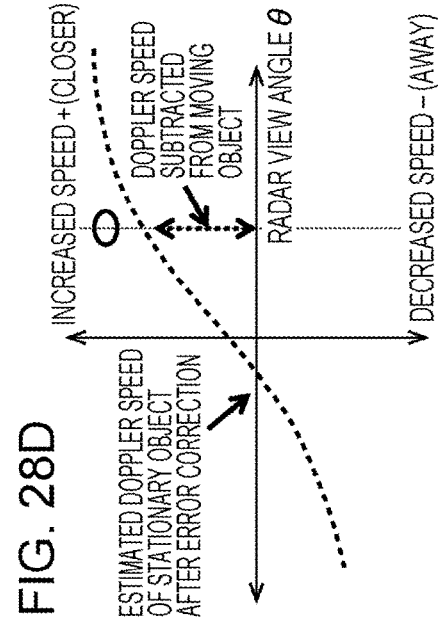
FIG. 28D is a diagram illustrating correction of speed error of a moving object using a distribution line.
Figure 28A:
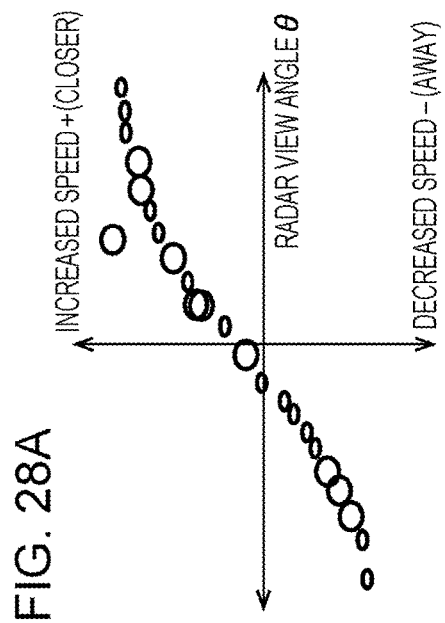
FIG. 28A is a diagram illustrating the relationship between the radar view angle θ obtained from an electric power profile and Doppler speed.
Figure 28C:
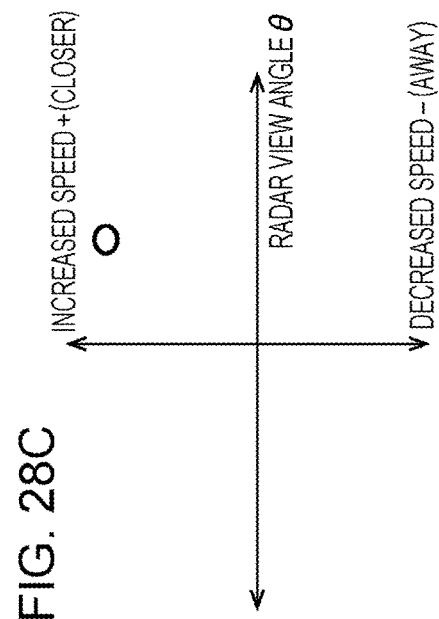
FIG. 28C is a diagram illustrating an electric power profile distribution after having removed the electric power profile included in the margin in FIG. 28B from the electric power profile in FIG. 28A.

FIG. 28A is a diagram illustrating the relationship between the radar view angle θ obtained from an electric power profile and Doppler speed, FIG. 28B is a diagram where a margin (dotted lines) has been added in the speed direction to the Doppler speed (solid line) of the stationary object estimated from the traveling state of the vehicle, FIG. 28C is a diagram illustrating an electric power profile distribution after having removed the electric power profile included in the margin in FIG. 28B out of the electric power profile distribution in FIG. 28A, and FIG. 28D is a diagram illustrating speed error correction of a moving object using a distribution line.

Note that the margin is decided according to the absolute speed value of the target which is to be detected. For example, in a case of detecting an object, of which the speed approaching or being distanced from the radar device is 2 km/h or greater in absolute speed, as a moving object, the margin is set to 2 km/h.

Specifically, in order to remove the electric power profile of stationary objects from the electric power profile in FIG. 28A, as illustrated in FIG. 28B, the stationary object group identifying unit 24H provides a margin in the speed direction of the estimated Doppler speed of the stationary objects, subtracts the electric power profile contained within the range of the margin, and estimates the remaining electric power profile as being the electric power profile of the moving object.

Note that in a case where there are multiple objects in the same azimuth and same speed, but different distances, the same coordinates in the distance profile are referenced to select the electric power profile of which the distance is the closest, or to select the electric power profile of which the electric power is the greatest.

The moving target detecting unit 34 is of a configuration including a target extracting unit 36H and target speed correcting unit 26H. The target extracting unit 36H receives input of an electric power profile and distance profile estimated to be a moving object as shown in FIG. 28C, and extracts a region satisfying one or both conditions of the electric power profile estimated to be a moving object having electric power of a predetermined level or higher, and speed distribution of a predetermined level or higher.

By correlating the extracted region with the distance profile, the target extracting unit 36H obtains the distance of the target (moving object). Note that the extracted region is information other than stationary objects, so the target extracting unit 36H can recognize the extracted object is being an object with is moving in relation to the road surface, and can calculate the azimuth, relative speed, and distance. The target extracting unit 36H outputs information relating to the moving object to the target speed correcting unit.

The target speed correcting unit 26H receives input of extracted moving objects, and information relating to relative speed of stationary objects after error correction as illustrated in FIG. 27C. The target speed correcting unit 26H subtracts, from the Doppler speed of the moving object that has been extracted, as illustrated in FIG. 28D, the estimated Doppler speed (relative speed) of the stationary object after error correction in the same radar view angle (azimuth), thereby calculating the absolute speed of the moving object.

According to the above configuration, by obtaining a distribution line of stationary objects with regard to Doppler speed estimation results of stationary objects including error estimated from vehicular speed or rudder angle, error can be excluded and the calculation precision of the absolute speed of moving objects can be improved.

First Modification of Eighth Embodiment

Another configuration to improve the calculation precision of the absolute speed of moving objects, described in the eighth embodiment, will be described with reference to FIGS. 29 through 32. FIG. 29 is a block diagram illustrating the internal configuration of a radar device 1J according to the eighth embodiment, where a stationary object group distribution generating unit 22J is of a configuration where the stationary object group distribution generating unit 22H in FIG. 23 further includes an electric power profile correcting unit 28J and a target speed correction information generating unit 29J. Redundant description of components will be omitted.

Figure 30A:
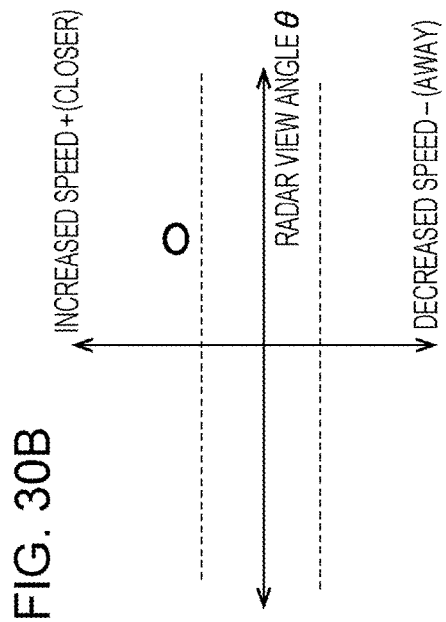
FIG. 30A is a diagram where a margin has been set to the electric power profile after Doppler speed correction in FIG. 26C.
Figure 30B:
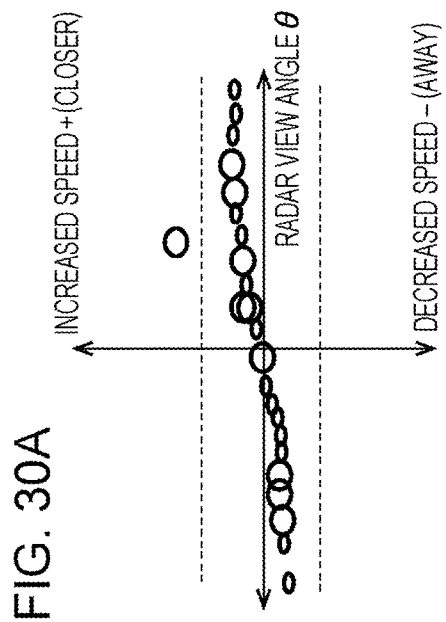
FIG. 30B is a diagram where an electric power profile outside of the margin has been extracted as a moving object.
Figure 30C:
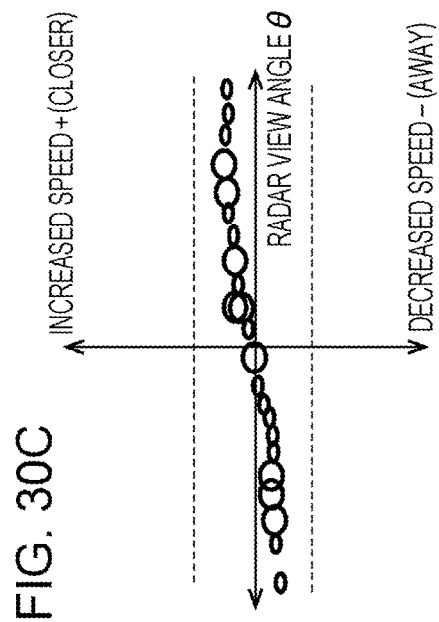
FIG. 30C is a diagram where an electric power profile inside the margin has been extracted as a stationary object.

FIG. 30A is a diagram where a margin has been added to the electric power profile after Doppler speed correction in FIG. 26C, FIG. 30B is a diagram where an electric power profile outside of the margin has been extracted as a moving object, and FIG. 30C is a diagram where an electric power profile inside the margin has been extracted as a stationary object.

FIG. 31 is a diagram illustrating a distribution line obtained as to an electric power profile extracted as a moving object, in the first modification of the eighth embodiment. FIG. 32 is a diagram illustrating the relationship between the distribution line obtained in FIG. 31, and correction of the speed of the electric power profile extracted as a moving object, in the first modification of the eighth embodiment.

The electric power profile correcting unit 28J of the radar device 1J obtains an electric power profile after Doppler speed correction in the same way as in the eighth embodiment, as illustrated in FIG. 30A. Next, the stationary object group identifying unit 24J sets a margin (dotted lines) in the speed direction, for the electric power profile after Doppler speed correction in FIG. 30A.

The stationary object group identifying unit 24J outputs the electric power profile outside of the margin as illustrated in FIG. 30B to the target extracting unit 36J as an electric power profile of a moving object, and outputs the electric power profile within the margin as illustrated in FIG. 30C to the target speed correction information generating unit 29J as an electric power profile of stationary objects. The target speed correction information generating unit 29J obtains a distribution line from the electric power profile extracted as stationary objects as illustrated in FIG. 31, and accordingly can obtain the distribution line more precisely as compared to the distribution line illustrated in FIG. 27A according to the eighth embodiment.

The moving target detecting unit 34J is able to calculate absolute speed more accurately, by subtracting a correction value for each radar view angle from the Doppler (relative) speed of the target (moving object) extracted as illustrated in FIG. 32, using the distribution line obtained in FIG. 31.

The following are included in various embodiments of the present disclosure.

According to an aspect of the present disclosure, a radar device mounted in a moving object includes a radar transmitter that transmits a radio-frequency radar transmission signal from a transmission antenna, at each transmission cycle; and a radar receiver that receives a plurality of returning signals that are generated as a result of the radar transmission signal reflected off of a plurality of targets, by a plurality of reception antennas, wherein the radar receiver includes a plurality of antenna brunch processors that perform correlation processing of the received returning signals and the radar transmission signal, and generate respective correlation signals each including arrival delay information of each of the received returning signals, an electric power profile generator that generates electric power profiles for each arrival direction of the received returning signals and Doppler frequency component, using the generated correlation signals, and a stationary object group distribution generator that, based on the generated electric power profiles, obtains a first distribution of Doppler frequency components of a stationary object group including a plurality of stationary objects as the plurality of targets in the perimeter of the moving object, for each azimuth angle.

The stationary object group distribution generator may include a traveling speed estimator that estimates the traveling speed of the moving object, based on the first distribution.

The traveling speed estimator may further estimate a rudder angle or yaw rate of the moving object.

The stationary object group distribution generator may further include a Doppler frequency distribution analyzer that counts an amount of the electric power profiles for each azimuth angle and each Doppler frequency components, that calculates the greatest amount of the electric power profiles at each azimuth angle, and that calculates Doppler frequency components where the amount of the electric power profiles is the greatest amount at each azimuth angle, a stationary object group identifier that extracts the azimuth angle and the Doppler frequency components, where the greatest amount of the electric power profiles is a predetermined amount or greater, and a motion state estimator that obtains the first distribution based on the extracted azimuth angle and the extracted Doppler frequency components.

The stationary object group distribution generator may further include a speed corrector that, based on the Doppler frequency components in the azimuth angle direction of the electric power profiles and the first distribution, corrects the relative speed of the electric power profiles exceeding a predetermined threshold value.

The electric power profile generator may output an electric power profile and Doppler frequency component profile corresponding to the distance and the azimuth angle of the stationary object group from the radar device.

The radar device may further include a sensor that detects traveling speed of the moving object, wherein the traveling speed estimator selects, as the traveling speed of the moving object, a detection value of the traveling speed of the moving object at the sensor, or an estimation value of the traveling speed of the moving object at the traveling speed estimator, in accordance with the first distribution.

The radar device may further include a sensor that detects the traveling speed of the moving object, wherein the traveling speed estimator selects, as the traveling speed of the moving object, a detection value of the traveling speed of the moving object at the sensor, or an estimation value of the traveling speed of the moving object at the traveling speed estimator, in accordance with whether or not the detection value of the traveling speed of the moving object at the sensor is at or above a predetermined speed.

The radar device may further include a sensor that detects a traveling speed, and a rudder angle or yaw rate, of the moving object, wherein the traveling speed estimator selects, as the traveling speed of the moving object, a detection value of the traveling speed of the moving object at the sensor, or an estimation value of the traveling speed of the moving object at the traveling speed estimator, in accordance with whether or not the moving object is traveling straight or curving.

The radar device may further include a first correction coefficient calculator that obtains a first correction coefficient for correcting a difference between a detection value of the traveling speed of the moving object at the sensor, and the estimation value of the traveling speed of the moving object at the traveling speed estimator.

The radar device may further include a second correction coefficient calculator that obtains a first correction coefficient for correcting a difference between a detection value of the traveling speed of the moving object at the sensor, and the estimation value of the traveling speed of the moving object at the traveling speed estimator, and a second correction coefficient for correcting a difference between a detection value of the rudder angle or yaw rate of the moving object at the sensor, and the estimation value of the rudder angle or yaw rate of the moving object at the traveling speed estimator.

The radar device may further include a first operation change notifier that notifies operation change of the radar device, based on difference between a detection value of the traveling speed of the moving object at the sensor, and the estimation value of the traveling speed of the moving object at the traveling speed estimator.

The first operation change notifier may notify of operation change of the radar device, in a case where a rate of the difference between the detection value of the traveling speed of the moving object at the sensor and the estimation value of the traveling speed of the moving object at the traveling speed estimator being a first value or larger, is a second value or larger.

The radar device may further include a transmission beam controller that outputs a control signal to switch a main beam direction of the radar transmission signals, at each predetermined number of transmission cycles, wherein the radar transmitter transmits the radar transmission signals of which the main beam direction has been switched, based on the control signal.

The radar transmitter may transmit the radar transmission signals of which transmission code has been frequency modulated at each transmission cycle, from the transmission antenna, and wherein the antenna brunch processors include each of a mixer that outputs mixed signals of the returning signals received by the reception antennas and the frequency modulated radar transmission signals, at each transmission cycle of the radar transmission signals, a filter that outputs a low-band frequency component of the mixed signals, a Fourier transformer that transforms signals of the low-band frequency component into a frequency region, and a Doppler frequency analyzer that performs coherent addition of the signals converted to the frequency region, including phase shift corresponding to Doppler frequency components, at each frequency component.

The antenna brunch processors may include each of a correlation calculator that calculates a correlation value between the returning signals received by the reception antennas and the radar transmission signals, each transmission cycle of the radar transmission signals, a first coherent adder that performs coherent addition of the correlation value over a first predetermined number of the transmission cycles, and a second coherent adder that performs coherent addition of the first coherent addition result of the correlation value over a first predetermined number of the transmission cycles, including phase shift corresponding to different Doppler frequency components of a predetermined number.

The radar device may further include a sensor that detects that detects the traveling speed of the moving object, wherein the stationary object group distribution generator obtains a second distribution of the Doppler frequency components of the stationary objects, at each azimuth angle, estimated based on the detected traveling speed of the moving object, and corrects the first distribution using the second distribution, and wherein the radar receiver further includes a moving target detector that detects a moving object using the corrected first distribution.

The moving target detector may correct the second distribution using the corrected first distribution, and corrects the speed of the moving object using the corrected second distribution.

According to another aspect of the present disclosure, a vehicle includes: a first sector radar which a first detection range is a right side area of the vehicle in the traveling direction; a second sector radar which a second detection range is a left side area of the vehicle in the traveling direction; a detection result integrator that corrects the relative speed of the target at the first sector radar or the second sector radar, in accordance with difference between a first estimation value of traveling speed of the vehicle at the first sector radar, and a second estimation value of traveling speed of the vehicle at the second sector radar; a radar transmitter that transmits a radio-frequency radar transmission signal from a transmission antenna, at each transmission cycle; and a radar receives that receives a plurality of returning signals that are generated as a result of the radar transmission signal reflected off of a plurality of targets, by a plurality of reception antennas, wherein the radar receiver includes a plurality of antenna brunch processors that perform correlation processing of the received returning signals and the radar transmission signal, and generate respective correlation signals each including arrival delay information of each of the received returning signals, an electric power profile generator that generates an electric power profiles for each arrival direction of the received returning signals and Doppler frequency component, using the generated correlation signals, and a stationary object group distribution generator that, based on the generated electric power profiles, obtains a first distribution of a Doppler frequency components of a stationary object group including a plurality of stationary objects as the plurality of targets in the perimeter of the moving object, for each azimuth angle, wherein the stationary object group distribution generator includes a traveling speed estimator that estimates the traveling speed of the moving object, based on the first distribution, a Doppler frequency distribution analyzer that counts an amount of the electric power profiles for each azimuth angle and each Doppler frequency components, that calculates the greatest amount of the electric power profiles at each azimuth angle, and that calculates Doppler frequency components where the amount of the electric power profiles is the greatest amount at each azimuth angle, a stationary object group identifier that extracts the azimuth angle and the Doppler frequency components, where the greatest amount of the electric power profiles is a predetermined amount or greater, motion state estimator that obtains the first distribution based on the extracted azimuth angle and the extracted Doppler frequency components, and a speed corrector that, based on the Doppler frequency components in the azimuth angle direction of the electric power profiles and the first distribution, corrects the relative speed of the electric power profiles exceeding a predetermined threshold value.

In a case where the difference between the first estimation value and the second estimation value is equal to or larger than a predetermined value, the detection result integrator may correct the relative speed of the target, at the first sector radar or the second sector radar, in accordance with the maximum number of Doppler frequency components detecting using the electric power profiles of the stationary object group at the first sector radar and the second sector radar.

According to another aspect of the present disclosure, a moving object speed detecting method in a radar device mounted in the moving object includes: transmitting a radio-frequency radar transmission signal from a transmission antenna, at each transmission cycle; receiving a plurality of returning signals that are generated as a result of the radar transmission signal reflected off of a plurality of targets, by a plurality of reception antennas; performing correlation processing of the received returning signals and the radar transmission signal, and generating respective correlation signals each including arrival delay information of each of the received returning signals; generating an electric power profiles for each arrival direction of the received returning signals and Doppler frequency component, using the generated correlation signals; obtaining, based on the electric power profile of the returning signals, a first distribution of a Doppler frequency components of a stationary object group including a plurality of stationary objects in the perimeter of the moving object, for each azimuth angle; and estimating the traveling speed of the moving object, based on the first distribution.

While various embodiments have been described with reference to the drawings, it is needless to say that the present disclosure is not restricted to these examples. It will be apparent to one skilled in the art that various modifications and corrections can be conceived within the scope of the Claims, and that these also belong to the technical scope of the present disclosure as a matter of course. The components of the above embodiments may also be combined without departing from the essence of the disclosure.

While The above embodiments have been described as being carried out by hardware configurations, the present disclosure may be realized by software in conjunction with hardware.

The functional blocks used in description of the above embodiments are typically realized by a large-scale integration (LSI) which is an integrated circuit (IC). These may each be formed as separate chips, or part of all may be formed as a single chip. There are different names for LSIs according to the degree of integration, such as "IC", "system LSI", "super LSI", and "ultra LSI".

The way in which the integrated circuit is formed is not restricted to LSIs, and may be realized by dedicated circuits or general-purpose processors. A field programmable gate array (FPGA) capable of being programmed after manufacturing the LSI, or a reconfigurable processor of which the connections and settings of circuit cells within the LSI can be reconfigured, may be used.

Moreover, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

The present disclosure is effective as a radar device that improves detection precision of the traveling speed of a moving object on which the radar device has been mounted, and as a radar device with improved detection precision of the relative speed of a target.

What is claimed is:

1. A radar device mounted in a moving object, the radar device comprising:
   a radar transmitter that transmits a radio-frequency radar transmission signal from a transmission antenna, at each transmission cycle; and
   a radar receiver that receives a plurality of returning signals that are generated as a result of the radar transmission signal reflected off of a plurality of targets, by a plurality of reception antennas,
   wherein the radar receiver includes
      a plurality of antenna brunch processors that perform correlation processing of the received returning signals and the radar transmission signal, and generate respective correlation signals each including arrival delay information of each of the received returning signals,
      an electric power profile generator that generates electric power profiles for each arrival direction of the received returning signals and Doppler frequency component, using the generated correlation signals, and
      a stationary object group distribution generator that, based on the generated electric power profiles, obtains a first distribution of Doppler frequency components of a stationary object group including a plurality of stationary objects as the plurality of targets in the perimeter of the moving object, for each azimuth angle.

2. The radar device according to claim 1,
   wherein the stationary object group distribution generator includes
      a traveling speed estimator that estimates the traveling speed of the moving object, based on the first distribution.

3. The radar device according to claim 2,
   wherein the traveling speed estimator further estimates a rudder angle or yaw rate of the moving object.

4. The radar device according to claim 2,
   wherein the stationary object group distribution generator further includes
      a Doppler frequency distribution analyzer that counts an amount of the electric power profiles for each azimuth angle and each Doppler frequency components, that calculates the greatest amount of the electric power profiles at each azimuth angle, and that calculates Doppler frequency components where the amount of the electric power profiles is the greatest amount at each azimuth angle,
      a stationary object group identifier that extracts the azimuth angle and the Doppler frequency components, where the greatest amount of the electric power profiles is a predetermined amount or greater, and
      a motion state estimator that obtains the first distribution based on the extracted azimuth angle and the extracted Doppler frequency components.

5. The radar device according to claim 4,
   wherein the stationary object group distribution generator further includes
      a speed corrector that, based on the Doppler frequency components in the azimuth angle direction of the electric power profiles and the first distribution, corrects the relative speed of the electric power profiles exceeding a predetermined threshold value.

6. The radar device according to claim 2,
   wherein the electric power profile generator outputs an electric power profile and Doppler frequency component profile corresponding to the distance and the azimuth angle of the stationary object group from the radar device.

7. The radar device according to claim 2, further comprising:
   a sensor that detects traveling speed of the moving object,
   wherein the traveling speed estimator selects, as the traveling speed of the moving object, a detection value of the traveling speed of the moving object at the sensor, or an estimation value of the traveling speed of the moving object at the traveling speed estimator, in accordance with the first distribution.

8. The radar device according to claim 2, further comprising:
   a sensor that detects the traveling speed of the moving object,
   wherein the traveling speed estimator selects, as the traveling speed of the moving object, a detection value of the traveling speed of the moving object at the sensor, or an estimation value of the traveling speed of the moving object at the traveling speed estimator, in accordance with whether or not the detection value of the traveling speed of the moving object at the sensor is at or above a predetermined speed.

9. The radar device according to claim 3, further comprising:
   a sensor that detects a traveling speed, and a rudder angle or yaw rate, of the moving object,
   wherein the traveling speed estimator selects, as the traveling speed of the moving object, a detection value of the traveling speed of the moving object at the sensor, or an estimation value of the traveling speed of the moving object at the traveling speed estimator, in accordance with whether or not the moving object is traveling straight or curving.

10. The radar device according to claim 7, further comprising:
    a first correction coefficient calculator that obtains a first correction coefficient for correcting a difference between a detection value of the traveling speed of the moving object at the sensor, and the estimation value of the traveling speed of the moving object at the traveling speed estimator.

11. The radar device according to claim 9, further comprising:
    a second correction coefficient calculator that obtains
       a first correction coefficient for correcting a difference between a detection value of the traveling speed of the moving object at the sensor, and the estimation value of the traveling speed of the moving object at the traveling speed estimator, and
       a second correction coefficient for correcting a difference between a detection value of the rudder angle or yaw rate of the moving object at the sensor, and the estimation value of the rudder angle or yaw rate of the moving object at the traveling speed estimator.

12. The radar device according to claim 7, further comprising:
    a first operation change notifier that notifies operation change of the radar device, based on difference between a detection value of the traveling speed of the moving object at the sensor, and the estimation value of the traveling speed of the moving object at the traveling speed estimator.

13. The radar device according to claim 12,
wherein the first operation change notifier notifies operation change of the radar device, in a case where a rate of the difference between the detection value of the traveling speed of the moving object at the sensor and the estimation value of the traveling speed of the moving object at the traveling speed estimator being a first value or larger, is a second value or larger.

14. The radar device according to claim 2, further comprising:
a transmission beam controller that outputs a control signal to switch a main beam direction of the radar transmission signals, at each predetermined number of transmission cycles,
wherein the radar transmitter transmits the radar transmission signals of which the main beam direction has been switched, based on the control signal.

15. The radar device according to claim 2,
wherein the radar transmitter transmits the radar transmission signals of which transmission code has been frequency modulated at each transmission cycle, from the transmission antenna,
and wherein the antenna brunch processors include each of
a mixer that outputs mixed signals of the returning signals received by the reception antennas and the frequency modulated radar transmission signals, at each transmission cycle of the radar transmission signals,
a filter that outputs a low-band frequency component of the mixed signals,
a Fourier transformer that transforms signals of the low-band frequency component into a frequency region, and
a Doppler frequency analyzer that performs coherent addition of the signals converted to the frequency region, including phase shift corresponding to Doppler frequency components, at each frequency component.

16. The radar device according to claim 2,
wherein the antenna brunch processors include each of
a correlation calculator that calculates a correlation value between the returning signals received by the reception antennas and the radar transmission signals, each transmission cycle of the radar transmission signals,
a first coherent adder that performs coherent addition of the correlation value over a first predetermined number of the transmission cycles, and
a second coherent adder that performs coherent addition of the first coherent addition result of the correlation value over a first predetermined number of the transmission cycles, including phase shift corresponding to different Doppler frequency components of a predetermined number.

17. The radar device according to claim 1, further comprising:
a sensor that detects that detects the traveling speed of the moving object,
wherein the stationary object group distribution generator obtains a second distribution of the Doppler frequency components of the stationary objects, at each azimuth angle, estimated based on the detected traveling speed of the moving object, and
corrects the first distribution using the second distribution,
and wherein the radar receiver further includes
a moving target detector that detects a moving object using the corrected first distribution.

18. The radar device according to claim 17,
wherein the moving target detector corrects the second distribution using the corrected first distribution, and corrects the speed of the moving object using the corrected second distribution.

19. A vehicle, comprising:
a first sector radar which a first detection range is a right side area of the vehicle in the traveling direction;
a second sector radar which a second detection range is a left side area of the vehicle in the traveling direction;
a detection result integrator that corrects the relative speed of the target at the first sector radar or the second sector radar, in accordance with difference between a first estimation value of traveling speed of the vehicle at the first sector radar, and a second estimation value of traveling speed of the vehicle at the second sector radar;
a radar transmitter that transmits a radio-frequency radar transmission signal from a transmission antenna, at each transmission cycle; and
a radar receives that receives a plurality of returning signals that are generated as a result of the radar transmission signal reflected off of a plurality of targets, by a plurality of reception antennas,
wherein the radar receiver includes
a plurality of antenna brunch processors that perform correlation processing of the received returning signals and the radar transmission signal, and generate respective correlation signals each including arrival delay information of each of the received returning signals,
an electric power profile generator that generates an electric power profiles for each arrival direction of the received returning signals and Doppler frequency component, using the generated correlation signals, and
a stationary object group distribution generator that, based on the generated electric power profiles, obtains a first distribution of a Doppler frequency components of a stationary object group including a plurality of stationary objects as the plurality of targets in the perimeter of the moving object, for each azimuth angle,
wherein the stationary object group distribution generator includes
a traveling speed estimator that estimates the traveling speed of the moving object, based on the first distribution,
a Doppler frequency distribution analyzer that counts an amount of the electric power profiles for each azimuth angle and each Doppler frequency components, that calculates the greatest amount of the electric power profiles at each azimuth angle, and that calculates Doppler frequency components where the amount of the electric power profiles is the greatest amount at each azimuth angle,
a stationary object group identifier that extracts the azimuth angle and the Doppler frequency components, where the greatest amount of the electric power profiles is a predetermined amount or greater,
motion state estimator that obtains the first distribution based on the extracted azimuth angle and the extracted Doppler frequency components, and
a speed corrector that, based on the Doppler frequency components in the azimuth angle direction of the electric power profiles and the first distribution, corrects the relative speed of the electric power profiles exceeding a predetermined threshold value.

20. The vehicle according to claim 19, wherein, in a case where the difference between the first estimation value and the second estimation value is equal to or larger than a predetermined value, the detection result integrator corrects the relative speed of the target, at the first selector radar or the second selector radar, in accordance with the maximum number of Doppler frequency components detecting using the electric power profiles of the stationary object group at the first selector radar and the second selector radar.

21. A moving object speed detecting method in a radar device mounted in the moving object, the method comprising:
    transmitting a radio-frequency radar transmission signal from a transmission antenna, at each transmission cycle;
    receiving a plurality of returning signals that are generated as a result of the radar transmission signal reflected off of a plurality of targets, by a plurality of reception antennas;
    performing correlation processing of the received returning signals and the radar transmission signal, and generating respective correlation signals each including arrival delay information of each of the received returning signals;
    generating an electric power profiles for each arrival direction of the received returning signals and Doppler frequency component, using the generated correlation signals;
    obtaining, based on the electric power profile of the returning signals, a first distribution of a Doppler frequency components of a stationary object group including a plurality of stationary objects in the perimeter of the moving object, for each azimuth angle; and
    estimating the traveling speed of the moving object, based on the first distribution.

* * * * *

UNITED STATES PATENT AND TRADEMARK OFFICE
CERTIFICATE OF CORRECTION

PATENT NO. : 9,958,541 B2
APPLICATION NO. : 14/839595
DATED : May 1, 2018
INVENTOR(S) : Takaaki Kishigami et al.

Page 1 of 1

It is certified that error appears in the above-identified patent and that said Letters Patent is hereby corrected as shown below:

In the Claims

Column 47, Line 12:
"a plurality of antenna brunch processors that perform" should read, -- a plurality of antenna branch processors that perform --.

Column 49, Line 24:
"and wherein the antenna brunch processors include each" should read, -- and wherein the antenna branch processors include each --.

Column 49, Line 42:
"and wherein the antenna brunch processors include each" should read, -- and wherein the antenna branch processors include each --.

Column 50, Line 28:
"a plurality of antenna brunch processors that perform" should read, -- a plurality of antenna branch processors that perform --.

Signed and Sealed this
Thirty-first Day of July, 2018

Andrei Iancu
*Director of the United States Patent and Trademark Office*